United States Patent
Dupray

(10) Patent No.: US 9,875,492 B2
(45) Date of Patent: Jan. 23, 2018

(54) REAL ESTATE TRANSACTION SYSTEM

(76) Inventor: Dennis J. Dupray, Golden, CO (US)

( * ) Notice: Subject to any disclaimer, the term of this patent is extended or adjusted under 35 U.S.C. 154(b) by 0 days.

(21) Appl. No.: 11/936,781

(22) Filed: Nov. 7, 2007

(65) Prior Publication Data

US 2009/0048938 A1    Feb. 19, 2009

Related U.S. Application Data

(63) Continuation-in-part of application No. 10/297,449, filed as application No. PCT/US01/17957 on Jun. 4, 2001, now Pat. No. 7,714,778.

(60) Provisional application No. 60/293,094, filed on May 22, 2001, provisional application No. 60/864,606, filed on Nov. 7, 2006.

(51) Int. Cl.
| | |
|---|---|
| G06Q 50/16 | (2012.01) |
| G06Q 30/06 | (2012.01) |
| G06Q 30/02 | (2012.01) |
| G06Q 40/00 | (2012.01) |
| G06Q 40/02 | (2012.01) |
| H04W 4/02 | (2009.01) |
| H04L 29/08 | (2006.01) |

(52) U.S. Cl.
CPC ............. *G06Q 30/06* (2013.01); *G06Q 30/02* (2013.01); *G06Q 30/0641* (2013.01); *G06Q 40/02* (2013.01); *G06Q 50/16* (2013.01); *H04L 67/18* (2013.01); *H04W 4/02* (2013.01)

(58) Field of Classification Search
CPC ...................................................... G06Q 50/16
USPC ............................................... 705/1, 1.1–912
See application file for complete search history.

(56) References Cited

U.S. PATENT DOCUMENTS

| | | |
|---|---|---|
| 3,630,079 A | 12/1971 | Hughes et al. |
| 3,646,580 A | 2/1972 | Fuller et al. |
| 3,845,289 A | 10/1974 | French |
| 3,881,060 A | 4/1975 | Connell et al. |
| 3,886,553 A | 5/1975 | Bates |
| 4,023,176 A | 5/1977 | Currie et al. |
| 4,052,569 A | 10/1977 | Pirnie, III |
| 4,232,313 A | 11/1980 | Fleishman |
| 4,310,726 A | 1/1982 | Asmuth |
| 4,347,618 A | 8/1982 | Kavouras et al. |
| 4,402,049 A | 8/1983 | Gray |
| 4,438,439 A | 3/1984 | Shreve |
| 4,445,118 A | 4/1984 | Taylor et al. |
| 4,450,320 A | 5/1984 | Ostermann et al. |
| 4,459,667 A | 7/1984 | Takeuchi |
| 4,463,357 A | 7/1984 | MacDoran |
| 4,475,010 A | 10/1984 | Huensch et al. |
| 4,521,645 A | 6/1985 | Carroll |
| RE31,962 E | 7/1985 | Brodeur |
| 4,542,744 A | 9/1985 | Barnes et al. |

(Continued)

FOREIGN PATENT DOCUMENTS

| | | |
|---|---|---|
| EP | 0177203 | 4/1986 |
| EP | 0346461 | 12/1989 |

(Continued)

OTHER PUBLICATIONS

U.S. Appl. No. 08/191,984, filed Feb. 4, 1994, Loomis.

(Continued)

*Primary Examiner* — Jonathan Ouellette

(57) ABSTRACT

A network based real estate transaction system is disclosed for assisting real estate agents and their clients with determining properties for purchase.

30 Claims, 5 Drawing Sheets

(56) References Cited

U.S. PATENT DOCUMENTS

| | | |
|---|---|---|
| 4,555,594 A | 11/1985 | Friedes et al. |
| 4,558,300 A | 12/1985 | Goldman |
| 4,630,057 A | 12/1986 | Martin |
| 4,636,795 A | 1/1987 | Dano |
| 4,651,156 A | 3/1987 | Martinez |
| 4,651,157 A | 3/1987 | Gray et al. |
| 4,660,037 A | 4/1987 | Nakamura |
| 4,670,758 A | 6/1987 | Campbell |
| 4,700,374 A | 10/1987 | Bini |
| 4,721,958 A | 1/1988 | Jenkin |
| 4,728,959 A | 3/1988 | Maloney et al. |
| 4,740,792 A | 4/1988 | Sagey et al. |
| 4,742,357 A | 5/1988 | Rackley |
| 4,743,913 A | 5/1988 | Takai |
| 4,750,197 A | 6/1988 | Denekamp et al. |
| 4,760,531 A | 7/1988 | Yasui et al. |
| 4,785,463 A | 11/1988 | Janc et al. |
| 4,791,572 A | 12/1988 | Green, III et al. |
| 4,799,062 A | 1/1989 | Sanderford, Jr. et al. |
| 4,806,940 A | 2/1989 | Harrel et al. |
| 4,812,980 A | 3/1989 | Yamada et al. |
| 4,814,711 A | 3/1989 | Olsen et al. |
| 4,818,998 A | 4/1989 | Apsell et al. |
| 4,857,840 A | 8/1989 | Lanchais |
| 4,860,352 A | 8/1989 | Laurance et al. |
| 4,864,313 A | 9/1989 | Konneker |
| 4,866,450 A | 9/1989 | Chisholm |
| 4,870,576 A | 9/1989 | Tornetta |
| 4,876,550 A | 10/1989 | Kelly |
| 4,876,738 A | 10/1989 | Selby |
| 4,879,713 A | 11/1989 | Ichiyoshi |
| 4,888,593 A | 12/1989 | Friedman et al. |
| 4,891,650 A | 1/1990 | Sheffer |
| 4,891,761 A | 1/1990 | Gray et al. |
| 4,893,325 A | 1/1990 | Pankonen et al. |
| 4,903,212 A | 2/1990 | Yokouchi et al. |
| 4,908,629 A | 3/1990 | Apsell et al. |
| 4,914,689 A | 4/1990 | Quade et al. |
| 4,924,491 A | 5/1990 | Compton et al. |
| 4,952,772 A | 8/1990 | Zana |
| 4,990,922 A | 2/1991 | Young et al. |
| 4,992,796 A | 2/1991 | Apostolos |
| 4,995,071 A | 2/1991 | Weber et al. |
| 5,003,317 A | 3/1991 | Gray et al. |
| 5,008,679 A | 4/1991 | Effland et al. |
| 5,017,926 A | 5/1991 | Ames et al. |
| 5,022,067 A | 6/1991 | Hughes |
| 5,022,751 A | 6/1991 | Howard |
| 5,032,989 A * | 7/1991 | Tornetta ............................ 705/1 |
| 5,034,898 A | 7/1991 | Lu et al. |
| 5,043,736 A | 8/1991 | Darnell et al. |
| 5,045,852 A | 9/1991 | Mitchell et al. |
| 5,045,861 A | 9/1991 | Duffett-Smith |
| 5,046,088 A | 9/1991 | Margulies |
| 5,055,851 A | 10/1991 | Sheffer |
| 5,067,153 A | 11/1991 | Willie et al. |
| 5,077,788 A | 12/1991 | Cook et al. |
| 5,092,343 A | 3/1992 | Spitzer et al. |
| 5,099,245 A | 3/1992 | Sagey |
| 5,109,399 A | 4/1992 | Thompson |
| 5,111,209 A | 5/1992 | Toriyama |
| 5,119,101 A | 6/1992 | Barnard |
| 5,119,102 A | 6/1992 | Barnard |
| 5,119,104 A | 6/1992 | Heller |
| 5,136,686 A | 8/1992 | Koza |
| 5,142,590 A | 8/1992 | Carpenter et al. |
| 5,153,909 A | 10/1992 | Beckle et al. |
| 5,155,490 A | 10/1992 | Spradley, Jr. et al. |
| 5,155,688 A | 10/1992 | Tanaka et al. |
| 5,155,689 A | 10/1992 | Wortham |
| 5,161,180 A | 11/1992 | Chavous |
| 5,163,004 A | 11/1992 | Rentz |
| 5,166,694 A | 11/1992 | Russell et al. |
| 5,177,489 A | 1/1993 | Hatch |
| 5,184,347 A | 2/1993 | Farwell et al. |
| 5,185,786 A | 2/1993 | Zwick |
| 5,191,342 A | 3/1993 | Alsup et al. |
| 5,193,110 A | 3/1993 | Jones et al. |
| 5,208,756 A | 5/1993 | Song |
| 5,208,757 A | 5/1993 | Appriou et al. |
| 5,210,540 A | 5/1993 | Masumoto |
| 5,212,765 A | 5/1993 | Skeirik |
| 5,212,804 A | 5/1993 | Choate |
| 5,214,789 A | 5/1993 | George |
| 5,216,611 A | 6/1993 | McElreath |
| 5,218,367 A | 6/1993 | Sheffer et al. |
| 5,218,618 A | 6/1993 | Sagey |
| 5,218,716 A | 6/1993 | Comroe et al. |
| 5,220,509 A | 6/1993 | Takemura et al. |
| 5,223,844 A | 6/1993 | Mansell et al. |
| 5,225,842 A | 7/1993 | Brown et al. |
| 5,233,541 A | 8/1993 | Corwin et al. |
| 5,235,630 A | 8/1993 | Moody et al. |
| 5,235,633 A | 8/1993 | Dennison et al. |
| 5,239,570 A | 8/1993 | Koster et al. |
| 5,243,530 A | 9/1993 | Stanifer et al. |
| 5,245,651 A | 9/1993 | Takashima et al. |
| 5,251,273 A | 10/1993 | Betts et al. |
| 5,257,195 A | 10/1993 | Hirata |
| 5,260,711 A | 11/1993 | Sterzer |
| 5,268,958 A | 12/1993 | Nakano |
| 5,276,451 A | 1/1994 | Odagawa |
| 5,278,892 A | 1/1994 | Bolliger et al. |
| 5,280,295 A | 1/1994 | Kelley et al. |
| 5,280,472 A | 1/1994 | Gilhousen et al. |
| 5,282,261 A | 1/1994 | Skeirik |
| 5,293,318 A | 3/1994 | Fukushima |
| 5,293,642 A | 3/1994 | Lo |
| 5,293,645 A | 3/1994 | Sood |
| 5,295,180 A | 3/1994 | Vendetti et al. |
| 5,299,260 A | 3/1994 | Shaio |
| 5,311,195 A | 5/1994 | Mathis et al. |
| 5,311,569 A | 5/1994 | Brozovich et al. |
| 5,317,323 A | 5/1994 | Kennedy et al. |
| 5,319,374 A | 6/1994 | Desai et al. |
| 5,323,444 A | 6/1994 | Ertz et al. |
| 5,325,419 A | 6/1994 | Connolly et al. |
| 5,327,144 A | 7/1994 | Stilp et al. |
| 5,331,550 A | 7/1994 | Stafford et al. |
| 5,334,974 A | 8/1994 | Simms et al. |
| 5,334,986 A | 8/1994 | Fernhout |
| 5,337,343 A | 8/1994 | Stickney |
| 5,339,351 A | 8/1994 | Hoskinson et al. |
| 5,345,245 A | 9/1994 | Ishikawa et al. |
| 5,347,567 A | 9/1994 | Moody et al. |
| 5,347,568 A | 9/1994 | Moody et al. |
| 5,349,631 A | 9/1994 | Lee |
| 5,359,521 A | 10/1994 | Kyrtsos et al. |
| 5,363,110 A | 11/1994 | Inamiya |
| 5,365,447 A | 11/1994 | Dennis |
| 5,365,450 A | 11/1994 | Schuchman et al. |
| 5,365,516 A | 11/1994 | Jandrell |
| 5,365,544 A | 11/1994 | Schilling |
| 5,367,555 A | 11/1994 | Isoyama |
| 5,373,456 A | 12/1994 | Ferkinhoff et al. |
| 5,373,546 A | 12/1994 | Holzermer |
| 5,374,933 A | 12/1994 | Kao |
| 5,379,224 A | 1/1995 | Brown et al. |
| 5,388,145 A | 2/1995 | Mulrow et al. |
| 5,388,147 A | 2/1995 | Grimes |
| 5,388,259 A | 2/1995 | Fleischman et al. |
| 5,389,934 A | 2/1995 | Kass |
| 5,390,339 A | 2/1995 | Bruckert et al. |
| 5,392,052 A | 2/1995 | Eberwine |
| 5,392,329 A | 2/1995 | Adams et al. |
| 5,394,158 A | 2/1995 | Chia |
| 5,394,333 A | 2/1995 | Kao |
| 5,394,435 A | 2/1995 | Weerackody |
| 5,394,445 A | 2/1995 | Ball et al. |
| 5,395,366 A | 3/1995 | D'Andrea et al. |
| 5,396,548 A | 3/1995 | Bayerl et al. |
| 5,398,277 A | 3/1995 | Martin, Jr. et al. |
| 5,398,302 A | 3/1995 | Thrift |
| 5,402,520 A | 3/1995 | Schnitta |

(56) References Cited

U.S. PATENT DOCUMENTS

| | | |
|---|---|---|
| 5,402,524 A | 3/1995 | Bauman et al. |
| 5,408,586 A | 4/1995 | Skeirik |
| 5,408,588 A | 4/1995 | Ulug |
| 5,410,737 A | 4/1995 | Jones |
| 5,412,388 A | 5/1995 | Attwood |
| 5,412,708 A | 5/1995 | Katz |
| 5,420,594 A | 5/1995 | FitzGerald et al. |
| 5,420,914 A | 5/1995 | Blumhardt |
| 5,422,813 A | 6/1995 | Schuchman et al. |
| 5,423,067 A | 6/1995 | Manabe |
| 5,425,136 A | 6/1995 | Lo et al. |
| 5,426,745 A | 6/1995 | Baji et al. |
| 5,428,546 A | 6/1995 | Shah et al. |
| 5,430,654 A | 7/1995 | Kyrtsos et al. |
| 5,432,841 A | 7/1995 | Rimer |
| 5,434,927 A | 7/1995 | Brady et al. |
| 5,434,950 A | 7/1995 | Kaallman |
| 5,438,517 A | 8/1995 | Sennott et al. |
| 5,438,644 A | 8/1995 | Fu |
| 5,438,688 A | 8/1995 | Masaki |
| 5,442,349 A | 8/1995 | Inoue et al. |
| 5,444,451 A | 8/1995 | Johnson et al. |
| 5,448,618 A | 9/1995 | Sandlerman |
| 5,448,754 A | 9/1995 | Ho et al. |
| 5,452,211 A | 9/1995 | Kyrtsos et al. |
| 5,457,736 A | 10/1995 | Cain et al. |
| 5,461,390 A | 10/1995 | Hoshen |
| 5,465,082 A | 11/1995 | Chaco |
| 5,467,282 A | 11/1995 | Dennis |
| 5,473,602 A | 12/1995 | McKenna et al. |
| 5,475,745 A | 12/1995 | Boyle |
| 5,477,458 A | 12/1995 | Loomis |
| 5,479,397 A | 12/1995 | Lee |
| 5,479,482 A | 12/1995 | Grimes |
| 5,485,163 A | 1/1996 | Singer et al. |
| 5,488,559 A | 1/1996 | Seymour |
| 5,490,073 A | 2/1996 | Kyrtsos |
| 5,502,757 A | 3/1996 | Bales et al. |
| 5,506,864 A | 4/1996 | Schilling |
| 5,508,707 A | 4/1996 | LeBlanc et al. |
| 5,508,708 A | 4/1996 | Ghosh et al. |
| 5,509,055 A | 4/1996 | Ehrlich et al. |
| 5,510,798 A | 4/1996 | Bauer |
| 5,510,801 A | 4/1996 | Engelbrecht et al. |
| 5,511,109 A | 4/1996 | Hartley et al. |
| 5,512,903 A | 4/1996 | Schmidtke |
| 5,512,904 A | 4/1996 | Bennett |
| 5,512,908 A | 4/1996 | Herrick |
| 5,513,111 A | 4/1996 | Wortham |
| 5,513,243 A | 4/1996 | Kage |
| 5,513,246 A | 4/1996 | Jonsson et al. |
| 5,515,285 A | 5/1996 | Garrett, Sr. et al. |
| 5,515,378 A | 5/1996 | Roy, III et al. |
| 5,515,419 A | 5/1996 | Sheffer |
| 5,517,419 A | 5/1996 | Lanckton et al. |
| 5,517,667 A | 5/1996 | Wang |
| 5,519,760 A | 5/1996 | Borkowski et al. |
| 5,526,001 A | 6/1996 | Rose et al. |
| 5,526,357 A | 6/1996 | Jandrell |
| 5,526,466 A | 6/1996 | Takizawa |
| 5,532,690 A | 7/1996 | Hertel |
| 5,533,100 A | 7/1996 | Bass et al. |
| 5,537,460 A | 7/1996 | Holliday, Jr. et al. |
| 5,546,092 A | 8/1996 | Kurokawa et al. |
| 5,546,445 A | 8/1996 | Dennison et al. |
| 5,552,772 A | 9/1996 | Janky et al. |
| 5,555,257 A | 9/1996 | Dent |
| 5,555,286 A | 9/1996 | Tendler |
| 5,555,503 A | 9/1996 | Kyrtsos et al. |
| 5,559,520 A | 9/1996 | Barzegar et al. |
| 5,559,878 A | 9/1996 | Keys et al. |
| 5,561,704 A | 10/1996 | Salimando |
| 5,563,611 A | 10/1996 | McGann et al. |
| 5,563,931 A | 10/1996 | Bishop et al. |
| 5,564,079 A | 10/1996 | Olsson |
| 5,565,858 A | 10/1996 | Guthrie |
| 5,570,412 A | 10/1996 | LeBlanc |
| 5,572,218 A | 11/1996 | Cohen et al. |
| 5,574,648 A | 11/1996 | Pilley |
| 5,577,169 A | 11/1996 | Prezioso |
| 5,579,368 A | 11/1996 | van Berkum |
| 5,579,535 A | 11/1996 | Orlen et al. |
| 5,581,490 A | 12/1996 | Ferkinhoff et al. |
| 5,581,596 A | 12/1996 | Hogan |
| 5,583,513 A | 12/1996 | Cohen |
| 5,583,517 A | 12/1996 | Yokev et al. |
| 5,586,178 A | 12/1996 | Koenig et al. |
| 5,588,038 A | 12/1996 | Snyder |
| 5,592,180 A | 1/1997 | Yokev et al. |
| 5,594,425 A | 1/1997 | Ladner et al. |
| 5,594,650 A | 1/1997 | Shah et al. |
| 5,594,740 A | 1/1997 | LaDue |
| 5,594,782 A | 1/1997 | Zicker et al. |
| 5,596,332 A | 1/1997 | Coles et al. |
| 5,596,625 A | 1/1997 | LeBlanc |
| 5,598,460 A | 1/1997 | Tendler |
| 5,600,705 A | 2/1997 | Maenpaa |
| 5,600,706 A | 2/1997 | Dunn et al. |
| 5,602,903 A | 2/1997 | LeBlanc et al. |
| 5,604,765 A | 2/1997 | Bruno et al. |
| 5,608,410 A | 3/1997 | Stilp et al. |
| 5,608,854 A | 3/1997 | Labedz et al. |
| 5,610,815 A | 3/1997 | Gudat et al. |
| 5,610,972 A | 3/1997 | Emery et al. |
| 5,611,704 A | 3/1997 | Kamizono et al. |
| 5,612,703 A | 3/1997 | Mallinckrodt |
| 5,612,864 A | 3/1997 | Henderson |
| 5,613,041 A | 3/1997 | Keeler et al. |
| 5,613,205 A | 3/1997 | Dufour |
| 5,614,914 A | 3/1997 | Bolgiano et al. |
| 5,617,565 A | 4/1997 | Augenbraun et al. |
| 5,619,522 A | 4/1997 | Dube |
| 5,619,552 A | 4/1997 | Karppanen et al. |
| 5,621,848 A | 4/1997 | Wang |
| 5,625,668 A | 4/1997 | Loomis et al. |
| 5,625,748 A | 4/1997 | McDonough et al. |
| 5,627,547 A | 5/1997 | Ramaswamy et al. |
| 5,627,549 A | 5/1997 | Park |
| 5,627,884 A | 5/1997 | Williams et al. |
| 5,629,707 A | 5/1997 | Heuvel et al. |
| 5,631,469 A | 5/1997 | Carrieri et al. |
| 5,631,656 A | 5/1997 | Hartman et al. |
| 5,634,051 A | 5/1997 | Thomson |
| 5,635,953 A | 6/1997 | Hayami et al. |
| 5,638,486 A | 6/1997 | Wang et al. |
| 5,640,103 A | 6/1997 | Petsche et al. |
| 5,642,285 A | 6/1997 | Woo et al. |
| 5,646,630 A | 7/1997 | Sheynblat et al. |
| 5,646,857 A | 7/1997 | McBurney et al. |
| 5,646,987 A | 7/1997 | Gerber et al. |
| 5,649,065 A | 7/1997 | Lo et al. |
| 5,652,570 A | 7/1997 | Lepkofker |
| 5,652,788 A | 7/1997 | Hara |
| 5,657,025 A | 8/1997 | Ebner et al. |
| 5,657,487 A | 8/1997 | Doner |
| 5,663,734 A | 9/1997 | Krasner |
| 5,673,322 A | 9/1997 | Pepe et al. |
| 5,675,344 A | 10/1997 | Tong et al. |
| 5,675,788 A | 10/1997 | Husick et al. |
| 5,686,924 A | 11/1997 | Trimble et al. |
| 5,689,270 A | 11/1997 | Kelley et al. |
| 5,689,548 A | 11/1997 | Maupin et al. |
| 5,701,328 A | 12/1997 | Schuchman et al. |
| 5,710,328 A | 1/1998 | Spivey et al. |
| 5,710,758 A | 1/1998 | Soliman et al. |
| 5,710,918 A | 1/1998 | Lagarde et al. |
| 5,712,900 A | 1/1998 | Maupin et al. |
| 5,715,306 A | 2/1998 | Sunderman et al. |
| 5,717,406 A | 2/1998 | Sanderford et al. |
| 5,717,737 A | 2/1998 | Doviak et al. |
| 5,719,584 A | 2/1998 | Otto |
| 5,724,047 A | 3/1998 | Lioio et al. |
| 5,724,648 A | 3/1998 | Shaughnessy et al. |
| 5,724,660 A | 3/1998 | Kauser et al. |

(56) References Cited

U.S. PATENT DOCUMENTS

| | | |
|---|---|---|
| 5,727,057 A | 3/1998 | Emery et al. |
| 5,729,549 A | 3/1998 | Kostreski et al. |
| 5,732,074 A | 3/1998 | Spaur et al. |
| 5,732,354 A | 3/1998 | MacDonald |
| 5,736,964 A | 4/1998 | Ghosh et al. |
| 5,737,431 A | 4/1998 | Brandstein et al. |
| 5,740,048 A | 4/1998 | Abel et al. |
| 5,740,049 A | 4/1998 | Kaise |
| 5,742,509 A | 4/1998 | Goldberg et al. |
| 5,742,905 A | 4/1998 | Pepe et al. |
| 5,754,955 A | 5/1998 | Ekbatani |
| 5,757,316 A | 5/1998 | Buchler |
| 5,761,278 A | 6/1998 | Pickett et al. |
| 5,764,756 A | 6/1998 | Onweller |
| 5,768,359 A | 6/1998 | DiPierro, Jr. et al. |
| 5,768,360 A | 6/1998 | Reynolds et al. |
| 5,771,280 A | 6/1998 | Johnson |
| 5,774,802 A | 6/1998 | Tell et al. |
| 5,774,805 A | 6/1998 | Zicker |
| 5,774,829 A | 6/1998 | Cisneros et al. |
| 5,774,869 A | 6/1998 | Toader |
| 5,786,773 A | 7/1998 | Murphy |
| 5,787,235 A | 7/1998 | Smith et al. |
| 5,787,354 A | 7/1998 | Gray et al. |
| 5,790,953 A | 8/1998 | Wang et al. |
| 5,790,974 A | 8/1998 | Tognazzini |
| 5,799,016 A | 8/1998 | Onweller |
| 5,799,061 A | 8/1998 | Melcher et al. |
| 5,802,454 A | 9/1998 | Goshay et al. |
| 5,802,492 A | 9/1998 | DeLorme et al. |
| 5,802,518 A | 9/1998 | Karaev et al. |
| 5,805,670 A | 9/1998 | Pons et al. |
| 5,809,415 A | 9/1998 | Rossmann |
| 5,815,538 A | 9/1998 | Grell et al. |
| 5,815,814 A | 9/1998 | Dennison et al. |
| RE35,916 E | 10/1998 | Dennison et al. |
| 5,819,273 A | 10/1998 | Vora et al. |
| 5,819,301 A | 10/1998 | Rowe et al. |
| 5,822,539 A | 10/1998 | van Hoff |
| 5,825,283 A | 10/1998 | Camhi |
| 5,831,977 A | 11/1998 | Dent |
| 5,832,059 A | 11/1998 | Aldred et al. |
| 5,832,367 A | 11/1998 | Bamburak et al. |
| 5,835,568 A | 11/1998 | Bass et al. |
| 5,835,857 A | 11/1998 | Otten |
| 5,835,907 A | 11/1998 | Newman |
| 5,838,562 A | 11/1998 | Gudat et al. |
| 5,841,396 A | 11/1998 | Krasner |
| 5,842,130 A | 11/1998 | Oprescu-Surcobe et al. |
| 5,844,522 A | 12/1998 | Sheffer et al. |
| 5,845,198 A | 12/1998 | Bamburak et al. |
| 5,845,267 A | 12/1998 | Ronen |
| 5,857,181 A | 1/1999 | Augenbraun et al. |
| 5,864,313 A | 1/1999 | Speck et al. |
| 5,864,755 A | 1/1999 | King et al. |
| 5,867,495 A | 2/1999 | Elliott et al. |
| 5,867,799 A | 2/1999 | Lang et al. |
| 5,870,029 A | 2/1999 | Otto et al. |
| 5,872,539 A | 2/1999 | Mullen |
| 5,873,040 A | 2/1999 | Dunn et al. |
| 5,873,076 A | 2/1999 | Barr et al. |
| 5,875,394 A | 2/1999 | Daly et al. |
| 5,875,401 A | 2/1999 | Rochkind |
| 5,883,598 A | 3/1999 | Parl et al. |
| 5,884,216 A | 3/1999 | Shah et al. |
| 5,890,068 A | 3/1999 | Fattouche et al. |
| 5,892,441 A | 4/1999 | Woolley et al. |
| 5,892,454 A | 4/1999 | Schipper et al. |
| 5,893,091 A | 4/1999 | Hunt et al. |
| 5,895,436 A | 4/1999 | Savoie et al. |
| 5,898,757 A | 4/1999 | Buhler et al. |
| 5,901,358 A | 5/1999 | Petty et al. |
| 5,902,351 A | 5/1999 | Streit et al. |
| 5,903,844 A | 5/1999 | Bruckert et al. |
| 5,904,727 A | 5/1999 | Prabhakaran |
| 5,905,455 A | 5/1999 | Heger et al. |
| 5,906,655 A | 5/1999 | Fan |
| 5,913,170 A | 6/1999 | Wortham |
| 5,914,675 A | 6/1999 | Tognazzini |
| 5,917,405 A | 6/1999 | Joao |
| 5,917,449 A | 6/1999 | Sanderford et al. |
| 5,917,866 A | 6/1999 | Pon |
| 5,920,873 A | 7/1999 | Van Huben et al. |
| 5,922,040 A | 7/1999 | Prabhakaran |
| 5,923,286 A | 7/1999 | Divakaruni |
| 5,924,090 A | 7/1999 | Krellenstein |
| 5,926,133 A | 7/1999 | Green, Jr. |
| 5,929,806 A | 7/1999 | Birchler et al. |
| 5,930,699 A | 7/1999 | Bhatia |
| 5,930,717 A | 7/1999 | Yost et al. |
| 5,933,421 A | 8/1999 | Alamouti et al. |
| 5,933,822 A | 8/1999 | Braden-Harder et al. |
| 5,936,572 A | 8/1999 | Loomis et al. |
| 5,938,721 A | 8/1999 | Dussell et al. |
| 5,940,474 A | 8/1999 | Ruus |
| 5,943,014 A | 8/1999 | Gilhousen |
| 5,945,944 A | 8/1999 | Krasner |
| 5,945,948 A | 8/1999 | Buford et al. |
| 5,948,040 A | 9/1999 | DeLorme et al. |
| 5,949,815 A | 9/1999 | Pon |
| 5,952,969 A | 9/1999 | Hagerman et al. |
| 5,959,568 A | 9/1999 | Woolley |
| 5,959,580 A | 9/1999 | Maloney et al. |
| 5,960,337 A | 9/1999 | Brewster et al. |
| 5,963,866 A | 10/1999 | Palamara et al. |
| 5,966,658 A | 10/1999 | Kennedy, III et al. |
| 5,969,673 A | 10/1999 | Bickley |
| 5,969,674 A | 10/1999 | von Der Embse et al. |
| 5,973,643 A | 10/1999 | Hawkes et al. |
| 5,977,913 A | 11/1999 | Christ |
| 5,978,840 A | 11/1999 | Nguyen et al. |
| 5,982,324 A | 11/1999 | Watters et al. |
| 5,982,891 A | 11/1999 | Ginter et al. |
| 5,983,161 A | 11/1999 | Lemelson et al. |
| 5,983,214 A | 11/1999 | Lang et al. |
| 5,987,329 A | 11/1999 | Yost et al. |
| 5,999,124 A | 12/1999 | Sheynblat |
| 5,999,126 A | 12/1999 | Ito |
| 6,009,334 A | 12/1999 | Grubeck et al. |
| 6,011,841 A | 1/2000 | Isono |
| 6,011,844 A | 1/2000 | Uppaluru et al. |
| 6,012,013 A | 1/2000 | McBurney |
| 6,014,102 A | 1/2000 | Mitzlaff et al. |
| 6,014,555 A | 1/2000 | Tendler |
| 6,021,371 A | 2/2000 | Fultz |
| 6,023,241 A | 2/2000 | Clapper |
| 6,026,304 A | 2/2000 | Hilsenrath et al. |
| 6,026,345 A | 2/2000 | Shah et al. |
| 6,028,551 A | 2/2000 | Schoen et al. |
| 6,029,161 A | 2/2000 | Lang et al. |
| 6,031,490 A | 2/2000 | Forssen et al. |
| 6,034,635 A | 3/2000 | Gilhousen |
| 6,038,668 A | 3/2000 | Chipman et al. |
| 6,046,683 A | 4/2000 | Pidwerbetsky et al. |
| 6,047,192 A | 4/2000 | Maloney et al. |
| 6,054,928 A | 4/2000 | Lemelson et al. |
| 6,061,064 A | 5/2000 | Reichlen |
| 6,064,339 A | 5/2000 | Wax et al. |
| 6,064,722 A | 5/2000 | Clise et al. |
| 6,064,942 A | 5/2000 | Johnson et al. |
| 6,073,004 A | 6/2000 | Balachandran |
| 6,073,005 A | 6/2000 | Raith et al. |
| 6,075,853 A | 6/2000 | Boeckman et al. |
| 6,094,573 A | 7/2000 | Heinonen et al. |
| 6,097,958 A | 8/2000 | Bergen |
| 6,101,178 A | 8/2000 | Beal |
| 6,101,390 A | 8/2000 | Jayaraman et al. |
| 6,101,391 A | 8/2000 | Lshizuka et al. |
| 6,108,555 A | 8/2000 | Maloney et al. |
| 6,115,611 A | 9/2000 | Kimoto et al. |
| 6,122,520 A | 9/2000 | Want et al. |
| 6,128,501 A | 10/2000 | Ffoulkes-Jones |
| 6,131,067 A | 10/2000 | Girerd et al. |
| 6,138,003 A | 10/2000 | Kingdon et al. |

(56) References Cited

U.S. PATENT DOCUMENTS

| | | |
|---|---|---|
| 6,154,727 A | 11/2000 | Karp et al. |
| 6,154,745 A | 11/2000 | Kari et al. |
| 6,157,621 A | 12/2000 | Brown et al. |
| 6,167,274 A | 12/2000 | Smith |
| 6,169,902 B1 | 1/2001 | Kawamoto |
| 6,173,166 B1 | 1/2001 | Whitecar |
| 6,185,427 B1 | 2/2001 | Krasner et al. |
| 6,208,290 B1 | 3/2001 | Krasner |
| 6,208,721 B1 | 3/2001 | Feinberg et al. |
| 6,236,358 B1 | 5/2001 | Durst et al. |
| 6,236,365 B1 | 5/2001 | LeBlanc et al. |
| 6,240,285 B1 | 5/2001 | Blum et al. |
| 6,243,039 B1 | 6/2001 | Elliot |
| 6,243,587 B1 | 6/2001 | Dent et al. |
| 6,249,245 B1 | 6/2001 | Watters et al. |
| 6,249,252 B1 | 6/2001 | Dupray |
| 6,275,305 B1 | 8/2001 | Shimada |
| 6,275,773 B1 | 8/2001 | Lemelson et al. |
| 6,292,549 B1 | 9/2001 | Lung et al. |
| 6,292,799 B1 | 9/2001 | Peek et al. |
| 6,295,502 B1 | 9/2001 | Hancock et al. |
| 6,301,463 B1 | 10/2001 | Dao et al. |
| 6,304,833 B1 | 10/2001 | Ferkinhoff et al. |
| 6,308,072 B1 | 10/2001 | Labedz et al. |
| 6,317,718 B1 | 11/2001 | Fano |
| 6,321,092 B1 | 11/2001 | Fitch et al. |
| 6,323,894 B1 | 11/2001 | Katz |
| 6,324,276 B1 | 11/2001 | Uppaluru et al. |
| 6,324,404 B1 | 11/2001 | Dennison et al. |
| 6,327,342 B1 | 12/2001 | Mobley et al. |
| 6,330,452 B1 | 12/2001 | Fattouche et al. |
| 6,349,134 B1 | 2/2002 | Katz |
| 6,363,254 B1 | 3/2002 | Jones et al. |
| 6,370,234 B1 | 4/2002 | Kroll |
| 6,381,324 B1 | 4/2002 | Shaffer et al. |
| 6,381,329 B1 | 4/2002 | Uppaluru et al. |
| 6,381,464 B1 | 4/2002 | Vannucci |
| 6,385,312 B1 | 5/2002 | Shaffer et al. |
| 6,385,541 B1 | 5/2002 | Blumberg et al. |
| 6,393,346 B1 | 5/2002 | Keith et al. |
| 6,408,307 B1 | 6/2002 | Semple et al. |
| 6,415,291 B2 | 7/2002 | Bouve et al. |
| 6,418,208 B1 | 7/2002 | Gundlach et al. |
| 6,430,411 B1 | 8/2002 | Lempio et al. |
| 6,434,223 B2 | 8/2002 | Katz |
| 6,438,380 B1 | 8/2002 | Bi et al. |
| 6,445,784 B2 | 9/2002 | Uppaluru et al. |
| 6,459,782 B1 | 10/2002 | Bedrosian et al. |
| 6,477,362 B1 | 11/2002 | Raith et al. |
| 6,487,500 B2 | 11/2002 | Lemelson et al. |
| 6,490,450 B1 | 12/2002 | Batni et al. |
| 6,493,439 B2 | 12/2002 | Lung et al. |
| 6,496,776 B1 | 12/2002 | Blumberg et al. |
| 6,512,415 B1 | 1/2003 | Katz |
| 6,519,232 B1 | 2/2003 | Becher |
| 6,519,463 B2 | 2/2003 | Tendler |
| 6,522,875 B1 | 2/2003 | Dowling et al. |
| 6,529,143 B2 | 3/2003 | Mikkola et al. |
| 6,529,722 B1 | 3/2003 | Heinrich et al. |
| 6,539,077 B1 | 3/2003 | Ranalli et al. |
| 6,549,130 B1 | 4/2003 | Joao |
| 6,549,768 B1 | 4/2003 | Fraccaroli |
| 6,563,921 B1 | 5/2003 | Williams et al. |
| 6,570,967 B2 | 5/2003 | Katz |
| 6,570,975 B2 | 5/2003 | Shaffer et al. |
| 6,571,279 B1 | 5/2003 | Herz et al. |
| 6,574,318 B1 | 6/2003 | Cannon et al. |
| 6,577,714 B1 | 6/2003 | Darcie et al. |
| 6,587,546 B2 | 7/2003 | Stumer et al. |
| 6,591,112 B1 | 7/2003 | Siccardo et al. |
| 6,594,483 B2 | 7/2003 | Nykanen et al. |
| 6,597,983 B2 | 7/2003 | Hancock |
| 6,608,892 B2 | 8/2003 | Shaffer et al. |
| 6,622,020 B1 | 9/2003 | Seki |
| 6,625,437 B1 | 9/2003 | Jampolsky et al. |
| 6,628,755 B2 | 9/2003 | Shimada et al. |
| 6,650,902 B1 | 11/2003 | Richton |
| 6,650,998 B1 | 11/2003 | Rutledge et al. |
| 6,661,884 B2 | 12/2003 | Shaffer et al. |
| 6,677,894 B2 | 1/2004 | Sheynblat et al. |
| 6,678,356 B2 | 1/2004 | Stumer et al. |
| 6,678,357 B2 | 1/2004 | Stumer et al. |
| 6,678,360 B1 | 1/2004 | Katz |
| 6,683,538 B1 | 1/2004 | Wilkes, Jr. |
| 6,707,421 B1 | 3/2004 | Drury et al. |
| 6,721,399 B1 | 4/2004 | Beyda |
| 6,724,860 B2 | 4/2004 | Stumer et al. |
| 6,741,927 B2 | 5/2004 | Jones |
| 6,744,857 B2 | 6/2004 | Stumer |
| 6,744,858 B1 | 6/2004 | Ryan et al. |
| 6,748,057 B2 | 6/2004 | Ranalli et al. |
| 6,748,226 B1 | 6/2004 | Wortham |
| 6,748,318 B1 | 6/2004 | Jones |
| 6,751,626 B2 | 6/2004 | Brown et al. |
| 6,754,334 B2 | 6/2004 | Williams et al. |
| 6,754,482 B1 | 6/2004 | Torabi |
| 6,757,359 B2 | 6/2004 | Stumer et al. |
| 6,760,601 B1 | 7/2004 | Suoknuuti et al. |
| 6,813,501 B2 | 11/2004 | Kinnunen et al. |
| 6,826,405 B2 | 11/2004 | Doviak et al. |
| 6,826,481 B2 | 11/2004 | Root et al. |
| 6,834,195 B2 | 12/2004 | Brandenberg et al. |
| 6,839,628 B1 | 1/2005 | Tu |
| 6,845,400 B2 | 1/2005 | Macpherson et al. |
| 6,850,600 B1 | 2/2005 | Boeckman et al. |
| 6,868,139 B2 | 3/2005 | Stumer et al. |
| 6,871,140 B1 | 3/2005 | Florance et al. |
| 6,873,850 B2 | 3/2005 | Dowling et al. |
| 6,888,936 B1 | 5/2005 | Groen et al. |
| 6,889,139 B2 | 5/2005 | Prabhakaran |
| 6,950,876 B2 | 9/2005 | Bright et al. |
| 6,952,101 B2 | 10/2005 | Gupta |
| 6,952,181 B2 | 10/2005 | Karr et al. |
| 6,952,645 B1 | 10/2005 | Jones |
| 6,980,631 B1 | 12/2005 | Danzl et al. |
| 6,980,636 B2 | 12/2005 | Fleischer, III et al. |
| 6,985,742 B1 | 1/2006 | Giniger et al. |
| 6,993,118 B2 | 1/2006 | Antonucci et al. |
| 6,996,219 B2 | 2/2006 | Rodriguez et al. |
| 6,999,779 B1 | 2/2006 | Hashimoto |
| 7,003,081 B2 | 2/2006 | Stumer et al. |
| 7,019,770 B1 | 3/2006 | Katz |
| 7,031,724 B2 | 4/2006 | Ross et al. |
| 7,047,019 B1 | 5/2006 | Cox et al. |
| 7,050,818 B2 | 5/2006 | Tendler |
| 7,051,018 B2 | 5/2006 | Reed et al. |
| 7,054,432 B2 | 5/2006 | Sabinson et al. |
| 7,065,192 B2 | 6/2006 | Danzl et al. |
| 7,103,153 B2 | 9/2006 | Stumer et al. |
| 7,107,256 B2 | 9/2006 | Nakajima et al. |
| 7,114,651 B2 | 10/2006 | Hjelmvik |
| 7,136,473 B2 | 11/2006 | Gruchala et al. |
| 7,136,474 B2 | 11/2006 | Shaffer et al. |
| 7,167,553 B2 | 1/2007 | Shaffer et al. |
| 7,171,189 B2 | 1/2007 | Bianconi et al. |
| 7,177,397 B2 | 2/2007 | McCalmont et al. |
| 7,177,400 B2 | 2/2007 | Eisner et al. |
| 7,190,774 B2 | 3/2007 | McFarland |
| 7,228,140 B2 | 6/2007 | Anctil et al. |
| 7,245,910 B2 | 7/2007 | Osmo |
| 7,274,332 B1 | 9/2007 | Dupray |
| 7,660,437 B2 | 2/2010 | Breed |
| 7,812,766 B2 | 10/2010 | LeBlanc et al. |
| 2001/0022558 A1 | 9/2001 | Dupray et al. |
| 2002/0035605 A1 | 3/2002 | McDowell et al. |
| 2002/0087389 A1* | 7/2002 | Sklarz et al. ............ 705/10 |
| 2002/0111154 A1 | 8/2002 | Eldering et al. |
| 2003/0032409 A1 | 2/2003 | Hutcheson et al. |
| 2003/0033176 A1* | 2/2003 | Hancock ............ 705/6 |
| 2003/0040324 A1 | 2/2003 | Eldering et al. |
| 2003/0064705 A1* | 4/2003 | Desiderio ............ 455/412 |
| 2003/0126250 A1 | 7/2003 | Jhanji |
| 2003/0146871 A1 | 8/2003 | Dupray et al. |
| 2003/0148774 A1 | 8/2003 | Naghian et al. |

(56) References Cited

U.S. PATENT DOCUMENTS

| | | | |
|---|---|---|---|
| 2003/0222820 A1 | 12/2003 | Dupray et al. | |
| 2004/0030616 A1* | 2/2004 | Florance et al. | 705/27 |
| 2004/0030631 A1* | 2/2004 | Brown et al. | 705/37 |
| 2004/0198386 A1 | 10/2004 | Dupray | |
| 2004/0266457 A1 | 12/2004 | Dupray | |
| 2005/0288958 A1* | 12/2005 | Eraker et al. | 705/1 |
| 2006/0106625 A1 | 5/2006 | Brown | |
| 2006/0294147 A1 | 12/2006 | Root et al. | |
| 2007/0043770 A1 | 2/2007 | Goodrich et al. | |
| 2007/0150387 A1* | 6/2007 | Seubert et al. | 705/31 |
| 2009/0030707 A1 | 1/2009 | Green | |
| 2010/0063829 A1 | 3/2010 | Dupray | |
| 2010/0234045 A1 | 9/2010 | Karr et al. | |
| 2012/0058775 A1 | 3/2012 | Dupray et al. | |
| 2012/0190380 A1 | 7/2012 | Dupray et al. | |

FOREIGN PATENT DOCUMENTS

| | | |
|---|---|---|
| EP | 0546758 | 6/1993 |
| EP | 0592560 | 4/1994 |
| EP | 0689369 | 12/1995 |
| EP | 0762363 | 3/1997 |
| EP | 0781067 | 6/1997 |
| EP | 0810449 | 12/1997 |
| EP | 0811296 | 12/1997 |
| EP | 0860710 | 8/1998 |
| EP | 0870203 | 10/1998 |
| EP | 0923817 | 6/1999 |
| EP | 2541203 | 1/2013 |
| GB | 1605207 | 10/1983 |
| GB | 2155720 | 9/1985 |
| GB | 2180425 | 3/1987 |
| GB | 2291300 | 1/1996 |
| JP | 272258 | 6/1983 |
| JP | 62-284277 | 12/1987 |
| JP | 05-300081 | 11/1993 |
| JP | 06-003431 | 1/1994 |
| JP | 06-003433 | 1/1994 |
| JP | 06-066919 | 3/1994 |
| JP | 06-066920 | 3/1994 |
| JP | 06-148308 | 5/1994 |
| JP | 07-055912 | 3/1995 |
| JP | 08-184451 | 7/1996 |
| JP | 10-013961 | 1/1998 |
| JP | 10-221106 | 8/1998 |
| JP | 11-064482 | 3/1999 |
| JP | 11-258325 | 9/1999 |
| JP | 11-289574 | 10/1999 |
| JP | 11-306491 | 11/1999 |
| WO | WO 92/02105 | 2/1992 |
| WO | WO 93/04453 | 3/1993 |
| WO | WO 94/01978 | 1/1994 |
| WO | WO 94/06221 | 3/1994 |
| WO | WO 94/11853 | 5/1994 |
| WO | WO 94/15412 | 7/1994 |
| WO | WO 94/27161 | 11/1994 |
| WO | WO 95/14335 | 5/1995 |
| WO | WO 95/18354 | 7/1995 |
| WO | WO 95/23981 | 9/1995 |
| WO | WO 95/34177 | 12/1995 |
| WO | WO 96/14588 | 5/1996 |
| WO | WO 96/20542 | 7/1996 |
| WO | WO 97/01228 | 1/1997 |
| WO | WO 97/14054 | 4/1997 |
| WO | WO 97/22888 | 6/1997 |
| WO | WO 97/23785 | 7/1997 |
| WO | WO 97/24010 | 7/1997 |
| WO | WO 97/26750 | 7/1997 |
| WO | WO 97/28455 | 8/1997 |
| WO | WO 97/38326 | 10/1997 |
| WO | WO 97/38540 | 10/1997 |
| WO | WO 97/41654 | 11/1997 |
| WO | WO 97/50002 | 12/1997 |
| WO | WO 98/00982 | 1/1998 |
| WO | WO 98/02824 | 1/1998 |
| WO | WO 98/08314 | 2/1998 |
| WO | WO 98/10307 | 3/1998 |
| WO | WO 98/14018 | 4/1998 |
| WO | WO 98/25157 | 6/1998 |
| WO | WO 98/40837 | 9/1998 |
| WO | WO 98/59506 | 12/1998 |
| WO | WO 99/33293 | 7/1999 |
| WO | WO 99/45732 | 9/1999 |
| WO | WO 00/04730 | 1/2000 |
| WO | WO 00/29979 | 5/2000 |
| WO | WO 00/41090 | 7/2000 |
| WO | WO 00/41412 | 7/2000 |
| WO | WO 00/50844 | 8/2000 |
| WO | WO 01/44998 | 6/2001 |
| WO | WO 01/95642 | 12/2001 |
| WO | WO 02/065250 | 8/2002 |

OTHER PUBLICATIONS

U.S. Appl. No. 08/246,149, filed May 19, 1994, Lepkofker.
U.S. Appl. No. 08/355,901, filed Dec. 13, 1994, Schoen.
U.S. Appl. No. 09/194,367, filed Nov. 24, 1998, Dupray.
U.S. Appl. No. 60/017,269, filed May 13, 1996, Maloney.
U.S. Appl. No. 60/017,899, filed May 17, 1996, Maloney.
U.S. Appl. No. 60/025,855, filed Sep. 9, 1996, Leblanc.
U.S. Appl. No. 60/035,961, filed Jan. 16, 1997, Maloney.
U.S. Appl. No. 60/038,037, filed Feb. 7, 1997, Christ.
"Argos: Basic Description of the Argos System," Argos, 7 pages, 1999.
"Location Systems and Technologies," 1994, Wireless Emergency Services JEM Report, Annex A pp. 42-46 and Appendix A pp. 1-2.
"Services Beyond Airtime," Release concerning RadioCamera™, available at http:/www.uswcorp.com/laby.htm, printed Sep. 14, 1998, 10 pages.
"The Measearch Engine Years: Fit the First," 1992, http://www.conman.org/people/spc/refs/search.hpl.html, pp. 1-3.
Abowd et al., "A Mobile context-Aware Tour Guide," Sep. 23, 1996, Baltzer Journals.
Abowd et al., "A Mobile context-Aware Tour Guide," Wireless Networks, vol. 3, 1997, pp. 421-433.
Baldazo, "Navigating with a Web Compass: Quarterdeck Harnessess Leading-edge "Metasearch" Technology to Create a Smart Agent that Searches the Web and organizes the Results," BYTE, Mar. 1996, pp. 97-98.
Bass, Tim, "Intrusion Detection Systems and Multisensor Data Fusion: Creating Cyberspace Situational Awareness," Communications of the ACM, Apr. 2000, vol. 43, No. 4.
Beck et al., "Simulation Results on the Downlink of a Qualcomm-like DS-CDMA-System Over Multipath fading channels," Sep. 1994, pp. 1-7.
Botafogo, "Cluster Analysis for Hypertext Systems," ACM-SIRIG, Jun. 1993, pp. 116-124.
Brumitt et al., "EasyLiving: Technologies for Intelligent Environments," 2000, pp. 1-12.
Caffery et al., "Overview of Radiolocation in CDMA Cellular Systems," IEEE Communications Magazine, Apr. 1998, pp. 38-45.
Caffery et al., "Radio Location in Urban CDMA Microcells," International Symposium on Personal, Indoor, and Mobil Radio Communications, Sep. 1995, 5 pages.
Caffery, J. et al., "Vehicle Location and Tracking for IVHS in CDMA Microcells," International Symposium on Personal, Indoor, and Mobile Radio Communications, Sep. 1994, pp. 1227-1231.
Callan, James P. et al., "Searching Distributed Collections With Inference Networks," 18th Annual International ACM SIGIR Conference on Research and Development in Information Retrieval, 1995.
Campadello et al., "Using Mobile and Intelligent Agents to Support Nomadic Users," 6th International Conference of Intelligence in Networks (ICIN2000), Jan. 17-20, 2000, Bordeaux, France.
CC Docket No. 94-102, Before the Federal Communications Commission, in the Matter of Revision of the Commission's Rules to Ensure Compatibility with Enhanced 911 Emergency Calling Systems; "Comments of Harris Government Communication Systems Division a Division of Harris Corporation", filed Sep. 25, 1996.

(56) References Cited

OTHER PUBLICATIONS

CC Docket No. 94-102, Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.

CC Docket No. 94-102, Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from GeoTek Communications, Inc. received Apr. 14, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.

CC Docket No. 94-102, Before the Federal Communications Commission, in the Matter of Revision of the Commission's Rules to Ensure Compatibility with Enhanced 911 Emergency Calling Systems; ex parte communication from XYP0INT Corporation, Inc. received Jul. 28, 1997 by the Commission.

Chan et al., "Multipath Propagation Effects on a CDMA Cellular System," IEEE, 1994, pp. 848-855.

Cheverst et al., "Experiences of Developing and Deploying a Context-Aware Tourist Guide: The Guide Project;" Mobile Computing Networking 2000, pp. 20-31 (url = "citeseer.ist.psu.edu/cheverst00experiences.html").

Cheverst, et al. "Using context as a Crystal Ball: Rewards and Pitfalls," Distributed Multimedia Research Group, Pub. Yr. 2000, Dept. of Computing, Lancaster University, Lancaster, LA14YR, U.K., 5 pages.

Dailey, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.

Dailey, D.J., et al., "ITS Data Fusion," Final Research Report, Research Project T9903, Task 9, ATIS/ATMS Regional IVHS Demonstration, University of Washington, Apr. 1996.

Dartmouth College, "Soldiers, Agents and Wireless Networks: A Report on a Military Application," PAAM 2000.

Dey, "Understanding and Using Context," Personal and Ubiquitous Computing Journal, vol. 5(1), 2001., pp. 4-7.

Driscoll, "Wireless Caller Location Systems," GSP World Advanstar Communications, Inc., 1998, www.gpsworld.com/1198/1198driscol.html, pp. 1-8.

Dutta et al., "Modified Adaptive Multiuser Detector for DS-CDMA in Multipath Fading," Prior to Dec. 22, 1997, pp. 1-7.

Ergon Proprietary, "Performance Analyses Brief: Microminiature Emergency Locator Systems (MELS)," May 1996.

Evans, "New Satellites for Personal Communications," Scientific American, 1998, vol. 278(4), pp. 70-77.

Fechner et al., "A Hybrid Neural Network Architecture for Automatic Object Recognition," IEEE, 1994, pp. 187-194.

Fels et al., "Progress of C-Map: A Context-Aware Mobile Assistant," ATR Media Integration & Communication Research Laboratories, Seida-cho, Soraku-gun, Kyoto, 619-02, Japan, Publication year 1998.

Gallant, "Neural Network Learning and Expert Systems," the MIT Press, 1994, pp. 132-137.

Gaspard et al., "Position Assignment in Digital Cellular Mobile Radio Networks (e.g. GSM) derived from Measurements at the Protocol Interface," Prior to Dec. 22, 1997, pp. 1-5.

Goldsmith et al., "A Measurement-Based Model for Predicting Coverage Areas of Urban Microcells," IEEE, 1993, pp. 1013-1023.

Goodman, "The Wireless Internet: Promises and Challenges," IEEE, 2000, pp. 1-6.

Hills, "Terrestrial Wireless Networks," Scientific American, 1998, vol. 278(4), pp. 86-91.

Ichitsubo et al., "A Statistical Model for Microcellular Multipath Propagation Environment," Prior to Dec. 22, 1997, Wireless Systems Laboratories, pp. 1-6.

Iida et al. "Multi-Agent Architecture for Seamless Personal Communications," NetMedia Research Center, Fujitsu Laboratories Ltd., 1999, pp. 1-7.

Iwayama et al., "Cluster-Based Text Catagorization: A Comparison of Category Search Strategies," ACM-SIGIR, 1995, pp. 273-279.

Johnson, "Smart Technology Busting Out All Over Web," Electronic Engineering Times, Jun. 15, 1998, vol. 1012, pp. 1-6.

Junius et al., "New Methods for Processing GSM Radio Measurement Data: Applications for Locating, Handover, and Network Management," Communication Network, 1994, Aachen University of Technology, pp. 338-342.

Karanta, Ilkka, "Intelligent Agents in Mobile Services", VTT Information Technolgy, Oct. 2, 1997.

Kennemann, Olrik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.

Kosko, "Fuzzy Systems as Universal Approximators," IEEE, 1994, pp. 1329-1333.

Lawrence et al., "Northern Light Search Engine Leads the Pack-Others Fall Behind," Online Newsletter, May 1, 1998, vol. 19(5), pp. 1-2.

Lepkofker; U.S. Appl. No. 08/246,149 Entitled Individual Location System; May 19, 1994.

Long et al., "Rapid Prototyping of Mobile Context-Aware Applications: The Cyberguide Case Study," 2nd ACM International Conference on Mobile Computing and Networking, 1996 (MobiCom '96).

Loran, "Users Handbook 1992 Edition," U.S. Coast Guard, Radionavigation Division, 1992, 28 pages.

Low, "Comparison of Urban Propagation Models with CW-Measurements," IEEE Deutsche Bundespost Telekom, 1992, pp. 936-942.

Maloney; U.S. Appl. No. 60/035,691, filed Jan. 16, 1997 Entitled "Robust, Efficienct, Localization System".

Mardiraju et al., "Neural Networks for Robust Image Feature Classification: A Comparative Study," IEEE, 1994, pp. 423-430.

Marmasse et al., "Location-aware Information Delivery with comMotion," Mit Media Laboratory, 20 Ames Street, Combridge, MA 02139, USA, Publication: HUC 2000 Proceeding, pp. 157-171, publication year 2000.

Meadow, "Text Information Retrieval Systems," Academic Press, 1992, pp. 204-209.

Miller, RT, et al., "Protein fold recognition by sequence threading: tools and assessment techniques," Journal Announcement, Department of Biochemistry and Molecular Biology, University College, London, United Kingdom, Jan. 1996.

Mynatt et al., "Designing Audio Aura," published in CHI '98 Conference Proceedings, 1998.

Newton, "The Near-Term Potential of Doppler Location," John Hopkins APL Technical Digest, 1981, pp. 16-31.

Notess, "Internet Search Engine Update," Online, Jul. 1, 1998, vol. v22:nr, pp. 1-3.

Orphanoudakis, C.E. et al., "I2 Cnet: Content-Based Similarity Search in Geographically Distributed Repositories of Medical Images," Computerized Medical Imaging and Graphics, 1996, vol. 20(4), pp. 193-207.

(56) References Cited

OTHER PUBLICATIONS

Pascoe et al., "Human-Computer-Giraffe Interaction: HCI in the Field," Workshop on Human Computer Interaction with Mobile Devices, Glasgow, Scotland, 1998.
Pelton, "Telecommunications for the 21st Century," Scientific American, 1998, vol. 278(4), pp. 80-85.
Pitoura et al., "Locating Objects in Mobile Computing," IEEE, 2001, pp. 1-43.
Pop et al., "Site Engineering for Indoor Wireless Spread Spectrum Communications," Jun. 2001, 3 pages.
Ramanathan et al., "A Survey of Routing Techniques for Mobile Communications Networks," Mobile Networks and Applications, Oct. 1996, vol. 1(2), pp. 1-31.
Randell et al, "The Shopping Jacket: Wearable Computing for the Consumer", Personal Technologies, 4, 2000, pp. 241-244.
Rizzo et al., "Integration of Location Services in the Open Distributed Office," Technical Report 14-94, Computing Laboratory, University of Kent, Cantebury, United Kingdom, Aug. 1994, pp. 1-14.
Salcic, "AGPCS—An Automatic GSM-based Positioning and Communication System," Proceedings of GeoComputation 1997 & SIRC 1997, Aug. 1997, pp. 15-22.
Schopp, Michael, "User Modelling and Performance Evaluation of Distributed Location Management for Personal Communications Services," Proceedings of the 15th International Teletraffic Congress (ITC) 15, Washington, D.C., 1997, S. 23-34.
Smith, Jr., "Passive Location of Mobile Cellular Telephone Terminals," IEEE, CH3031-2/91/0000-0221, 1991, pp. 221-225.
Sousa et al., "Delay Spread Measurements for the Digital Cellular Channel in Toronto," IEEE, 1994, pp. 837-847.
Spiteri et al., "An Architecture to Support Storage and Retrieval of Events," Proceedings of Middleware 1998, IFIP International Conference on Distributed Systems Platfors and Open Distributed Processing, Lancaster, UK, Sep. 1998.
Stefano et al., "Using Mobile and Intelligent Agents to Support Nomadic Users", 6th International Conference of Intelligence in Networks (ICIN2000), Jan. 17-20, 2000, Bordeaux, France.
Striglis et al., "A Multistage RAKE Receiver for Improved Capacity of CDMA Systems," IEEE Vehicular Technology Conference, 1994, pp. 1-5.
Stutzmann et al., "Moving Beyond Wireless Voice Systems," Scientific American, 1998, vol. 278(4), pp. 92-93.
Wang Baldonado et al., "SenseMaker: An Information-Exploration Interface Supporting the Contextual Evolution of a User's Interests," ACM-CHI, 1997, pp. 11-18.
Weiss et al., "HyPursuit: A Hierarcical Network Search Engine that Exploits Content-Link Hypertext Clustering," Hypertext, 1996, pp. 180-193.
Wittenben et al., "A Low Cost Noncoherent Receiver with Adaptive Antenna Combining for High Speed Wireless Lans," Prior to Dec. 22, 1997, ASCOM Systec AG, pp. 1-4.
Wolfle et al., "Field Strength Prediction in Indoor Environments with Neural Networks," Prior to Dec. 22, 1997, pp. 1-5.
Wylie et al., "The Non-Line of Sight Problem in Mobile Location Estimation," Proc. IEEE ICUPC, 1996, pp. 827-831.
Official Action for related U.S. Appl. No. 12/206,712, dated Sep. 8, 2009.
U.S. Appl. No. 13/831,674, filed Mar. 15, 2013, Dupray et al.
U.S. Appl. No. 13/844,708, filed Mar. 15, 2013, Dupray et al.
U.S. Appl. No. 13/843,204, filed Mar. 15, 2013, LeBlanc et al.
U.S. Appl. No. 13/844,500, filed Mar. 15, 2013, Dupray et al.
CC Docket No. 94-102, Before the Federal Communications Commission, in the Matter of Revision of the Commission's Rules to Ensure Compatibility with Enhanced 911 Emergency Calling Systems; "US West Comments," filed Jan. 9, 1995, 81 pages.
"A Unique Solution—Highway Master: Becoming the Mobile Communications System of Choice by Owner-Operators," Landline Magazine, Nov./Dec. 1994, pp. 30-32.
"A310/A300 Flight Management System Pilot's Guide," Honeywell, Inc., Dec. 1993, 441 pages.
"AVL FSD," OCS Technologies—DCP, Tampa Division, Jun. 10, 1993, 11 pages.
"AVL Markets: More Than Position Reporting," Phillips Business Information, Inc. Global Positioning & Navigation News, LexisNexis, Aug. 8, 1996, 3 pages.
"Finally, There is a Mobile Communication System for the Transportation Industry with a Real Ring to it," Highway Master Mobile Communication & Information Systems, 1993, 7 pages.
"GM Safety Technology," General Motors Corporation, 2000, 2 pages.
"Integrated software solutions for the criminal justice system," OCS Technologies Corporation, 1993, 4 pages.
"Mid-Am installs voice communications," Milk & Liquid Food Transporter, May 1994, vol. 34(5), 1 page.
"Mid-America Dairymen Picks Highway Master," Refrigerated Transport, Mar. 1994, 1 page.
"Presenting the most advanced AVLS available," Magnavox Advanced Products and Systems Company, 1988, 6 pages.
"Successful test of satellite-based landing system may open new era in aircraft navigation," Business Editors/Aviation Writers, Oct. 19, 1994, 4 pages.
"TravTek Evaluation Plan," prepared by Farradyne Systems, Inc. For the Federal Highway Administration, Apr. 1991, 62 pages.
1990-91 Aviation System Capacity Plan, U.S. Dot and FAA, Dec. 1990, 323 pages.
AIM/FAR 1994: Airman's Information Manual / Federal Aviation Regulations, TAB AERO, Division of McGraw-Hill, 1994, pp. 89-91.
AJ Systems, "Final Report and GPS System Specification for Shipboard Tacan Replacement," submitted to Naval Air Development Center, Nov. 1991, 195 pages.
Antonio et al., "OmniTRACS: A Commercial Ku-Band Mobile Satellite Terminal and its Applicability to Military Mobile Terminals," IEEE Military Communications Conference, Oct. 1988, pp. 43.1.1-43.1.4.
Birkland, "Management Techniques: Track, Talk, Tell," Fleet Equipment, Jun. 1994, pp. 20-25.
Bronson et al., "II-Morrow's Loran-C Based Vehicle Tracking System," Presented at NAV 85, Land Navigation and Location for Mobile Applications, Sep. 1985, 13 pages.
Brown, Henry E., "Navigation, Surveillance, and Communications Services within the Province of Ontario," Journal of the Institute of Navigation, vol. 35(4), Winter 1988-89, pp. 407-413.
C.J. Driscoll & Associates, "Survey of Location Technologies to Support Mobile 9-1-1," Jul. 1994, 59 pages.
Candler, "Tracking All Trucks: Many Companies are outfitting their fleets with advanced mobile communication technology," Nations Business, Dec. 1994, pp. 60-62.
Carroll, James V., "Availability Performance Comparisons of Combined Loran-C/GPS and Standalone GPS Approach Navigation Systems," IEEE Position Location and Navigation Symposium, Apr. 1994, pp. 77-83.
Carter et al., "Using Cellular Telephones for Automatic Vehicle Tracking," presented at NAV85, Land Navigation and Location for Mobile Applications, Sep. 1985, 10 pages.
Carter, David A., "Using Loran-C for Automatic Vehicle Monitoring," Journal of the Institute of Navigation, vol. 29(1), Spring 1982, pp. 80-88.
Cassidy, "Highway Master Goes Flat-Out in Communications Race," Transport Topics, Aug. 8, 1994, 2 pages.
Cellular Community Bulletin: A report on wireless activities benefitting your constituents, "Cellular Technology used to Improve Truck Fleet Efficiency," Highway Master, Jan. 13, 1995, 1 page.
Chadwick, D. Jim, "Projected Navigation System Requirements for Intelligent Vehicle Highway Systems (IVHS)," the Institute of Navigation, Proceedings of ION GPS-94, Sep. 20-23, 1994, pp. 485-490.
Chambers et al., "A Comparison of Automatic Vehicle Tracking Systems," Journal of the Institute of Navigation, vol. 21(3), Fall 1974, pp. 208-222.
Cobb et al., "Precision Landing Tests with Improved Integrity Beacon Pseudolites," presented at ION GPS-95, Sep. 1995, 7 pages.

(56) References Cited

OTHER PUBLICATIONS

Comments of AT&T Corp., in the Matter of Revision of the Commission's Rules to Ensure Compatibility with Enhanced 911 Emergency Calling Systems, Jan. 9, 1995, 25 pages.
Comments of the Cellular Telecommunications Industry Association, in the Matter of Revision of the Commission's Rules to Ensure Compatibility with Enhanced 911 Emergency Calling Systems, Jan. 9, 1995, 26 pages.
Cortland, Laurence J., "Loran-C Vehicle Tracking in Detroit's Public Safety Dispatch System," Journal of the Institute of Navigation, vol. 36(3), Fall 1989, pp. 223-233.
Diesposti et al., "Benefits and Issues on the Integration of GPS with a Wireless Communications Link," 29th Annual Precise Time and Time Interval (PTTI) Meeting, Dec. 1997, pp. 391-398.
Douglas Vatier facsimile to Adam Hough re NC-25 GPS-Dead Reckoning Navigation System, Jan. 12, 1995, 7 pages.
E.J. Krakiwsky Telefax to Karl Poley at II Morrow, Inc. re Building a database of all existing Intelligent Vehicle Highway Systems (IVHS) navigation systems, Nov. 10, 1993, 3 pages.
E.J. Krakiwsky, "IVHS Navigation Systems DatabseTM," The University of Calgary, 1994, 6 pages.
E.O Frye, "GPS Signal Availability in Land Mobile Applications," Journal of the Institute of Navigation, vol. 36(3), Fall 1989, pp. 287-301.
Enge et al., "Combining Pseudoranges from GPS and Loran-C for Air Navigation," IEEE Position Location and Navigation Symposium, Mar. 1990, pp. 36-43.
FAA Advisory Circular 20-101C, "Airworthiness Approval of Omega/VLF Navigation Systems for Use in the U.S. National Airspace System (NAS) and Alaska," Sep. 12, 1988, 31 pages.
FAA Advisory Circular 20-121A, "Airworthiness Approval of Loran-C Navigation Systems for use in the U.S. National Airspace Systems (nas) and Alaska," Aug. 24, 1988, 21 pages.
FAA Advisory Circular 20-130A, "Airworthiness Approval of Navigation or Flight Management Systems Integrating Multiple Navigation Sensors," Jun. 14, 1995, 50 pages.
FAA Advisory Circular 20-138, "Airworthiness Approval of Global Positioning System (GPS) Navigation Equipment for Use as a VFR and IFR Supplemental Navigation System," May 25, 1994, 33 pages.
FAA Advisory Circular 25-11, "Transport Category Airplane Electronic Display Systems," Jul. 17, 1987, 34 pages.
FAA Advisory Circular 25-15, "Approval of Flight Management Systems in Transport Category Airplanes," Nov. 20, 1989, 30 pages.
FAA Historical Chronology, 1926-1996, publication date unknown, 303 pages.
FAA, "ASR-9 System Field Maintenance," Operation Support, FAA, Nov. 2001, 410 pages.
Federal Communications Commission, "Notice of Proposed Rule Making," In the Matter of Revision of the Commission's Rules to Ensure Compatibility with Enhanced 911 Emergency Calling Systems, CC Docket No. 94-102, released Oct. 19, 1994, 53 pages.
Federal Communications Commission, "Report and Order and Further Notice of Proposed Rulemaking," In the Matter of Revision of the Commission's Rules to Ensure Compatibility with Enhanced 911 Emergency Calling Systems, CC Docket No. 94-102, released Jul. 26, 1996, 98 pages.
Fernandez et al., "GPS Navigation Subsystem for Automatic Vehicle Location Systems," NAV 90, Land Navigation and Information Systems Conference, Sep. 18-20, 1990, 12 pages.
FleetVision Integrated Fleet Management System, Trimble Navigation, date unknown, 9 pages.
French et al., "A Comparison of IVHS Progress in the United States, Europe, and Japan," prepared by R.L. French & Associates, Dec. 31, 1998, 216 pages.
French, "The Evolving Roles of Vehicular Navigation," Journal of the Insitute of Navigation, Fall 1987, vol. 34(3), pp. 212-228.
French, R.L., "MAP Matching Origins Approaches and Applications," Proceedings of the Second International Symposium on Land Vehicle Navigation, Jul. 4-7, 1989, pp. 91-116.
Galijan et al., "Results of a Study Into the Utility of Carrier Phase GPS for Automated Highway Systems," The Institute of Navigation, Proceedings of ION GPS-94, Sep. 20-23, 1994, pp. 533-541.
Gojanovich and Depaola, "The New Jersey Bell Network Proposal for Statewide Enhanced 9-1-1 Service," submitted on Nov. 20, 1989 to the Network Subcommittee of State of New Jersey 9-1-1 Commission, 34 pages.
GPS World Newsletter, Apr. 11, 1994, pp. 1, 4.
GPS World Newsletter, Sep. 9, 1993, pp. 1, 4.
GPS World: News and Applications of the Global Positioning System, Intelligent Vehicles & Highways Special Supplement, Apr. 1994, 2 pages.
GPS World: News and Applications of the Global Positioning System, Jul. 1994, p. 57.
Harper, "Trucks Become 'Warehouses' for Inventory," The Wall Street Journal, Feb. 7, 1994, 1 page.
Highway Master Features & Benefits, Highway Master Mobile Communication & Information Systems, 1993, 2 pages.
Highway Master Features & Benefits, Highway Master Mobile Communication & Information Systems, 1995, 2 pages.
Highway Master Mobile Communication & Information Systems Fact Sheet, HighwayMaster Corp., Jan. 13, 1995, 2 pages.
Hojo et al., "Land-Mobile GPS Receiver," Proceedings of the 3rd International Technical Meeting of the Satellite Division of ION, Sep. 19-21, 1990, pp. 183-190.
Howe, D.A., "The Feasibility of Applying the Active TvTime System to Automatic Vehicle Location," Journal of the Institute of Navigation, vol. 21(1), Spring 1974, pp. 9-15.
Hunter et al., "Land Navigation and Fleet Management with GPS, Loran, and Dead Reckoning Sensors," IEEE Position Location and Navigation Symposium, Nov./Dec. 1988, pp. 54-60.
Icao Circular, "Secondary Surveillance Radar Mode S Advisory Circular," Intl. Civil Aviation Org., Circular 174-AN/110, 1983, 44 pages.
II Morrow, Inc. Press Release, "II Morrow's VTS finds new application," II Morrow, Inc., Oct. 13, 1986, 2 pages.
II Morrow, Inc. Press Release, "Kern County Adds Eyes," II Morrow, Inc., Mar. 10, 1986, 8 pages.
II Morrow, Inc. Press Release, "Los Alamos selects II Morrow's VTS," II Morrow, Inc., Sep. 9, 1986, 1 page.
II Morrow, Inc. Press Release, "Pinellas County Florida Chooses II Morrow," II Morrow, Inc., Sep. 4, 1986, 2 pages.
II Morrow, Inc. Press Release, "Punta Gorda Florida Adds Police Car Tracking System," II Morrow, Inc., Aug. 28, 1986, 2 pages.
II Morrow, Inc., "Fleet Management Solutions with GPS Technology," 1995, 2 pages.
II Morrow, Inc., "II Morrow's Fleet Management Systems Putting Time on Your Side," date unknown, 2 pages.
II Morrow, Inc., "Maps are custom built using accurate government data!" 1985, 7 pages.
II Morrow, Inc., "The vision to take fleet management one step further," 1992, 8 pages.
II Morrow, Inc., "Vehicle Tracking System References," 1986, 6 pages.
II Morrow, Inc., "Vehicle Tracking System Specifications Sheets: Economical Reliable Accurate Secure," date unknown, 10 pages.
Inman et al., "TravTek Evaluation Rental and Local User Study," U.S. Dept. of Transportation and Federal Highway Administration, Mar. 1996, 105 pages.
Inman et al., "TravTek Evaluation Yoked Driver Study," U.S. Dept. of Transportation and Federal Highway Administration, Oct. 1995, 101 pages.
Inman et al., "Trav-Tek System Architecture Evaluation," U.S. Dept. of Transportation and Federal Highway Administration, Jul. 1995, 156 pages.
Ishikawa et al., "Proposal of High Accuracy Positioning Service for Terrestrial Mobile Communication Systems by Using GPS Satellites," 1993, pp. 363-372.
James Hume Facsimile to Jim McClellan re Sale of Magnavox Electronic Systems Co., Jul. 27, 1993, 2 pages.
Juneja et al., "Location Services Using Cellular Digital Packet Data," 1996 IEEE Intl. Conference on Personal Wireless Communications, Feb. 1996, pp. 222-226.

(56) References Cited

OTHER PUBLICATIONS

Junius et al., "New Methods for Processing GSM Radio Measurement Data: Applications for Locating, Handover, and Network Management," IEEE Vehicular Technology Conference, Jun. 1994, pp. 338-342.
Kennedy et al., "Direction Finding and 'Smart Antennas' Using Software Radio Architectures," IEEE Communications Magazine, May 1995, pp. 62-68.
Klass, Philip, "Industry Devisin GPS Receiver with Hyrid Navigation Adis," Avionics, Dec. 14, 1987, p. 121.
Koshima et al., "Personal locator services emerge," IEEE Spectrum, Feb. 2000, pp. 41-48.
Kugler et al., "Combined Use of GPS and Loran-C in Integrated Navigation Systems," IEEE, Satellite Systems for Mobile Communications and Navigation, May 13-15, 1996, pp. 7-11.
Kugler et al., "Combined Use of GPS and Loran-C in Integrated Navigation Systems," IEEE, Satellite Systems for Mobile Communications and Navigation, May 1996, pp. 161-168.
Lachapelle et al., "Analysis of GPS and Loran-C Performance for Land Vehicle Navigation in the Canadian Rockies," IEEE Aerospace and Electronic Systems Magazine, vol. 7(5), May 1992, pp. 504-508.
Lachapelle et al., "Analysis of Loran-C Performance in the Pemberton Area, B.C.," Canadian Aeronautics and Space Journal, vol. 28(2), Jun. 1992, pp. 52-61.
Lachapelle et al., "GPS/Loran-C: An Effective System Mix for Vehicular Navigation in Mountainous Areas," Navigation: Journal of the Institute of Navigation, vol. 40(1), Spring 1993, pp. 19-34.
Lappin, "Truckin," Wired, Jan. 1995, 6 pages.
Lee et al., "Minimizing Position Error in a Car Navigation System by Using GPS and Dead-Reckoning," Journal of the Korean Society for Geospatial Information System, 1994, pp. 81-88.
Lee, "Trucking Takes the High Tech Road," Radio Resource Magazine, Jan./Feb. 1994, 9 pages.
Lt. Gene Norden, Irvine Police Department, Vehicle Tracking System, 1986, 3 pages.
Machalaba, "Long Haul: Trucking Firms Face Driver Shortage, Idling Some Rigs and Causing Delays for Shippers," The Wall Street Journal, Dec. 28, 1993, 2 pages.
Mammano et al., "Pathfinder System Design," First Vehicle Navigation & Information Systems Conference, Sep. 1989, pp. 484-488.
Marcelo, "Vehicle location system serves public safety agencies," Mobile Radio Technology, vol. 4(12), Dec. 1986, 5 pages.
Maturino-Lozoya et al., "Pattern Recognition Techniques in Handoff and Service Area Determination," IEEE Vehicular Technology Conference, Jun. 1994, pp. 96-100.
Mele, "Mid-America Dairymen: Proves That it Pays—Committee approach finds cost justification for cellular system," Fleet Owner, 1994, 1 page.
Morris et al., "Omega Navigation System Course Book," National Technical Information Service of Springfield, Virginia, Jul. 1994, 60 pages.
National Training Center Rotation—In the Field, The National Training Center Matures 1985-1995, pp. 181-225.
Ndili, Awele, "GPS Pseudolite Signal Design," The Institute of Navigation, Presented at ION-GPS-94, Sep. 1994, 8 pages.
Nicholas Flaskay OCS Technologies letter to Edward J. Krakiwsky re Automatic Vehicle Location product, Aug. 11, 1993, 2 pages.
Noh, Jac-Scon, "Position Location by Integration of GPS Receiver and Dead Reckoning Sensors," International Journal of Precision Engineering Korea, 1996, pp. 443-447.
Parish, "Case Studies of market Research for Three Transportation Communication Products," U.S. Department of Transportation Research and Special Programs Administration, Mar. 1994, 70 pages.
Parviainen et al., "Mobile Information Systems Impact Study," Ontario Ministry of Transportation, Aug. 1988, 236 pages.
Perlstein et al., "Designing and implementing automatic vehicle location," Mobile Radio Technology, Jan. 1989, 6 pages.
Perlstein, "Automatic Vehicle Location Systems: A Tool for Computer Aided Despatch Systems of the Future," IEEE, 1989, pp. 186-193.
Perry, Tekla S., "In Search of the Future of Air Traffic Control," IEEE Spectrum, Aug. 1997, pp. 18-35.
Peterson et al., "Evaluation of Radionavigation Systems in an Urban Environment," Proceedings of the Institute of Navigation 1995 National Technical Meeting, Jan. 18-20, 1995, pp. 293-302.
Pilley et al., "Airport Navigation and Surveillance Using GPS and ADS," Institute of Navigation, ION GPS-91, Sep. 12, 1991, pp. 363-371.
Post, Kendall E., "Real-Time Linear Ensemble Averaging LORAN Receiver Architecture," The Institute of Navigation, Proceedings of the 45th Annual Meeting, Jun. 1989, pp. 67-75.
Press Release re Benefits of the HighwayMaster Mobile Communication and Information System, Highway Master Mobile Communication & Information Systems, Dec. 16, 1994, 2 pages.
Press Release re Bill Saunders named HighwayMaster Corp. Chief Executive Officer, Highway Master Mobile Communication & Information Systems, Jan. 13, 1995, 2 pages.
Press Release re Bill Saunders to speak at the Celluar Telecommunications Industry Conference regarding the New Frontier: Wireless Data Applications, Highway Master Mobile Communication & Information Systems, Jan. 11, 1995, 2 pages.
Press Release re Global Positioning System (Satellite) vehicle location tracking is now available with the HighwayMaster Mobile Communication and Information System, Highway Master Mobile Communication & Information Systems, Jan. 6, 1995, 4 pages.
Press Release re Gordon Quick named HighwayMaster Corp., Chief Operating Officer, Highway Master Mobile Communication & Information Systems, Jan. 12, 1995, 2 pages.
Press Release, "Lafayette Parish adds Vehicle Tracking," II Morrow, Inc., Sep. 8, 1986, 2 pages.
Private Pilot Manual, Jeppesen Sanderson, 1988, pp. 2-32, 2-52.
Rappaport et al., "Position Location Using Wireless Communications on Highways of the Future," IEEE Communications Magazine, Oct. 1996, pp. 33-41.
Riley et al., "Vehicle Tracking System for Salem, Oregon Police Department," The Institute of Navigation Proceedings of the National Technical Meeting, Jan. 21-23, 1986, pp. 89-94.
Romano, "Traffic Fatalities Show Drop," The New York Times, Feb. 3, 1991, 2 pages.
Rothblatt, Martin, "The First GPS Satellite Radio Optimized for Automatic Vehicle Location," Proceedings of the 47th Annual Meeting of the Institute of Navigation, Jun. 1991, pp. 261-263.
Saldin et al., "Magnavox Automatic Vehicle Location Pilot System for the Toronto Department of Ambulance Services," IEE Vehicle Navigation & Information Systems Conference, Sep. 11-13, 1989, pp. 194-201.
Santo, Brian, "Enables Reliable Autopilot Aircraft Touchdowns—Landing system based on GPS," Electronic Engineering Times, Nov. 14, 1994, 3 pages.
Schlachta et al., "Interoperability versus Integration of Omega and GPS," The Journal of Navigation, vol. 43(2), May 1990, pp. 229-237.
Sena, "Computer-aided dispatching: digital maps aid emergency response and fleet management," Computer Graphics World, May 1990, vol. 13(5), pp. 34-42.
Skoblicki, "Automatic Vehicle Location (AVL) Using GPS Enhance Dead Reckoning," International Conference on Vehicle Navigation & Information Systems, Oct. 22, 1991, 9 pages.
Stein et al., "Pseudolite-Aided GPS: a Comparison," IEEE Position, Location, and Navigation Symposium, 1988, pp. 329-333.
Stewart, John M., "Vehicle Location and Position Monitoring System Using Satellite Navigation and Cellular Telephone," Jun. 1993, 15 pages.
Tanabe et al., "Experimental Validation of GPS-INS-STAR Hybrid Navigation System for Space Autonomy," Acta Astronautica, vol. 21(5), 1990, pp. 295-308.
Taylor, "TravTek—Information and Services Center," Vehicle Navigation & Information Systems Conference Proceedings, Oct. 1991, 12 pages.

(56) References Cited

OTHER PUBLICATIONS

The Intelligent Highway, European Transport Telematics Update, vol. 4(18), Mar. 18, 1994, 3 pages.

Thrall, "Advantages of Interoperability to the Prudent Navigator," Proceedings of the 48th Annual Meeting of the Institute of Navigation, Dayton, OH, Jun. 1992, pp. 47-50.

TR45 Emergency Services Joints Experts Meeting Report, Telecommunications Industry Association, Aug. 28, 1994, 25 pages.

Trimble FleetVision, Land Navigation and Information Systems, Presented at 1990 Conference of the Royal Institute of Naviation, Warwick 1990, 8 pages.

Van Aerde et al., "TravTek Evaluation Modeling Study," U.S. Dept. of Transportation and Federal Highway Administration, Mar. 1996, 134 pages.

Van Graas et al., "Multisensor Signal Processing Techniques (Hybrid GPS/LORAN-C with RAIM)," U.S. Dept. of Transportation and Federal Aviation Administration, Sep. 1991, 95 pages.

Van Graas, "Hybrid GPS/Loran-C: A Next-Generation of Sole Means Air Navigation," Dissertation presented to the faculty of the College of Engineering and Technology of Ohio University, Ohio University Library, Nov. 1988, 185 pages.

van Willigen et al., "Eurofix: GNSS Augmented Loran-C & Loran-C Augmented GNSS," Proceedings of the 1995 National Technical Meeting of the Institute of Navigation, Jan. 18-20, 1995, pp. 337-344.

Waid et al., "Relative GPS Using DME/TACAN Data Link," the Institute of Navigation, Proceedings of ION GPS-94, Sep. 20-23, 1994, pp. 851-861.

Weseman, John F., "Loran-C: Present and Future," Journal of the Institute of Navigation, vol. 29(1), Spring 1982, pp. 7-21.

Whitcomb, "Using Low Cost Magnetic Sensors on Magnetically Hostile Land Vehicles," IEEE Plans, Nov. 29-Dec. 2, 1988, pp. 34-35.

Wilson, Jr., et al., "A Lagrangian Drifter with Inexpensive Wide Area Differential GPS Positioning," Oceans 96 MTS/IEEE Conference Proceedings, Sep. 1996, pp. 851-856.

Bowditch, N., The American Practical Navigator, Pub No. 9, 1995, pp. 174-75 and 187-188.

Freedman, A., The Computer Glossary: The Complete Illustrated Dictionary, 8th Edition, 1998, p. 177.

Merriam Webster's Desk Dictionary, 3rd Edition, Merriam-Webster, Inc., 1995, p. 274.

Newton, H., Newton's Telecom Dictionary, 12th Edition, Feb. 1997, pp. 80, 154-155, 294-295, 381-383, 417, 612-613, 651, 655-657, 727-728.

The American Heritage College Dictionary, 3rd Edition, Houghton Mifflin Co., 1993, p. 485.

The New Shorter Oxford English Dictionary, 4th Edition, Oxford University Press, 1993, p. 894.

Official Action for related U.S. Appl. No. 12/206,712, dated May 17, 2010.

U.S. Appl. No. 11/739,097, filed Apr. 27, 2007.

U.S. Appl. No. 12/786,429, filed May 24, 2010.

U.S. Appl. No. 13/323,221, filed Dec. 12, 2011.

U.S. Appl. No. 13/037,337, filed Feb. 28, 2011.

U.S. Appl. No. 12/861,817, filed Aug. 23, 2010.

Beser, J. and B.W. Parkinson, "The Application of NAVSTAR Differential GPS in the Civilian Community," Navigation: Journal of the Institute of Navigation, Summer 1982, vol. 29(2), pp. 107-136.

Frank, R.L., "Current Developments in Loran-C," Proceedings of the IEEE, Oct. 1983, vol. 71(10), pp. 1127-1142.

Giordano et al., "A Novel Location Based Service and Architecture," IEEE PIMRC '95, Sep. 1995, vol. 2, pp. 853-857.

Giordano et al., "Location Enhanced Cellular Information Services," 5th IEEE International Symposium on Personal, Indoor and Mobile Radio Communications, Sep. 18-23, 1994, pp. 1143-1145.

Kaplan, E., "Understanding GPS: Principles and Applications," Artech House, 1996, 288 pages.

Kerr, T., "Decentralized Filtering and Redundancy Management for Multisensor Navigation," IEEE Transactions on Aerospace and Electronic Systems, Jan. 1987, vol. AES-23(1), pp. 83-119.

Lee, W. C. Y., Mobile Cellular Communications, 2nd Ed., McGraw-Hill, 1995, 673 pages.

Okawa et al., "PLRS Development Testing," IEEE AES Magazine, 1988, vol. 3(8), pp. 10-15.

Powell, C., "The Decca Navigator system for ship and aircraft use," Proceedings of the IEEE, Part B: Radio and Electronic Engineering, Mar. 1958, vol. 105(9), pp. 225-234.

Stansell, T.A., "Civil GPS from a Future Perspective," Proceedings of the IEEE, Oct. 1983, vol. 71(10), pp. 1187-1192.

Swanson et al., "The Omega Navigation System," Navigation, Spring 1965, vol. 12(1), pp. 24-35.

Widnall, W.S., "JTIDS Relative Navigation With Measurement Sharing: Design and Performance," IEEE Transactions on Aerospace and Electronic Systems, Mar. 1986, vol. AES-22(2), pp. 146-154.

Winick, A.B. and D.M. Brandewie, "VOR/DME System Improvements," Proceedings of the IEEE, Mar. 1970, vol. 58(3), pp. 430-437.

"GPS Interface Control Document ICD-GPS-200," IRN-200B-PRO01, Jul. 1, 1992 revision, reprinted Feb. 1995, 109 pages.

Boucher, Neil J., "Cellular Radio Handbook," Quantum Publishing, 1990, 91 pages.

Marshall, Catherin R., "The U S West Intelligent Services Research Laboratory," CHI '90 Proceedings, Apr. 1990, pp. 383-384.

Mateja, Jim, "Cadillac Offers a High-tech Guardian Angel," Chicago Tribune, Apr. 21, 1996, 4 pages.

Parkinson, B.W. and P. Axelrad, eds., "Global Positioning System: Theory and Applications," vol. 163 Progress in Astronautics and Aeronautics, AIAA, 1996, 236 pages.

Parkinson, Bradford W. and James Spilker, Jr., eds., "Global Positioning System: Theory and Applications," vol. 164 Progress in Astronautics and Aeronautics, AIAA, 1996, 221 pages.

* cited by examiner

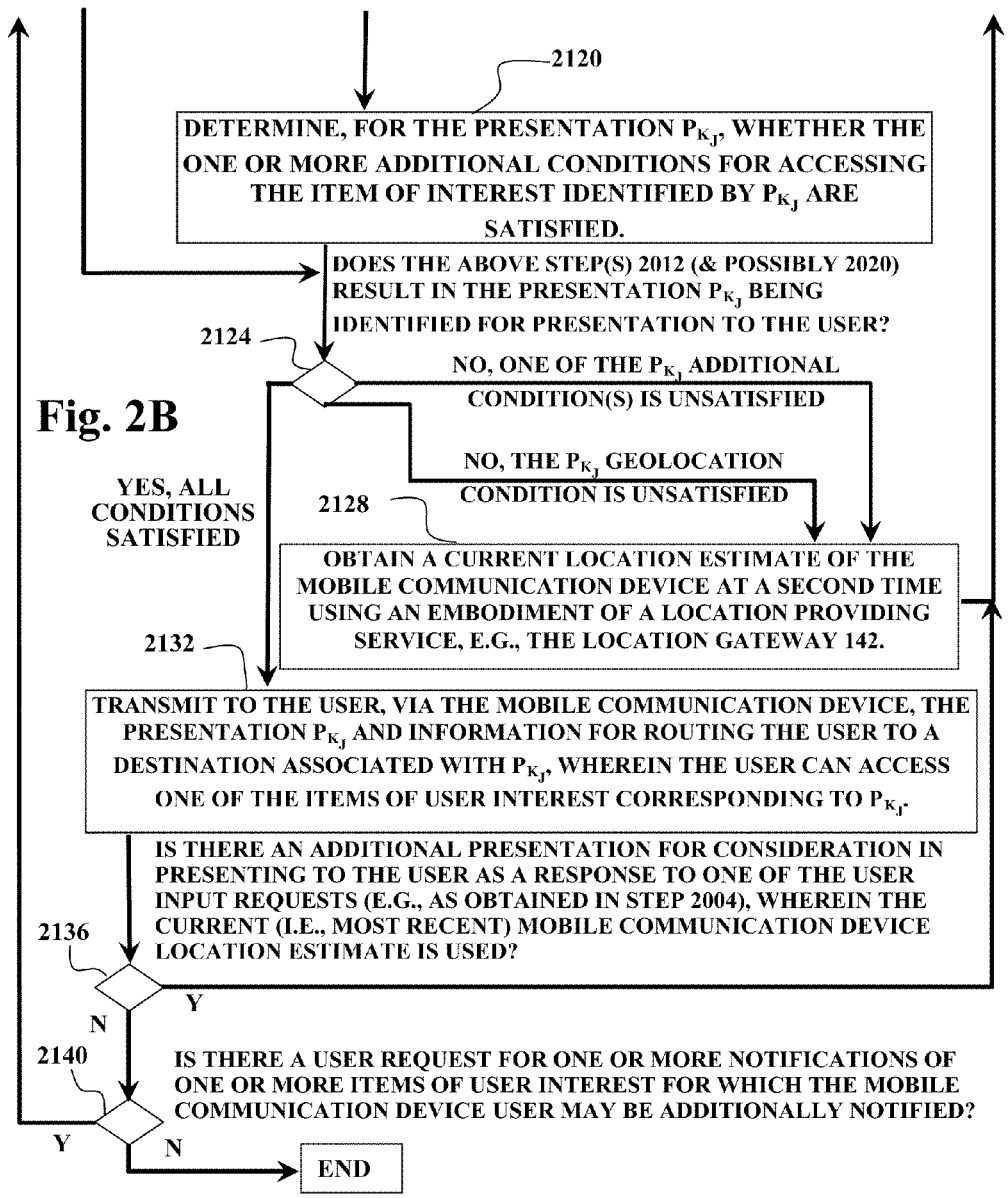

Interface for Providing User input: for entering at least some constraint information For entering standard/conventional transaction constraint data via a series of context sensitive menus that when each menu item is selected, a transaction constraint is formed such as:
"Neighborhood should be in a range of 5 blocks from a park."

| | |
|---|---|
| Property | |
| Neighborhood | Should |
| Area | Should not |
| Financing | |
| Completion of purchase | |

Be
Be in a range of
Be less than
Be greater than
Be not near
Be near
Exclude
Include
Within From ___ to ___
___ block(s)
___ kilometers
___ land/lot size
___ building/house size
___ driving time
___ bedrooms
___ bathrooms
___ days
___ months
___ date
___ garage
___ parking sites
___ type (ranch, multistory, etc)
___ (mortgage type)
___ monthly payment From
To Shopping
Work
Grocery store
Rapid transit site
Airport
Park
School
Hospital
Parents
...

Constraint Importance: ___

<for free form text describing desired transaction/area/neighborhood/property characteristics and/or undesirable transaction/area/neighborhood/property characteristics>

<descriptions and constraints previously entered>

Fig. 3

REAL ESTATE TRANSACTION SYSTEM

The present application is a continuation-in-part of U.S. patent application Ser. No. 10/297,449 filed Dec. 6, 2002 now U.S. Pat. No. 7,714,778 which the U.S. national stage filing of International Patent Application PCT/US01/17957, filed Jun. 4, 2001 which claims the benefit of U.S. Provisional Patent Application Ser. No. 60/293,094 filed May 22, 2001; the present application also claims the benefit of U.S. Provisional Patent Application Ser. No. 60/864,606 filed Nov. 7, 2006.

RELATED FIELD OF THE INVENTION

The present invention is related to real estate transaction processing systems, and in particular, in facilitating the purchasing of real estate properties.

BACKGROUND

It would be desirable and advantageous to have an Internet based real transaction system that could assist agents and their clients in identifying properties for purchase by such clients.

SUMMARY

A real estate transaction system is disclosed herein for assisting the finding and purchasing of real estate. Among the features disclosed herein are the following:
1. The present real estate transaction system models feasibility and/or likelihood of a real estate transaction being completed by a potential buyer on each of one or more properties, in particular, the modeling may be performed per potential property being considered by the potential buyer, such models based on:
    A. Data to be obtained from potential buyer
        i. Purpose of purchase
            1. Primary residence, rental, speculation, rebuild/renovate, buyer for another (children, parent, relative).
        ii. Reason for potential purchase
            1. Need more room, need less room, desire to be closer to work, desire a better neighborhood/school system, relocated for job, etc.
        iii. Characteristics of desired transaction.
            1. Model of the desired financial portion of the transaction
                a. Type of mortgage(s) desired, and/or acceptable
                b. Amount for down payment
                c. Acceptable monthly payment range
                d. Lease/buy option
            2. When must a purchased property be acquired?
        iv. Characteristics of potential buyer
            1. For potential buyers of a principle residence:
                a. Income, education level, number of children, marital status,
                b. How does the potential buyer allocate and use his/her time over, e.g., a six month or year time period? In particular, what is the comparative importance to the potential buyer of being in proximity to and/or having access to facilities for:
                    recreational preferences (sports, exercise, boating, flying, swimming, horse back riding, etc.),
                    hobbies (e,g, restoring cars, music or book collector, wood worker, rock collector, etc.),
                    religious activities (e.g., church affiliations, etc.),
                    activities for children (e.g., school activities, extracurricular activities such as sports, clubs).
        v. Desired/acceptable neighborhood characteristics
            1. Crime rate, average property price, covenants, range from freeway(s), grocery store(s), shopping, bike path(s), air pollution, recreation sites.
            2. Qualitative descriptions; e.g., "quiet", "energetic",
        vi. Desired/acceptable property description
            1. Private residence, commercial, raw land, distressed property, etc.
            2. Size characteristics, e.g., number of bedrooms, square feet ranges, parking facilities, etc.
            3. Expected likely expenditures for maintenance in first 1, 2, 3, 4, and/or 5 years after property purchased.
            4.
        vii. Travel related criteria to typical locations
            1. Acceptable travel distance and/or time to work, school(s), shopping, grocery store, entertainment, airports, mass transit sites
        viii. Potential buyer specification of location characteristics unique to the potential buyer
            1. Acceptable range in time and/or distance from work, friends, family, school, church attended, children's piano, golf, tennis lessons, private schools, etc.
            2. Not near high power electrical lines, not adjacent to a freeway, not within 5 miles of an agricultural area.
            3. Desirable for attracting employees.
    B. Similarities to previous potential buyers
2. A comparator for comparing properties.
3. Test properties for weighting transactions characteristics.
4. What if scenarios.
5. Maintain potential buyer list of properties of interest (e.g., after reviewing).

Additionally, the real estate transaction system herein combines wireless location and methods for routing to real estate properties with the above features. In particular, the following method is provided:

A method for assisting in a real estate transaction, the method including at least one of: (1) the steps (A) through (C) hereinbelow, and (2) a step of providing programmatic instructions on a storage media for enabling the steps (A) through (C) hereinbelow:

(A) for a user of a communication device (CD), a step of first obtaining user input of corresponding real estate preference information for one or more real estate properties;

wherein the corresponding real estate preference information includes data for a geolocation condition, said geolocation condition for determining one or more presentations to be presented at CD, wherein the geolocation condition is satisfied for a presentation (P) of the one or more presentations, by determining that: for some estimated location, or location along an expected future route, ($L_{CD}$) of the communication device CD, and for a corresponding destination ($D_P$) associated with the presentation P wherein the user gains greater access to an instance of the at least one real estate property by the user traveling to $D_P$, that $D_P$ is one or more of (a1), (a2) and (a3) following:

(a1) within one of: a specified user travel distance of the location $L_{CD}$, or a specified geographically identified area of the location $L_{CD}$, (a2) within a specified expected elapsed time of travel from the location $L_{CD}$; and (a3) nearer to $L_{CD}$ than at least one other destination for accessing an instance of the at least one real estate property;

(B) obtaining a location estimate ($L_{EST}$) of an actual or expected future geographic location ($L_1$) of the communication device CD at a first time, wherein the location estimate is dependent upon geolocation indicative information communicated between: (i) the communication device CD, and (ii) a communications network;

(C) one or more of (c1) and (c2) following are performed, wherein for a first of the at least one real estate property, there is a first presentation ($P_1$) providing information related to accessing an instance ($I_1$) of the first real estate property, and $P_1$ having associated therewith information used for identifying a corresponding destination ($D_{P_1}$) for accessing $I_1$:

(c1) the steps (c1-1) and (c1-2) following are performed, wherein for the first real estate property, the corresponding property preference information is satisfied for the first presentation $P_1$ with the location estimate $L_{EST}$ being used to obtain a corresponding instance of $L_{CD}$:

(c1-1) accessing information ($INF_m$) associated with another of the presentations ($P_m$) of some one of the real estate properties (REP), wherein $INF_m$ includes at least a corresponding destination $D_{P_m}$ associated with $P_m$, and determining that for the corresponding destination $D_{P_m}$, the geolocation condition of the corresponding property preference information for the real estate property REP is satisfied; and (c1-2) providing information for computing a route ($R_m$) to substantially the corresponding destination $D_{P_1}$, wherein the route $R_m$ is to go to $D_{P_m}$; and (c2) the steps (c2-1) through (c2-4) following are performed, wherein in addition to the geolocation condition associated with the first real estate property, there is additionally associated therewith additional preference information (AP), obtained from user input, said additional preference information AP also used for determining whether a presentation for the first real estate property is to be presented at the communication device CD, wherein the additional preference information AP is stored for accessing at a plurality of substantially different times for determining whether some one or more presentations for the first real estate property are to be presented at the communication device CD;

wherein from the additional preference information AP one or more additional conditions are obtained for evaluating whether a presentation ($P_j$) is to be presented at CD such that (c2-a) and (c2-b) following hold:

(c2-a) the evaluating of the additional conditions uses a characteristic that is one of (c2-ai) and (c2-aii) following:

(c2-ai) indicative of how the user desires to access an instance ($I_j$) of the first real estate property, and (c2-aii) obtained using property access information, associated with $P_j$, such that the characteristic provides information as to how the user is able to access the instance $I_j$;

wherein said instance $I_j$ accessible at a corresponding destination ($D_{P_j}$) associated with $P_j$, and (c2-b) the characteristic is both of (c2-bi) and (c2-bii) following:

(c2-bi) independent of substantially an entire travel distance to, and a geographical area of, $D_{P_j}$; and (c2-bii) independent of an expected time for traveling substantially an entire travel distance to $D_{P_j}$;

(c2-1) for a presentation ($P_k$) being an instance of $P_j$, a step of first accessing at least a portion of the additional preference information AP, and a step of determining that for the presentation $P_k$ at least one of the additional conditions is not satisfied when evaluated according to (c2-a) and (c2-b) above;

(c2-2) obtaining an additional location estimate of an actual or expected future geographic location of the communication device CD at a different geographic location from $L_1$ or at a substantially different subsequent time from the first time, such that the additional location estimate is dependent upon geolocation indicative information communicated between: (i) the communication device CD, and (ii) a communications network;

(c2-3) second accessing the additional preference information AP, and determining that for the additional location estimate, and the corresponding destination $D_{P_1}$ associated with $P_1$, both the geolocation condition is satisfied, and for $P_1$ being an instance of $P_j$, the additional conditions evaluated according to (c2-a) and (c2-b) above are satisfied;

(c2-4) providing information for computing a route ($R_1$); wherein the route $R_1$ includes at least one direction for directing the user from substantially the additional location estimate to substantially the corresponding destination $D_{P_1}$; and wherein information indicative of one or more of: the route $R_m$, the route $R_1$, the presentation $P_1$, and the presentation $P_m$ is transmitted to the communication device CD.

Other features and benefits of the real estate transaction system disclosed herein will become evident from the description hereinbelow and the accompanying figures.

BRIEF DESCRIPTION OF THE DRAWINGS

FIGS. 2A and 2B show a flowchart of some of the operations of the present real estate transaction system.

FIG. 3 shows one embodiment of a user interface architecture for the present real estate transaction system.

DETAILED DESCRIPTION

Introductory Discussion

The following U.S. Patents and U.S. Patent Applications are fully incorporated herein by reference: U.S. Pat. No. 6,871,140 filed Oct. 23, 2000; U.S. Pat. No. 6,385,541 filed Aug. 15, 2000; U.S. Pat. No. 6,496,776 filed Jan. 31, 2001; U.S. Patent Application Publication No. US 2004/0266457 filed Jun. 4, 2001; and U.S. Patent Application Publication No. US 2004/0198386 file Jan. 6, 2003.

Figure 1A:
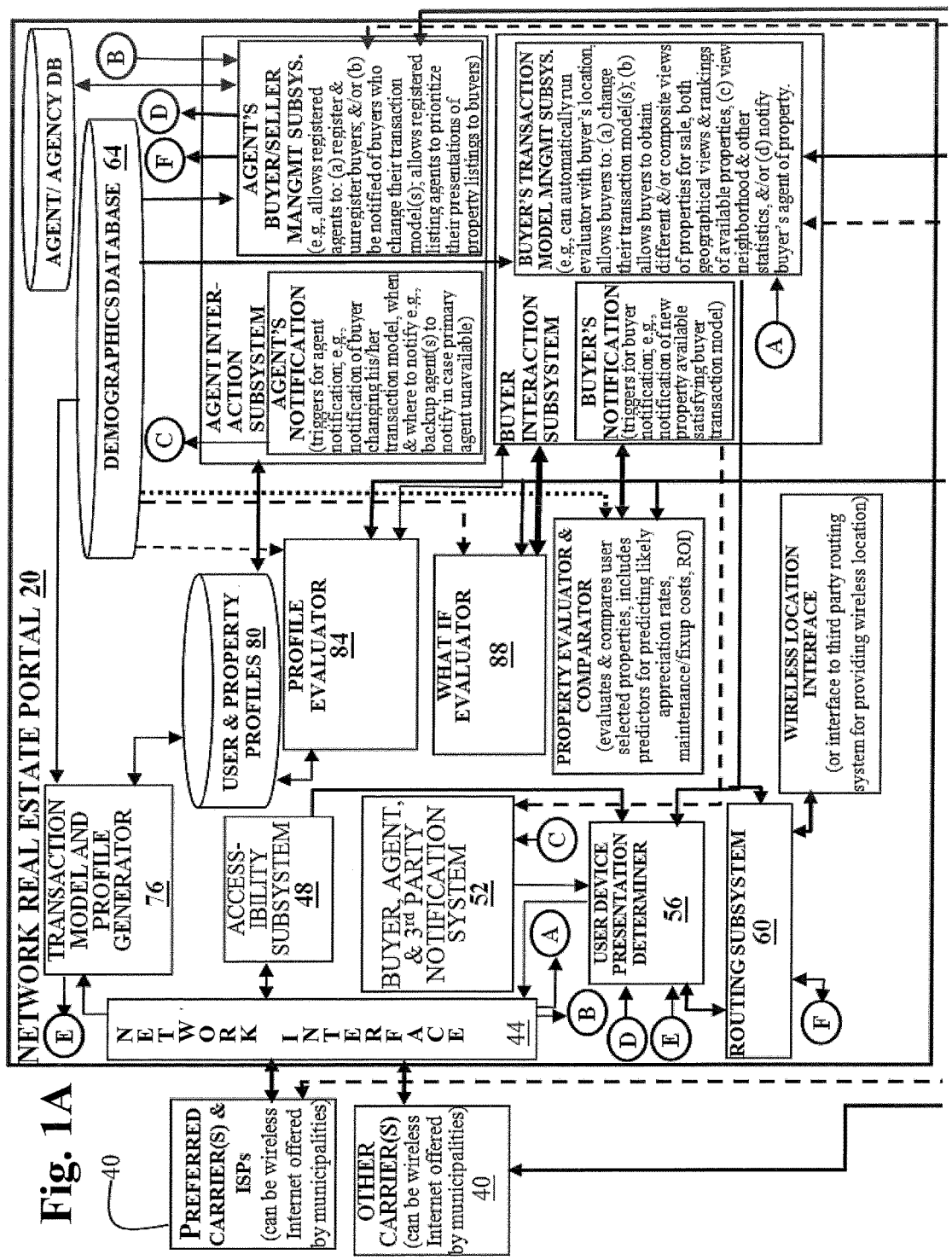
FIG. 1 is a high level block diagram of an embodiment of the present real estate transaction system.
Figure 1B:
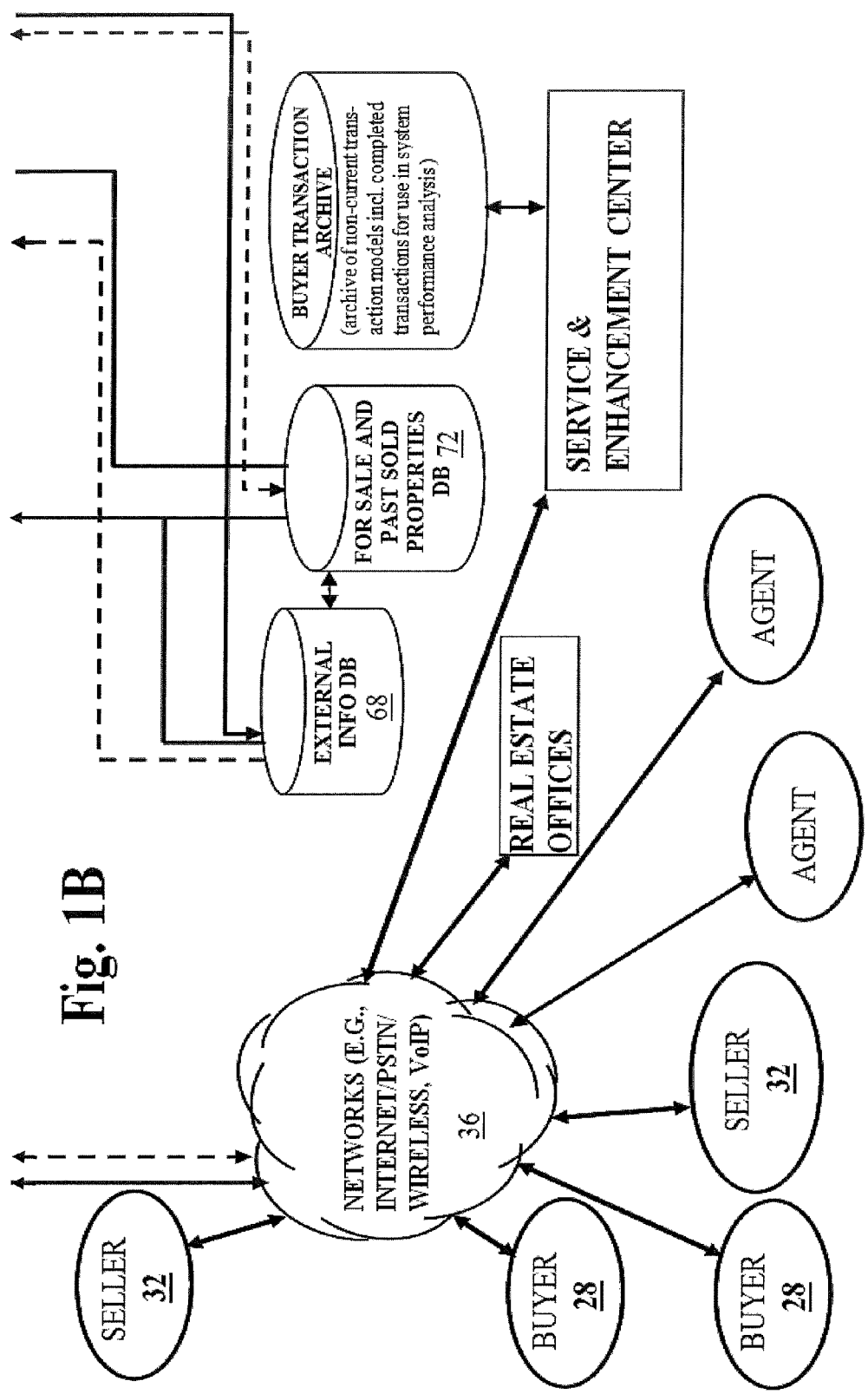

FIG. 1 shows an embodiment of a networked (Internet) real estate property portal 20 (website) as contemplated by the present disclosure. The portal 20 communicates both wirelessly and wired with real estate agents/brokers 24 (and their offices), potential real estate buyers 28, and sellers 32 via one or more networks 36. Such communication may be provided via a combination of telecommunication carriers and Internet service providers 40.

Communication with the portal is generally via the network interface 44 which provides both secure (e.g., virtual private network) communications and less secure network communications as provided by most websites. Interface 44 communicates with accessibility subsystem 48 for determining the access level to be provided to users requesting access. The following types of users are distinguished by this subsystem: (i) agents/brokers registered to use the services of the portal 20, (ii) potential real estate buyers or seller registered to use the services of the portal 20, and (iii) non-registered users. The accessibility subsystem 48 also registers users for allowing greater access to the portal's services. In addition to users being able to contact the portal 20, this portal can also transmit messages (e.g., via email, synthesized voice messages, instant messaging, and/or text messaging) to agents, buyers, sellers and other parties pertinent to a real estate transaction. To perform such communications, the portal 20 includes a notification system 52 for receiving message information and an identification of one or more recipients, wherein the system 52 determines the transmission techniques to be used and the order they should be employed. Accordingly, an agent may have input information to the portal 20 requesting to be notified of requested real estate showings of his/her listings via synthesized voice messages requiring confirmation of receipt and/or review, followed by a text message text message if no such confirmation is received from the agent within, e.g., 15 minutes. However, for other users (e.g., a potential real estate buyer), such notifications may be only via wireless transmissions such as email or instant messaging without confirmation of review by the buyer being required. The notification system 52 provides its output to a user device presentation determiner 56 which tailors the message or notification for output to be appropriate for the intended user device that is to receive the message or notification. Accordingly, if the intended device is a portal computer with sufficient graphics display capabilities, then maps and various photo and/or video data streams may be transmitted to the device. However, if the intended device is a mobile phone with a small display screen, or a pager, then only text messages (perhaps with reduced graphics) may be transmitted (possibly together with information for logging onto the portal to receive additional information regarding the notification). The presentation determiner 56, in at least one embodiment, communicates with a routing or navigation subsystem 60 for obtaining directions to a particular location. Accordingly, the presentation determiner 56 may provide the routing subsystem 60 with data requesting that only textual navigational information be supplied; alternatively, such data may request graphical mapping information be supplied as well. The navigation subsystem 60 may, in turn, contact any one of a number of navigation services well known in the art.

Before proceeding with further description of the tasks performed by the portal 20, description of the databases and data repositories accessed are now described. Accordingly, the following databases are accessible.

(a) Demographics database 64: This database may be a "virtual database" in the sense that it is distributed over the Internet with various portions supplied by different third parties. This database includes access to demographic data based geographic locations or areas such as the data supplied by Claritas described further hereinbelow. Such geographic areas may be identified by neighborhoods, subdivisions, zipcodes. Accordingly, demographics of such a given geographic area may be retrieved from this database. Alternatively, such geographic areas may be determined by requesting areas that satisfy certain demographic and/or geographical and/or environmental constraints. For example, a query may be request neighborhoods having at least 30% singles, within ¼ mile of a park of at least 10 acres, with the neighborhood being mostly home owners. This database may provide access to real estate appreciation rates by geographic area, owner/renter occupancy, price per square foot, average/median price, crime rates by geographical areas, rental vacancies, rent prices, etc. Note, that much of the information accessible via the database 64 may be provided by a multiple listing service.

(b) External database(s) 68: The database(s) here may be extensions of the database 64. The database(s) here may assist in providing additional information for satisfying buyer's transaction models (described hereinbelow).

(c) For sale and past sold properties database 72: This database provides information to assist an agent, potential buyer and/or seller in determining appropriate property prices. Accordingly, the following statistics may be provided: property description statistics (e.g., address, size statistics, number of parking spaces, number of bedrooms, number of building levels, etc.) of properties currently on the market or sold, length of time on the market, selling date (if any).

(d) Transaction model and profile generator 76: This component may be used by portal 20 users to generate profiles of properties for selecting properties that are more likely to be purchased. In particular, as described hereinbelow, property profiles may be generated, based on what past clients have purchased, that are likely predictive of what current and future similar clients may purchase.

(e) User and property profiles database 80: The data repository for agent and client profiles as well as property profiles as discussed hereinbelow. Note that at least some of the property profiles may be generated by the generator 76.

(f) Profile evaluator 84: A subsystem for evaluating property profiles of properties identified and described according to information residing in the database 72 and the demographic database 64.

(g) What if evaluator 88: This component allows clients to create and manipulate "what if" or hypothesized transaction models such as what if interest rates go up; what if I increase my max travel time to work to 1 hr., etc.

(h) Property evaluator and comparator 92: This component evaluates and compares client/agent selected properties; this component includes predictors for predicting likely appreciation rates, maintenance/fix up costs, ROI, utility costs etc.

In the present real estate transaction disclosure, when the term "satisfy" in reference to a constraint for property selection is used herein, the term may, refer to a binary result of either "satisfied", or "unsatisfied". Accordingly, the term "satisfy" may preclude partial satisfactions. However, in another interpretation, the term "satisfied" in reference to a constraint for property selection as used herein, may yield more than two possible binary results. In particular, there may be degrees of satisfaction. For example, in this later use of the term "satisfy", a potential buyer may be requested to provide additional input relative to a constraint such as to what degree the constraint is important, e.g., the potential buyer may additionally be asked whether the constraint is "required to be satisfied", "preferred to be satisfied", or "may be acceptable even though not satisfied". Other discrete assessments of constraint importance may be used as well, such as a constraint scale from 1 to 10 where 10 corresponds to "required to be satisfied", 7 to 9 may correspond to degrees of "preferred to be satisfied", 5 to 6 corresponds to degrees of a generally neutral perception of the constraint (e.g., "may be acceptable even though not satisfied", "of marginal importance"), 3 to 4 may correspond to a negative perception for satisfying the constraint (e.g., "not preferred"), 1 to 2 may indicate that the constraint should not be satisfied (e.g., "firmly against satisfaction"). Additionally, note that other terms may be used to communicate with a potential buyer (also referred to as a "client" herein). For example, a potential buyer may respond to an expanded response constraint generation question "Do you prefer to live in a very urban environment?" Accordingly, the potential buyer may provide a response on a scale from "required" to "preferred", to "neutral", to "undesirable", to "absolutely not". Note, however, that a response may result in the generation of one of two constraints within the real estate transaction system disclosed herein. For example, for a potential buyer response to the constraint generation question above of "preferred" to "neutral", a first constraint corresponding to "I prefer to live in a very urban environment" may be generated with a degree of importance corresponding to the potential buyer's provided importance. Alternatively, for a potential buyer response to the expanded response constraint generation question above of "neutral" to "absolutely not", a second constraint corresponding to "I do not prefer to live in a very urban environment" may be generated with a degree of importance corresponding to the potential buyer's provided importance. Decomposing potential buyer responses (to response constraint generation questions) into one or more constraints may be worthwhile in that at least some constraint information may only correspond to a degree of positive importance regarding a constraint. For example, a potential buyer may volunteer constraint information such as "I want to live in a forest" and provide an importance of "preferred". Moreover, communication with a potential buyer may be more natural in that sentences such as "I wish to live in a suburban area" rather than a sentence such as "I wish to live in an urban area" together with an importance measurement indicating "not preferred".

Substantially any potential buyer characteristic or property/area characteristic may be able to be input into the real estate transaction system disclosed herein as a constraint/criterion for selecting/qualifying a property for presenting to the potential buyer. In one embodiment, there may be predetermined property transaction related questions presented to a potential buyer for selecting properties, and in addition there may be the capability for a potential buyer to input of free form textual information wherein corresponding constraints or buying criteria may be generated from an analysis of such textual information. Additionally, such constraints (or buying criteria) may be associated with degrees of importance as described hereinabove. Further description of constraints follows hereinbelow.

A potential buyer may provide the following types of quantitative information, e.g., the real estate transaction should be financed via a 30 year fixed mortgage with housing payments no more than $3,000 per month having a price less than $550,000; the property should be in a low crime neighborhood, within 2 hours driving of an International airport, wherein the property is a single family detached residence having 5 bedrooms, 3+ bathrooms, and a double/triple car garage. Note, each of these characteristics can be likely evaluated using conventional real estate information about properties (e.g., a multiple listing service) in combination with, e.g., census data, local crime data, and well known geographical information systems such as Google Maps. However, additional real estate purchasing criteria may be requested of the potential buyer or client, wherein such additional criteria can be also evaluated (e.g., by the profile evaluator 84, FIG. 1A) using available data from various data sources. In particular, a potential buyer may be asked questions for identifying what are the characteristics of a property that are not acceptable. For example, a potential buyer may respond that attached housing is unacceptable, properties within 1 block of a major thoroughfare are unacceptable, properties outside of one or more zip codes are unacceptable, etc. It is believed that requesting such unacceptability criteria substantially increases the efficiency of property selection. In particular, such negative constraints can be at least as important as other more positive types of constraints in efficiently selecting properties for the potential buyer to visit.

Additionally, the potential buyer may also prefer properties that are within a desired range of driving time/distance to work, school(s), church and/or friends/family. Evaluations on these (and similar characteristics) may require the client to identify specific locations (e.g., work address, church address, etc) referred to as "anchor points" hereinbelow. Data for such additional quantitative geolocation constraints can be structured for efficient evaluation relative to a particular potential property. However, since such data is in general particular to a client, it may not be previously associated with data of properties. None-the-less, such additional quantitative constraints may be evaluated using processes similar (if not necessarily identical) to those used for evaluating client constraints related to well known locations such as major thorough fares/rapid transit sites (e.g., a constraint such as "within 2 miles of a major thorough fare/rapid transit site, and at least 1 block away from the major thorough fare/rapid transit site"), or "within two miles of the university", or "within 1 hour driving time of the airport LAX".

Moreover, a client may provide additional information that may be in the form "ad hoc" constraints, such as a quantitative and/or qualitative constraint for which no predetermined corresponding constraint evaluator is available. In particular, there may be no constraint evaluator due to the client requesting that candidate properties satisfy criteria for which the data to evaluate a corresponding constraint requires: (a) an interpretation of available quantitative data to evaluate the ad hoc subjective/qualitative constraint, and/or (b) an evaluation of client specific (quantitative/qualitative) constraints that are substantially unique to the client. For example, a client may state that he/she is interested in a property not located on an earthquake fault line, or in an area where the drinking water is of high quality, or reports of bears and/or cougars are low, or where it is "quiet", or where "the neighborhood has a lot of trees", or "not near a major electrical power transmission line", etc. The following ways are provided for processing and evaluating such constraints (e.g., by the profile evaluator 84, FIG. 1A):

(a) For such constraints that are area or property based, wherein data for identifying properties and/or areas is known to be available (e.g., identifying earthquake fault lines or major electrical power transmission lines), designated experts and/or databases may be used to identify areas or properties satisfying such constraints. In particular, such experts or and/or databases maybe accessed on a pay for access basis.

(b) For constraints that are not easily evaluated, if one or more potential properties appear otherwise likely candidates for purchase by the buyer, the potential buyer's agent (if there is one or the potential buyer otherwise) may be notified about properties satisfying substantially all other constraints.

(c) In one embodiment, listing agents (and/or property owners) of candidate properties satisfying substantially all other constraints (except the ad hoc constraints) for a potential buyer may be notified requesting them to respond (e.g., via email) if such candidate properties are believed to satisfy such ad hoc constraints. Note, that it may be in the interest of such listing agents to provide correct information (if they respond) in that in one embodiment, listing agents clearly and/or consistently providing false or misleading information may be identified for alerting potential buyers to listings from such agents or owners;

(d) Candidate properties and/or areas can be selected that have properties that are similar to properties purchased by previous buyers providing similar constraints for identifying candidate properties. Some of the information needed to determine such similarities may not be easily obtainable. However, if property purchasers are given a rebate after purchase for filling out an extensive questionnaire about their experiences at or with the purchased property, e.g., 6 months after purchase, it is believed that such information may be acquired overtime. Alternatively or optionally, for embodiments of the present real estate transaction system, wherein logs of both purchased properties and rejected properties are kept, similarities between potential buyers may be additionally determined on what properties were rejected by similar potential buyers. Thus, e.g., if fifteen properties are identified as satisfying (or sufficiently satisfying) substantially all of a potential buyer's constraints, then such properties may be ranked for presentation (and/or presumed desirability) to the potential buyer according to how closely each such property matches properties purchased previously by similar potential buyers, and/or how dissimilar each such property is to properties rejected by similar potential buyers. Accordingly, it is believed that as more and more data on potential buyers is gathered, the real estate transaction system disclosed herein will become increasingly more effective in identifying properties that are of interest to potential buyers.

In at least one embodiment of the real estate transaction system disclosed herein, one or more of the following operators may be provided.

1. "Rough Similarity" Operator: This operator (e.g., provided by the profile evaluator 84, FIG. 1) determines two or more populations of properties that are "roughly" similar to a particular actual or hypothetical property (merely "current property" hereafter), and wherein the properties in a first of the populations are properties that sold in a specified time frame, e.g., the last 2 years (for "hot" markets could be 3 months), and the properties in a second population (probably much smaller) that were for sale did not sell and were withdrawn from the market within the time frame (note, this second population may give an upper bound on what is not sellable at a particular price). One or more additional populations of properties may be used such as: (i) properties currently available, and (ii) properties that have been on the market an extended period of time, e.g., greater than a standard deviation from the mean time for selling a property within a particular time period. Note that the second population and properties that have been on the market for an extended time period are believed indicative of property prices that are too high for the market conditions. To determine such populations of properties, in addition to any specified time frame for selling (or not selling), the following selection criteria may be used for selecting previously sold properties depending on the population of properties desired:

(A) ±1 or the same as the desired number of bedrooms, bathrooms, and/or common rooms,
(B) ±1 of garage car accommodations,
(C) ±20% of house size (square footage),
(D) ±20% of asking price at the time of property sale (adjusted for appreciation/depreciation), and/or
(E) ±20% of lot size,
(F) Condition of property (if available),
(G) same or similar: quality school district, (if available),
(H) selling price (if sold) of no more than 20% above (or below) what the client is willing to pay,
(I) asking price (e.g., if not sold) of no more than 20% above what the client is willing to pay,
(J) area characteristics (urban, suburban, rural, mountain, desert, river front, "near" city, "near" ocean, out of food plain).
(K) Within or outside of a given area(s), e.g.,
   i. a specified school district, zip code, city or county,
   ii. a specified client defined geofenced area,
   iii. within a given driving (walking, or bicycling) distance (or time of travel) of a specified location, product or service,
   iv. a specified neighborhood, a specified urban, suburban, rural, mountain, desert, or riverfront area,
   v. "near" a specified city, "near" the ocean,
   vi. a designated environmental area (e.g., outside of a flood plain, in a redevelopment area, etc.)

Note, the above selection criteria of (A) through (K) were chosen since it is believed that these criteria should be relatively easy to obtain, and are likely to be indicative of most criteria for home buyers. Of course, it may be that additional/alternative property selection criteria may be used. For example, other property area characteristics (e.g., no mountain lion sightings within three miles of the target property within the last five years), and/or financial transaction characteristics may be used (e.g., mortgage rates, owner carry, etc.), and such additional characteristics (i.e., selection criteria) may be settable for a particular client (e.g., potential buyer), in particular by the client's real estate agent, or by the client him/herself.

In one embodiment of the present real estate transaction system, a previously sold property may be provided in an initial version of the first population if the previously sold property satisfies at least a predetermined selection threshold (e.g., a percentage) of the number of selection criteria for the first population, e.g., the various criteria in (A) through (K) immediately above. The percentage may be in the range of, e.g., 75% to 100%, and more preferrably 80% to 90%. Accordingly, a property similarity evaluation function is defined, which in one embodiment merely sums up the number of selection criteria that the property satisfies. However, any of the selection criteria may be identified as mandatory to be satisfied. Thus, for the first population, the requirement that the property be sold in the timeframe must be satisfied.

However, other similarity evaluation functions may be used, wherein different selection criteria have different weightings. In one embodiment, each of the selection criteria may be ranked or weighted for the client according to a perceived importance to the client. Thus, instead of counting each such selection criterion as equal, relative weights ($w_1$, $w_2$, $w_3$, ..., $w_n$) may be applied, wherein, $w_i$ is the weighting for the $i^{th}$ selection criteria, wherein $$\sum_{i=1}^{n} w_i = 1,$$

and wherein a property (P) is selected if (i) it satisfies certain mandatory conditions such as sold (or not sold) within a particular time frame, and (ii)

$$\sum_{i=1}^{n} \chi_i w_i \geq (a$$

predetermined selection threshold, such as 0.8) where $$\chi_i = \begin{cases} 0 \text{ if the } i^{th} \text{ selection criterion is not satisfied for the property } P, \text{ and} \\ 1 \text{ if the } i^{th} \text{ selection criterion is satisfied for the property } P \end{cases}$$

In addition, one or more selection filters may be used, wherein certain selection criteria may be used to categorize properties of a population. Thus, for a particular client, a selection criterion that the selected sold properties be zoned for horses may be used to categorize all properties into those zoned for horses and those not zoned for horses. Note, such filters may be applied to a requested population of properties for viewing the properties according to categories (e.g., properties with swimming pools versus properties without swimming pools).

In one embodiment, the present real estate transaction system may be configured for use with commercial properties rather than residential, then the selection criteria may be substantially different. For example, the above residential selection criteria may be replaced with criteria such as: total square footage of leasable space, number of parking places, age of structure(s), the class of the structure(s) (e.g., class A or class B), the type of property (e.g., apartments, retail, manufacturing, mixed use), financing available, current occupancy rate, current tenants, tenant lease renewal information, projections of revenues increases/decreases, projections for repairs and maintenance, etc.

Once the initial version of the first population of properties is determined, it is desirable, when possible, to adjust this initial version to obtain an appropriately representative sample, wherein the sample size is large enough so that it is likely to be representative of the current real estate market for the current property being considered by the client.

In general, it is believed that the size of the first population should preferably include between thirty and one hundred properties with a mean number of selection criteria matching the current property being 80% or higher. If there are substantially more sold properties selected, then all such properties may be used, or the selection threshold may be increased, or an additional selection filter may be used. If there are substantially less sold properties selected, then the selection threshold may be decreased, or the time frame may be increased, or any selection filters may be deactivated or modified (or any combination of these alternatives). Note that if the selection criteria are weighted (e.g., as described above), the relative weightings can also be adjusted.

Note that the second population (or any other population) of roughly similar properties can be obtained similarly to the first population. However, note that the time frame may vary. For example, it may be desirable to determine asking prices for roughly similar properties that have been for sale for over, e.g., 4 months, and either are currently on the market, or have been withdrawn from the market within the past 3 months, since the asking price for such properties may be an indication of property prices that are too high.

In one embodiment, the roughly similar operator may be activated to determine the first population for the time frame of the last six months.

In one embodiment, a property selection wizard may be activated to assist the client and/or agent in determining property selection criteria. Such a wizard may use a client profile (residing in the user & property profiles database 80, FIG. 1A) along with client related selection criteria for determining actual property selection criteria. For example, given a client's preferences for a property, such a wizard may access various suppliers of demographic information such as Claritas whose address is 5375 Mira Sorrento Place, Suite 400, San Diego, Calif. 92121, and which may be also contacted via the Internet at www.claritas.com (further information on demographic reports from Claritas is provided in Appendix A hereinbelow). Moreover, such a wizard may have access to a database compiled from various local public (or proprietary) data sources such as is provided in the Philadelphia, Pa. area by Avencia Inc. 340 North 12th Street, Suite 402, Philadelphia, Pa. 19107 which may be also contacted via the Internet at www.avencia.com. In particular, the database may provide the following information: neighborhood characterizations (e.g., heavily treed neighborhood, within 0.25 miles of a park, recreation center, shopping, etc.), crime statistics for neighborhoods, home sales prices and trends, categorizations of the type of people who live in the neighborhood (e.g., zip code) such as provided by MyBestSegments at www.claritas.com/MyBestSegments/Defalut.jsp. Such a wizard may be used to build a model of the client's "ideal" house that is affordable by the client. Accordingly, in addition to typical questions related the ideal house statistics (e.g., square footage, etc.), the wizard may query the client for responses to questions such as:

(a) Which rooms of your ideal (and affordable) house do you prefer to be especially nice?

(b) Is an attached dwelling acceptable if the interior is acceptable?
(c) What size of yard or acreage do you prefer?
(d) What distance from a major thoroughfare is acceptable?
(e) How important is quietness at home to you?
(f) What neighborhood (e.g., within ¼ mile of house) population density is preferable? Acceptable?
(g) What are the preferred characteristics of the neighborhood?
  (i) Retirement oriented,
  (ii) Many couples with young children,
  (iii) Many singles activities nearby (e.g., within 3 miles of house),
  (iv) Lots of trees in the neighborhood (e.g., within ¼ mile of house),
  (v) Nearby park (e.g., within 1 mile of house),
  (vi) Nearby recreational sites (e.g., within 1 mile of house).

In one embodiment, the wizard may access a plurality of expert models related to various aspects of real estate purchases. For example, it is believed that for most home (more generally real estate) purchasers, an expert model for each of the following categories will suffice for identifying such an ideal property:
(1-a) Property Interior: E.g., square footage, quality of finish, layout, number of floors, number of bedrooms, bathrooms, environmental conditioning (type of heating, air conditioning, etc.);
(1-b) Property exterior: E.g., Garage/parking lot size, size of yard/grounds, foliage present, overall condition of exterior, exterior condition of house/building(s), condition of walkways and parking places, condition of any fencing;
(1-c) Estimated property utilities and ongoing maintenance.
(1-d) Property maintenance estimated expenses: E.g., home owner association fees, repair costs for one to five years, etc.
(1-e) Neighborhood characteristics: E.g., Urban, Suburban, rural, demographics of neighborhood (e.g., professional, retired, singles, married, income per household, racial mix), newly constructed, established neighborhood, neighborhood population density, proportion of renters vs. owners, crime statistics, noise pollution, air pollution, etc.;
(1-f) Transportation: E.g., accessibility of thoroughfares, mass transit; client total time in transit to: (i) work, (ii) school(s), (iii) recreational facilities, (iv) friends and family, (v) other client specific destinations.
(1-g) Schools: E.g., quality of school(s), distance/transportation time to school(s), cost of school(s).
(1-h) Products/Services: E.g., accessibility of shopping in terms of distance/transportation time from property.
(1-i) Recreational sites: E.g., accessibility thereof in terms of distance/transportation time and cost.
(1-j) Entertainment facilities: E.g., accessibility of movies, theatre, museums, zoos, etc. in terms of distance/transportation time from property.
(1-k) Religious/friends/family activities: E.g., accessibility thereof in terms of distance/transportation time and cost.

Accordingly, for each of the above categories (1-a) through (1-k), there may be an expert model devoted to determining what is likely to be best suited to the client for the category. Moreover, each such expert model may output at least three collections of information including a characterization of a property that appears best suited to the client given the financial and time resources the client can devote to the property related characteristics of the property.

2. Similarity Operator: The present similarity operator (e.g., provided by the property evaluator & comparator, FIG. 1) is for finding properties that are "similar" to a specified property (this may be a hypothesized property or an actual property), wherein the similar property is currently for sale. In particular, this operator may be functionally equivalent to the rough similarity operator above, except that an importance of each of the selection criteria may be assessed. For example, a client may be viewing a property and wants to view others that are "similar", or a desired hypothetical one or more properties have been input for obtaining "similar" properties. The functionality of such a similarity operator may be as follows:
(a) Perform the roughly similar operator with the time frame being the present time for obtaining a population of properties that are currently for sale, and satisfying a relaxed version of one or more of the designated client related selection criteria that are not mandatory. For example, for client preferred house size of 3500 to 4000 square feet, the relaxed version may be 3000 to 4500 square feet;
(b) Perform the roughly similar operator, with the time frame being the present time and with the same or additional selection criteria as used in (a) immediately above, for obtaining an additional more restrictive population of properties that are currently for sale, and satisfying exactly the designated client related selection criteria (i.e., within the predetermined selection threshold as described hereinabove);
(c) Rank the properties in the population of properties retrieved in (b) according to their evaluation by the similarity evaluation function;
(d) Output additional information indicating the relative importance of each of the selection criteria in excluding properties retrieved in (a) immediately above from being in (b) immediately above. For example, a property P retrieved in (a) that is excluded from being retrieved in (b) due to undesirable house square footage and being outside of a particular zip code may raise the importance of each of these two selection criteria for restricting the number of similar properties. Note that it is believed that this additional information assists in providing the client and/or agent with information on how to relax the selection criteria for obtaining a larger population of similar properties. For example, the importance of each selection criterion of (b) may be the number of properties obtained from (a) that do not satisfy the selection criterion.

In one embodiment, when there are a large number of properties that satisfy the selection criteria of the similarity operator (e.g., more than 100), a more restrictive property search may also be performed, wherein one or more selection criteria ranges are tightened. Accordingly, upon presenting information about, e.g., how many more properties are likely to be restricted by each additionally restricted selection criteria, the client or agent may make an intelligent determination as to what one or more selection criteria to further restrict to obtain a better population of similar properties.

In one embodiment, when a search for similar properties is conducted, an address for a current property may be input, wherein subsequently, data for the current property is retrieved and automatically populates property search selection criteria for the similarity search. Accordingly, by using the (any) client's selection criteria, and then amending such criteria with criteria satisfied by the current property, properties that are similar to the current property and satisfy the client's selection criteria may be retrieved. Note, that when the data for the current property is in conflict with the client's (or agent's) selection criteria, the client (or agent) may be notified of the conflict and requested to provide input for resolving such conflict. The client (or agent) may be provided with at least two options when such a conflict arises: (i) accept the client's (or agent's) selection criterion, (ii) accept the corresponding selection criterion obtained from the current property.

3. Price Operator: Compute one or more of: a "too high" price, a "fair" price, and/or a "good" price, and/or a "great" price for a specified property based on "roughly similar" properties that have recently sold (perhaps adjusted for appreciation/depreciation). This may be determined using the similar properties obtained from activation of the similarity operator above. E.g., (a) properties whose price is in a second standard deviation of prices (on the low price side) may be identified as a "great" price, (b) properties whose price is not in (a) but is within a first standard deviation of prices and below the average price may be identified as a "good" price, (c) properties whose price is not in (a) and (b) but is within a first standard deviation of prices and above the average price may be identified as a "fair" price, and (d) properties whose price is not in (a)-(c) may be identified as a "too high" price.

4. "Similar, but" operator: This operator (e.g., provided by the property evaluator & comparator, FIG. 1) allows a user (client or agent) to identify a property (e.g., by address), wherein subsequently, data for the property populates property search selection criteria. For example, a client wants a property that is "similar" to an actual property, except for some characteristic(s) (e.g., bigger kitchen, bigger garage, bigger master bedroom, in the mountains, "better neighborhood, lower price, etc.). This may be accomplished by: providing an additional one or more mandatory selection criteria, and performing a new search. Note, this may be just a modification of a previous search. So searches and/or parameters therefor can be saved.

5. "Likely Sale Price(s)" operator: This operator may be used for both buyers and sellers. This may assist in both weeding out clients that are really not interested in buying and/or selling, and for determining clients that are really interested in buying. Such an operator may also provide a way of making a client's property criteria more "realistic" for the price the client can or desires to pay. This operator can be computed by determining the first population of "similar" properties that have sold as above, then using the Price Operator above, compute price ranges for the "too high" price, "fair" price, and/or "good" price, and/or "great" price.

6. "Suggested Offer" operator: For buying a property, this operator suggests an offer/counter offer. It is similar to the Likely Sale Price operator above. However, client/agent indicates the category of price, e.g., "fair" price, and/or "good" price, and/or "great" price. Then a suggested offer for the current property is computed. Note, the offer may take into account: (a) a clustering of sale prices for similar properties (e.g., it may be that although the property is listed at $409K, that virtually all properties in the $410K to $401K range have sold for less than $400K, and in particular, in the range of $399K to $395K). Accordingly, suggested sale range may be from $399K to $395K, plus, e.g., once a sale price is selected, a suggested first offer price decrease of, say, $$\$409K*((\text{average difference between asking price and sale price for similar properties})/(\$409K-\text{selected price}))$$

Description of Interaction Between Portal 20 and User

The following is a high level pseudo code description of interactions between the portal 20 and a client or agent when attempting to locate properties of interest to the client or agent.

```
BUYING_LIMIT ← Receive an estimate of an amount the client can to pay for a property;
Receive zero, one or more anchor points that are used for determining property and/or
    property area desirability; e.g., the greater the distance from the anchor points, the
    less desirable the property/area, and the closer to the anchor points, the greater the
    desirability of the property/area; in one embodiment, each anchor point may be
    provided with a max/min distance or transportation time from the property/area to the
    anchor point;
If (requested by client/agent) then
    Output characteristics of selected property areas and/or areas that satisfy the criteria
        of the anchor points; such characteristics may include, e.g., household income,
        proportion by age, educational background, ethnic mix, school rankings,
        estimated driving time/distance to client's workplace, crime statistics (e.g.,
        relative number of burglaries, assaults, drug arrests in comparison to other
        areas), population density, owners vs. renters in area, and/or noise pollution
        (or lack thereof);
AREAS ← Receive from the client/agent an identification of one or more geographical areas
        for the property;
RQMTS ← Receive client's requirement(s) for property related characteristics that are
        identified as must be satisfied, e.g., any of the characteristics in the categories (a)
        through (k) above;
Until client/agent quits DO/* the following steps */
    PROPERTIES ← Perform search for candidate properties satisfying all constraints
        for the client, including the client's RQMTS in AREAS that satisfy the (any)
        anchor point constraints, and the client's BUYING_LIMIT;
```

```
If (there is one or more candidate properties in PROPERTIES) then
    For each candidate property (CP) DO
        present information on CP to the client/agent;
        NEGATIVES ← for CP, receive any input provided by the
            client/agent regarding drawbacks of the property that
            would prevent a purchase offer being made on the
            property; in one embodiment, for each such negative,
            the negative may be categorized by the client/agent as
            to which of the categories (1-a) through (1-k) it applies
            and the characteristics within the selected category;
            additionally, a preferred improvement that would
            reduce the negative, e.g., negatives for a property might
            be "neighbors too close", "property too close to
            freeway", "too many stairs in house" (note, FIG. 3
            shows a type of user interface for flexibly receiving
            client/agent responses), and for each negative, a
            corresponding additional constraint may be determined
            and the relative importance of the additional constraint, in
            comparison to constraints already obtained, is obtained;
        Save, print or transmit the property information if requested by the
            client/agent;
    Else /* if no properties obtained from search */
        If not previously obtained, request client/agent to order how the constraints
            (for anchor points, AREAS, RQMTS and any additional constraints
            from negative property characteristics identified above) should be
            relaxed so that additional candidate properties can be presented; in one
            embodiment, all current constraints are shown to the client/agent and
            with each constraint an indication of the likely number of additional
            properties that can be presented by relaxing the constraint; note, with
            each change to the constraints (or upon the client/agent's request) a
            new search for candidate properties is performed with the new set of
            constraints for presenting to the client/agent an updated number of
            candidate properties satisfying all constraints;
END UNTIL DO;
If requested by the client/agent then suggest alternative properties by activation of the expert
    models;
```

Figure 2A:
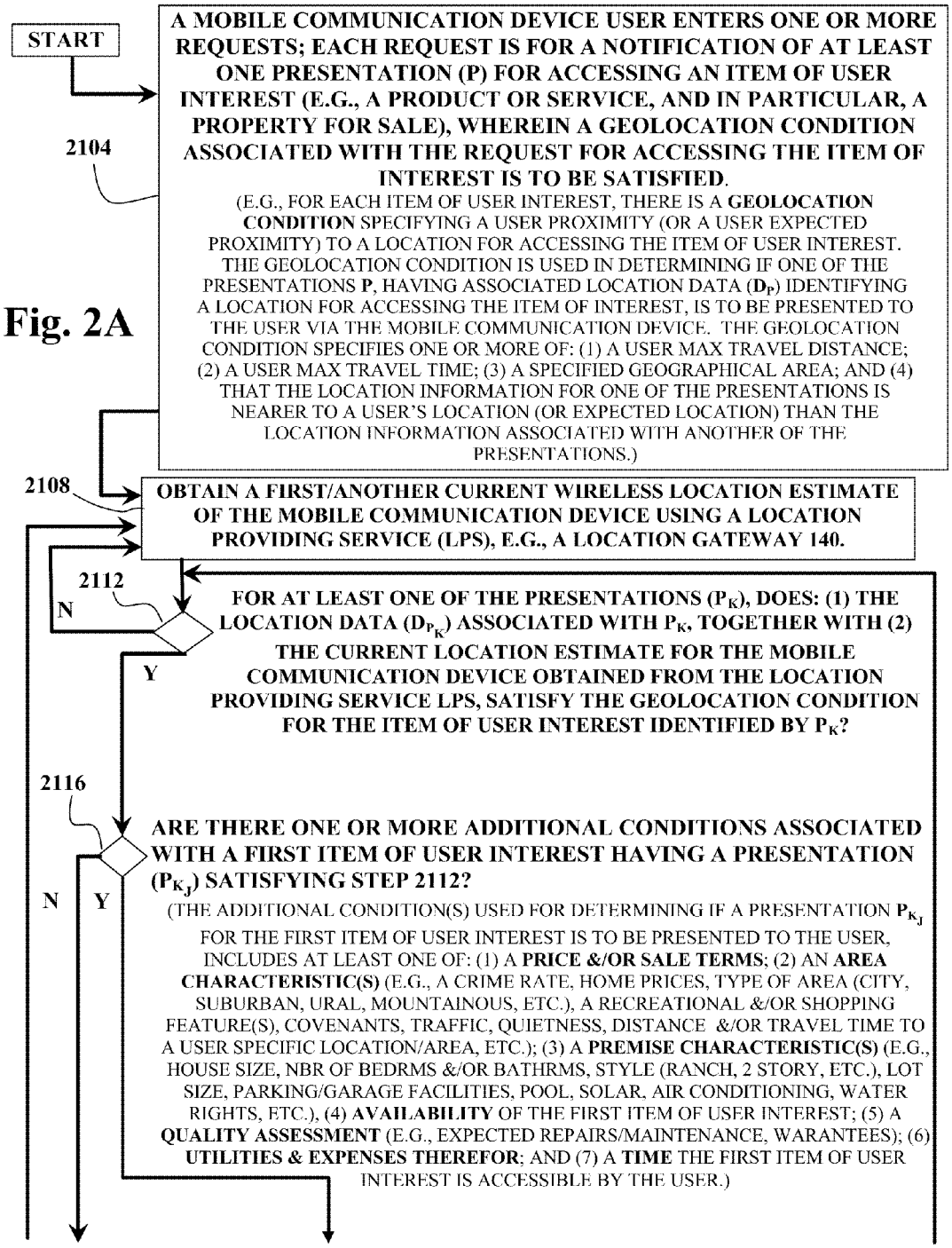

FIGS. 2A and 2B show a flowchart providing high level steps for presenting property information to a client or agent.

Client and Property Profiles

The agent/client can also use the portal 20 to access information on newly listed properties for determining if he/she should visit the property.

The agent may provide the portal 20 with an agent property profile, wherein the profile includes filters that prevent certain agent notifications for new property listings under certain circumstances, e.g., if the asking price is outside of a predetermined price range, if the property location is outside of one or more agent selected geographical areas, etc. However, such filters associated with the agent's profile may be overridden if a client of the agent has a current property profile that identifies a property that would otherwise be filtered by the agent's profile. Accordingly, an agent may be notified of a plurality of property profiles, wherein most of the property profiles in the collection are profiles exported to the agent from particular clients. Thus, an agent may be notified of any property listing (new or old) if the property satisfies a client profile exported by the client (and accepted by the agent). Moreover, the agent may have a select group of properties that are not currently publicly available, and the agent can provide information on these properties so that such information is made only available to the agent's clients (or the agent's real estate office clients) for a predetermined time prior to making such properties publicly available to other agents and their clients. Accordingly, new property listings in the database 72 of currently available properties are partitioned into at least the following viewing groups:

(a) Publicly viewable by all registered users of the portal 20.

(b) Viewable only by an agent and the agent's clients (generally each property listing of this group has an expiration timer associated therewith wherein once the timer expires, the property listing becomes publicly viewable.

(c) Viewable by those of (b) above, plus additional agents (identified by the agent having the listing) and/or their clients.

When using the services of the portal 20, a registered user (agent or client) may create and/or select one or more of his/her property profiles and store such profiles at the portal for determining any properties that satisfy at least one such profile. In one embodiment, the user may store a large plurality of such property profiles (e.g., 30 or more). For example, a potential buyer may have a different property profile for each of commercial real estate properties, apartment complexes, personal residence properties, vacation home(s), undeveloped land, etc. Moreover, a user may have one or more temporary or experimental profiles stored at the portal 20 as well as one or more that are exported to another user (e.g., a client's agent).

Agents may create proprietary property profiles for their clients that assist these clients in identifying properties of interest. Such proprietary profiles may be created or generated substantially via the agent's personal experience (e.g., manually by the agent) and/or with the assistance of various client personality and/or demographic profiling tools. An agent (or an agent's office) may keep client and property profiles on clients that buy a property, and clients that do not buy a property. If a client profile (having some preferred property characteristics) for a current client sufficiently matches a corresponding composite client profile of a particular group of past clients that have purchased properties, then if the property characteristics of the purchased properties by members of the group can be correlated with the property purchases, then such property characteristics may be predictive of other clients purchasing properties having the same or similar property characteristics. Note that since any correlation between a composite profile for a property purchasing client group, and the satisfied property preferences is probabilistic, at least some property profiles generated may be based on a fuzzy logic model or a statistical model. For example, a principal components statistical analysis may be performed for identifying property profile characteristics (if any) that are predictive of a purchase by clients having a similar client profiles. Such client profiles for past clients that actually purchased a principal residence may include the following: (i) client mortgage amount range preference for which client is qualified, (ii) educational background, (iii) household size, (iv) ages and number of children living with client, (v) approximate total cost, time, and/or distance acceptable for expending on transportation from a desired property to frequently visited locations such as workplace, schools, friends, family, shopping, etc., (vi) environmental preferences for property such as urban, suburban, mountains, desert, proximity to a body of water, (ocean, lake, river), etc., (vii) preferred property location(s) (zip code, city, neighborhood, etc.), (viii) urgency of need for property purchase, (ix) previous experience in purchasing a similar property. Accordingly, if such client profile characteristics can be determined to correlate with particular property characteristics of properties that were actually purchased by past clients, then such property characteristics may be used (e.g., in combination with desired property characteristics in, e.g., the client profile) for generating a more nearly complete property profile that may be predictive of a property the client may purchase. Thus, by determining which of a plurality of group profiles (each such profile for a group of past clients having similar client profiles, and that purchased properties) is most similar to a current client's profile, at least some property characteristics may be likely predictive of the client purchasing a property having the property characteristics. For example, for a client that is a single mother having two children that is qualified for a $250,000 house mortgage, and wishes to live in a suburban area within one mile access to mass transit into the center of a particular city, and further wishes the property to be a detached residence having at least 3 bedrooms in a relative low crime area, it may be that previous "similar" clients (e.g., single mothers, etc.) that have purchased properties have generally purchased properties with low maintenance yards, gas furnaces, and within ½ mile of a mass transit stop. Accordingly, the single mother's agent may configure the portal 20, and in particular, the profile evaluator 84 so that if the mother's property profile returns more than, e.g., some predetermined number of properties, say 10 properties, that property selections satisfying the agent's amended property profile may be also presented to the mother (or she may be notified that the agent suggests she review the properties resulting from the client's property profile generated by the agent). Accordingly, the agent has the capability to provide property suggestions to a client based on purchasing experience of past clients without requiring the client to schedule a time to discuss the client's property objectives and preferences. Note that it is possible that an initial client profile (including a collection of property preferences supplied by a client) can indicate that the client is unlikely to purchase a property consistent with the client's property preferences. Accordingly, the agent may configure the profile evaluator 84 so that the agent can supply an explanation as to why properties different from those preferred by the client should be considered by the client. For example, a client qualified for a $2 million mortgage having 4 children and wishing to buy a suburban single family primary residence within a particular set of zip codes may be determined by the agent to be currently priced out of the market in these zip codes unless the client is willing to purchase a smaller house or live in another zip code. Accordingly, the agent may select alternative zip codes for the selecting properties corresponding with the client's other property preferences. Moreover, there may be circumstances where no properties are retrieved by the client's active property profile (e.g., due to the active profile being too restrictive), and any available agent property profiles also being inappropriate (e.g., the client indicates that such profiles appear to be inappropriate). In such cases, the agent may be notified via, e.g., email, instant messaging, etc. Additionally, since it is likely that such property profiles are too restrictive or in conflict with current property market conditions, the client may be requested to relax one or more property constraints in the active profile. In particular, the client may be presented with various (or all) property constraints in a property profile and requested to relax one of more of the constraints, and the client may obtain immediate feedback from the portal 20 regarding, e.g., the number of new properties not presented to the client previously.

Moreover, if corresponding client profile data is also retained on clients that did not purchase a property, together with corresponding property profile data used by such non-purchasing clients, and the number of matches for such property profiles, then it may be possible to statistically predict after a certain number of property profiles are used by the client whether the client is more or less likely to purchase a property than another client. Accordingly, an agent may wish to allocate his/her time to clients that are identified as being more likely to purchase a property. However, since the agent can provide clients determined to be less likely to purchase with the services of the portal 20, the agent may still retain such clients.

Since certain property profiles may be designated as the active profiles (also referred to as "exported" profiles herein) for notifying the client and his/her agent of newly available properties for sale, changes in such active property profiles over time may be also used in predicting a likelihood of the client purchasing a property prior to the agent's contract with the client expiring. For example, substantially no changes in a client's property profile to reflect changing market conditions (e.g., changing to a "sellers market") may be indicative that the client is unlikely to purchase a property. Alternatively, when a client's active property profile progressively becomes more focused, the agent may likely assume that the client has determined what property characteristics are desired, and accordingly the agent may determine that additional time should be spent assisting the client in purchasing a property. However, if a client's active profile changes focus repeatedly to substantially different populations of properties, e.g., from 3 bedroom condominiums of urban areas in a first active profile to 4+ bedroom houses in suburban areas in a subsequent second profile to mountain cabin in yet a third profile, then the agent may quite likely assume the client unclear in his/her property purchasing objectives, and accordingly may contact the client to offer advice. Note, that since the present real estate transaction system allows clients to investigate properties for sale substantially autonomously from their real estate agent, the agent can afford to service a large number of clients since it is likely that only a few of the agent's clients, at any given time, are at the stage of requiring a significant amount of the agent's time, e.g., for submitting an offer on a property and/or negotiating a contract and/or closing on a property. Accordingly, the present real estate transaction system may provide agents with access to tools that assist an agent with determining distinctions between various versions of the active property profiles for a given client. In particular, such a tool may identify for the agent: (i) a restriction of one or more property constraints of the active profile, (ii) a relaxing of one or more property constraints of the active profile, (iii) a changing of property populations, e.g., via changing one or more desired property characteristics to values that will select substantially all properties from a property population that has little similarity to a property population from which properties were previously selected by a previous version of the property profile (e.g., changing a property profile characteristic from requiring an urban property to requiring a rural property, or from requiring only 3 bedrooms to requiring at least 5 bedrooms, or from within 2 miles of a university to an area at least 5 miles from the university). Note that since clients (and their agents) can experiment by generating non-active property profiles for determining what types of properties are available, it is believed that only a few (possibly only one) active property profile is generally needed per client. Thus, since the agent may only be provided with a client's active property profile, the agent is spared the task of reviewing most of the client's property investigations. Moreover, the goal of exporting an active property profile to a client's agent is believed to be a goal that will motivate clients to be more self-directed in selecting and identifying their property preferences.

The portal 20, and in particular the transaction model and profile generator 76, may provide the functionality to allow agents to generate such predictive property profiles for clients.

Moreover, since such property profiles for different agents (or groups of agents) may be based on different client characteristics, and thus the generation of property profiles may be proprietary to such agent, and the portal 20 supports the proprietary nature of such property profile generation techniques. In particular, an agent may be provided with access restricted data storage for client profile information, as well as statistical techniques for generating property profiles for clients.

Wireless Location & Real Estate Transactions

Additional wireless location real estate features of the present real estate transaction system follow.

In one embodiment of the present disclosure, the buyer interaction subsystem 94 (FIG. 1) may request tracking of a portal 20 user (e.g., an agent or other registered portal 20 user) via wireless location technologies for presenting property information to the user as he/she travels. The portal 20 (or systems associated therewith) may receive periodic locations of the user (or as requested by the user), and use such location information for determining nearby properties satisfying one or more of the user's property profiles. If the user is an agent, the user may provide identification information for identifying one or more of the agent's clients and a corresponding property profile for each client for obtaining information on nearby properties. Accordingly, an agent may be travelling about an area viewing properties with a client, or contacting potential property sellers wherein information on nearby properties is provided to the agent while in the area. This may be particularly useful in compiling or enhancing a property profile of a client. For example, the client may upon actually viewing a property and its neighborhood determine that particular features of the property are undesirable, but the neighborhood or a similar neighborhood is acceptable. Accordingly, the client's property profile may be adjusted while in the area, transmitted to the portal 20 with a request for locating the agent and client, and an additional request for any properties within the neighborhood (zip code) or similar nearby neighborhoods (e.g., within 2 miles) that satisfy the new client property profile. By iteratively editing or enhancing the client's property profile, the agent may be able to more effectively identify properties that are likely to be of interest to the client. Moreover, the agent may wish to provide a client with independent wireless access to the portal 20 so that the client can travel through areas of interest and view information on area properties. Thus, the client may request that he/she be wirelessly located periodically (or as requested by the client) for obtaining information on nearby or adjacent properties for sale. Moreover, the portal 20 may be able to suggest "similar" properties (as also described herein) to a nearby property. The processing performed may be described at a high level as follows:

Step A. The agent or client requests, via a wireless communication device, information on nearby properties (e.g., within a predetermined distance, blocks, etc.) of the agent's or client's current location, wherein the properties must satisfy a given property profile.

Step B. The portal 20 receives the request, and requests a wireless location of the agent/client from a network service preferably associated with the wireless network to which the agent/client's wireless communication is registered.

Step C. Assuming the network service is able to locate the agent/client, the portal 20 receives the agent/client's location, and uses this location to look up for sale properties that are nearby the location and that satisfy the property profile.

Step D. Any properties satisfying the location and property profile constraints have their data transmitted back to the agent/client's wireless communication device.

Real estate agents/brokers (as well as, hotels and other personal service providers, such as auto rental agencies, hotels, resorts and cruise ships) may provide an inexpensive mobile communication device (MCD) that can be used substantially only for contacting: (i) the real estate agent/broker (or personal service), (ii) emergency services, and/or (iii) receiving directions to a desired location (e.g., the estate agent/broker's place of business, a particular real estate property, or return to the personal service). Accordingly, the mobile communication device may be wirelessly located during operations (ii) and (iii) via wireless communications between the mobile communication device and a local commercial wireless service provider wherein a request to locate the mobile communication device is provided to a mapping and routing system such as provided by MapInfo or disclosed in U.S. Pat. No. 6,236,365 (which is fully incorporated herein by reference) so that the mobile communication device user may be routed safely and expeditiously to a predetermined desired location (also referred to as a "geolocation" herein). Note that data representing the location of, e.g., a property with desired real estate property characteristics, can be associated with an identification of the mobile communication device so that mobile communication device activation for receiving directions to a real estate property of interest (e.g., as in (iii) above) results in one or more audio and/or visual presentations of directions for directing the user to the property.

The mobile communication device and the mobile communication device location providing wireless network 36

(e.g., a CMRS (commercial mobile radio service provider), a PSTN (public switched telephone network) or the Internet) may also provide the MCD user with the ability to explicitly request to be substantially continuously tracked, wherein the MCD tracked locations are stored for access by those having permission (e.g., the user, parents, authorized real estate professionals and/or associates of the user). Additionally, the velocity and/or expected time of arrival at a predetermined destination may be derived from such tracking and may be provided to the user or his/her associates (e.g., employer, friends, authorized real estate professionals, and/or family). Further, note that this tracking and notification of information obtained therefrom may be provided via a commercial telephony or Internet enabled mobile communication device, or a mobile communication device in operable communication with a short messaging service; e.g., for communicating with an embodiment of the real estate transaction system disclosed herein. For example, the MCD registered owner may provide permissions for those able to access such MCD tracking information so that such information can be automatically provided to certain associates and/or provided on request to certain associates. Additionally, note that the mobile communication device and the MCD location providing wireless network may also allow the MCD user to deactivate such MCD tracking functionality. In one embodiment, an MCD user may activate such tracking for his/her mobile communication device during hours when the user can review real estate property information and/or travel to such properties, and deactivate such tracking during other times.

Further, note that this selective MCD location capability may be performed in a number of ways. For example, the mobile communication device may activate and deactivate such tracking by dialing a predetermined number (e.g., by manually or speed dialing the number) for switching between activation of a process that periodically requests a wireless location of the mobile communication device from, e.g., a wireless network. Note that the resulting MCD location information may be made available to other users at a predetermined phone number, Internet address or having sufficient validation information (e.g., a password). Alternatively, the MCD location providing wireless network may automatically activate such MCD tracking for predetermined times of the day and for predetermined days of the week. Thus, in this embodiment, the MCD location providing wireless network may provide database storage of times and days of the week for activation and deactivation of this selective MCD tracking capability that is accessible via, e.g., a network service control point (or other telephony network control points as one skilled in the art will understand), wherein triggers may be provided within the database for generating a network message requesting the commencement of tracking of the mobile communication device or the deactivation of such tracking.

In another routing related application of the present invention, a mobile communication device and the MCD location providing wireless network may provide the MCD user with functionality to register certain locations (e.g., real estate properties of interest) so that data representing such locations can be easily accessed for use at a later time. For example, the mobile communication device user may be staying at a hotel in an unfamiliar area. Accordingly, using the present capability of the real estate transaction system disclosed herein, the user can request, via his/her mobile communication device, that his/her location at the hotel be determined and registered so that it is available at a later time for routing the user back to the hotel. In fact, the user may have personal location registrations of a plurality of locations in various cities and countries so that when traveling the user has wireless access to directions to preferred locations such as his/her hotel, preferred restaurants, shopping areas, scenic areas, rendezvous points, theatres, athletic events, churches, entertainment establishments, locations of acquaintances, etc. Note, that such personal location registration information may reside primarily on the user's subscriber network, but upon the MCD user's request, his/her personal location registrations may be transmitted to another network from which the user is receiving wireless services as a roamer. Moreover, any new location registrations (or deletions) may be duplicated in the user's personal registration of the user's subscriber network. However, in some instances an MCD user may wish to retain such registered locations only temporarily while the user is in a particular area; e.g., a predetermined network coverage area. Accordingly, the MCD user may indicate (or such may be the default) that a new personal location registration be retained for a particular length of time, and/or until a location of the user is outside the area to which such new location registrations appear to be applicable. However, prior to deleting any such registrations, the MCD user may be queried to confirm such deletions. For example, if the MCD user has new location registrations for the Dallas, Tex. area, and the MCD user subsequently travels to London, then upon the first wireless location performed by the MCD user for location registration services, the MCD user may be queried as whether to save the new Dallas, Tex. location registrations permanently, for an particular length of time (e.g. 30 days), or delete all or selected portions thereof.

Other routing related applications of the present invention are for security (e.g., tracking how do I get back to my hotel safely), and, e.g., sightseeing guided tour where the is interactive depending on feedback from users Presentation of Real Estate Properties to a Prospective Buyer Presentation of real estate property information may be directed to an mobile communication device according to its location. In at least some studies it is believed that mobile communication device users do not respond well to unsolicited wireless advertisement whether location based or otherwise. However, in response to certain user queries for locally available merchandise, certain advertisements may be viewed as more friendly. Thus, by allowing an MCD user to contact, e.g., a wireless real estate property information portal by voice or via wireless Internet, and describe certain products or services desired (e.g., via interacting with an automated speech interaction unit), the user may be able to describe and receive (at his/her mobile communication device) audio and/or visual presentations of such products or services that may satisfy such a user's request. For example, a user may enter a request: "I need a Hawaiian shirt, who has such shirts near here?"

In the area of real estate, the present invention has advantages both for the MCD user (as well as the wireline user), and for real estate property providers that are nearby to the MCD user. For instance, an MCD user may be provided with (or request) a default set of property advertisements for an area when the MCD user enters the area, registers with a hotel in the area, or makes a purchase in the area, and/or requests information about a particular product or service in the area. Moreover, there may be different collections of advertisements for MCD users that are believed to have different demographic profiles and/or purposes for being in the area. Accordingly, an MCD whose location is being determined periodically may be monitored by an advertisement wizard such that this wizard may maintain a collection the MCD user's preferences, and needs so that when the MCD user comes near a business that can satisfy such a preference or need, then an advertisement relating to the fulfillment of the preference or need may be presented to the MCD user. However, it is an aspect of the invention that such potential real estate property presentations be intelligently selected using as much information about the user as is available. In particular, in one embodiment of the invention MCD user preferences and needs may be ordered according to importance. Moreover, such user preferences and needs may be categorized by temporal importance (i.e., must be satisfied within a particular time frame, e.g., immediately, today, or next month) and by situational importance wherein user preferences and needs in this category are less time critical (e.g., do not have to satisfied immediately, and/or within a specified time period), but if certain criteria are meet the user will consider satisfying such a preference or need. Thus, e.g., finding a Chinese restaurant for dinner may be in the temporal importance category while purchasing a bicycle and a new pair of athletic shoes may be ordered as listed here in the situational category. Accordingly, advertisements for Chinese restaurants may be provided to the user at least partially dependent upon the user's location. Thus, once such a restaurant is selected and routing directions are determined, then the advertising wizard may examine advertisements (or other available product inventories and/or services that are within a predetermined distance of the route to the restaurant for determining whether there is product or service along the route that could potentially satisfy one of the user's preferences or needs from the situational importance category. If so, then the MCD user be may provided with the option of examining such product or service information and registering the locations of user selected businesses providing such products or services. Accordingly, the route to the restaurant may be modified to incorporate detours to one or more of these selected businesses. Corresponding functionality applies to viewing real estate properties that are for sale.

Of course, an MCD user's situationally categorized preferences and needs may allow the MCD user to receive unrequested real estate advertising during other situations as well. Thus, whenever an MCD user is moving such an advertisement wizard (e.g., if activated by the user) may attempt to satisfy the MCD user's preferences and needs by presenting to the user advertisements of nearby merchants that appear to be directed to such user preferences and needs.

Accordingly, for MCD user preferences and needs, the wizard will attempt to present information (e.g., advertisements, coupons, discounts, product price and quality comparisons) related to products and/or services that may satisfy the user's corresponding preference or need: (a) within the time frame designated by the MCD user when identified as having a temporal constraint, and/or (b) consistent with situational criteria provided by the MCD user (e.g., item on sale, item is less than a specified amount, within a predetermined traveling distance and/or time) when identified as having a situational constraint. Moreover, such information may be dependent on the geolocation of both the user and a merchant(s) having such products and/or services. Additionally, such information may be dependent on a proposed or expected user route (e.g., a route to work, a trip route). Thus, items in the temporal category are ordered according how urgent must a preference or need must be satisfied, while items in the situational category may be substantially unordered and/or ordered according to desirableness (e.g., an MCD user might want a motorcycle of a particular make and maximum price, want a new car more). However, since items in the situational category may be fulfilled substantially serendipitous circumstances detected by the wizard, various orderings or no ordering may be used. Thus, e.g., if the MCD user travels from one commercial area to another, the wizard may compare a new collection of merchant products and/or services against the items on an MCD user's temporal and situational lists, and at least alerting the MCD user that there may be new information available about a user desired service or product which is within a predetermined traveling time from where the user is. Note that such alerts may be visual (e.g., textual, or iconic) displays, or audio presentations using, e.g., synthesized speech (such as "Discounted motorcycles ahead three blocks at Cydes Cycles").

Note that the real estate advertising aspects of the present invention may be utilized by an intelligent network agent having expert knowledge about real estate which can utilize the MCD user's location (and/or anticipated locations; e.g., due to roadways being traversed) together with user preferences and needs (as well as other constraints) to both intelligently respond to user requests as well as intelligently anticipate user preferences and needs. Accordingly, in one aspect of the present invention real estate advertising is user driven in that the MCD user is able to select real estate advertising based on attributes such as: merchant proximity, traffic/parking conditions, the product/service desired, quality ratings, price, user merchant preferences, product/service availability, coupons and/or discounts. That is, the MCD user may be able to determine an ordering of advertisements presented based on, e.g., his/her selection inputs for categorizing such attributes. For example, the MCD user may request real estate advertisements according to the following values: (a) within 20 minutes travel time of the MCD user's current location, (b) midrange in price, (c) currently available, and (d) no preferred additional geographical area constraints. Note that in providing real estate advertisements according to the MCD user's criteria, the present invention may have to make certain assumptions such if the MCD user does not specify a time for being at a property. Accordingly, the present invention may default the time to a range of times somewhat longer than the travel time thereby going on the assumption that MCD user will likely be traveling to an advertised merchant relatively soon. Accordingly, the present invention may also check stored data on the property to assure that the MCD user can access the property once the MCD user arrives at the property's location. Accordingly, the MCD user may dynamically, and in real time, vary such real estate advertising selection parameters for thereby substantially immediately changing the real estate advertising being provided to the user's MCD. For example, the MCD display may provide an area for entering an identification of a product/service name wherein the network determines a list of related or complementary products/services.

Note that various aspects described herein are not constrained to using the MCD user's location. In general, the MCD user's location is but one attribute that can be intelligently used for providing users with targeted real estate advertising, and importantly, real estate advertising that is perceived as informative and/or addresses current user preferences and needs. Accordingly, aspects of the present invention in are not related to a change in the MCD user's location over time also apply to stationary communication stations such home computers wherein, e.g., real estate information is accessed via the Internet. Additionally, the MCD user may be able to adjust, e.g., via iconic selection switches (e.g., buttons or toggles) and icon range specifiers (e.g., slider bars) the relevancy and a corresponding range for various purchasing criteria. In particular, once a parameter is indicated as relevant (e.g., via activating a toggle switch), a slider bar may be used for indicating a relative or absolute value for the parameter. Thus, parameter values may be for: real estate property desirability ratings (e.g., display given to highest quality), price (low comparable price to high comparable price), travel time (maximum estimated time to get to merchant), parking conditions.

Accordingly, the present invention may include the following functionality:

(a) dynamically change as the user travels from one commercial area to another when the MCD user's location periodically determined such that local merchants are given preference;

(b) routing instructions are provided to the MCD user when a merchant is selected;

(c) provide dynamically generated real estate advertising that is related to an MCD user's preferences or needs. For example, if an MCD user wishes to purchase a new property, then such the present invention may dynamically generate advertisements with dining room sets therein for merchants that sell them. Note that this aspect of the present invention is can be accomplished by having, e.g., a predetermined collection of real estate advertising templates that are assigned to particular areas of an MCD user's display wherein the real estate advertising information selected according to the item(s) that the MCD user has expressed a preferences or desire to purchase, and additionally, according to the user's location, the user's preferred merchants, and/or the item's price, quality, as well as coupons, and/or discounts that may be provided. Thus, such displays may have a plurality of small advertisements that may be selected for hyperlinking to more detailed real estate advertising information related to a product or service the MCD user desires. Note that this aspect of the present invention may, in one embodiment, provide displays (and/or corresponding audio information) that is similar to Internet page displays. However, such real estate advertising may dynamically change with the MCD user's location such that MCD user preferences and needs for a items (including services) having higher priority are given advertisement preference on the MCD display when the MCD user comes within a determined proximity of the merchant offering the item. Moreover, the MCD user may be able dynamically reprioritize the real estate advertising displayed and/or change a proximity constraint so that different advertisements are displayed. Furthermore, the MCD user may be able to request real estate advertising information on a specified number of nearest merchants that provide a particular category of products or services. For example, an MCD user may be able to request real estate advertising on the three nearest Chinese restaurants that have a particular quality rating. Note, that such dynamically generated real estate advertising (d) information about MCD user's preferences and needs may be supplied to the present invention merchants regarding MCD user's reside and/or travel nearby yellow subscriber merchant locations as described hereinabove When a mobile communication device appears to be traveling an extended distance through a plurality of areas (as determined, e.g., by recent MCD locations along an interstate that traverse a plurality of areas), then upon entering each new area having a new collection of location registrations (and possibly a new location registration wizard) may be provided. For example, a new default set of local location registrations may become available to the user. Accordingly, the user may be notified that new temporary location registrations are available for the MCD user to access if desired. For example, such notification may be a color change on a video display indicating that new temporary registrations are available. Moreover, if the MCD user has a personal profile that also is accessible by a location registration wizard, then the wizard may provide real estate advertising for local businesses and services that are expected to better meet the MCD user's tastes and needs. Thus, if such wizard knows that the MCD user prefers fine Italian food but does not want to travel more than 20 minutes by auto from his/her hotel to reach a restaurant, then advertisements for restaurants satisfying such criteria will become available to the user However, MCD users may also remain anonymous to such wizards.

Note, that by retaining MCD user preferences and needs, if permission is provided, e.g., for anonymously capturing such user information, this information could be provided to merchants. Thus, merchants can get an understanding of what nearby MCD user's would like to purchase (and under what conditions, e.g., an electric fan for less than $10). Note such user's may be traveling through the area, or user's may live nearby. Accordingly, it is a feature of the present invention to provide merchant's with MCD user preferences and needs according to whether the MCD user is a passerby or lives nearby so that the merchant can better target his/her real estate advertising.

In one embodiment, a single wizard may be used over the coverage area of a CMRS and the database of local businesses and services changes as the MCD user travels from one location registration area to another. Moreover, such a wizard may determine the frequency and when requests for MCD locations are provided to the gateway 142. For example, such databases of local businesses and services may be coincident with LATA boundaries. Additionally, the wizard may take into account the direction and roadway the mobile communication device is traveling so that, e.g., only businesses within a predetermined area and preferably in the direction of travel of the mobile communication device are candidates to have real estate advertising displayed to the MCD user.

While various embodiments of the present invention have been described in detail, modifications and adaptations of these embodiments will occur to those skilled in the art. It is to be expressly understood, however, that such modifications and adaptations are within the scope of the present invention, as set forth in the claims provided hereinbelow.

APPENDIX A

The reports described hereinbelow are representative of the demographic reports provided by Claritas that can be used to populate a database for one or more given real estate areas. Note, that such reports may be for a particular geographical location such as a particular property.

Effective Buying Income Report (According to Year Specified)

This report provides current-year estimates and five-year projections of estimated households by Effective Buying Income (EBI) for 10 income breaks. EBI estimates and projections reflect income earned after taxes. EBI is a derivative of household income, with the correspondence between before tax and after tax income being identified for each state based on three year combinations of Current Population Survey (CPS) data. This report also includes average and median buying income data, population statistics, household data, housing units, median age, median household income. An example report follows.

Effective Buying Income Report
Radius: 1525 WILSON BLVD. ARLINGTON, VA 22209-2411, aggregate
Radius: 1525 WILSON BLVD. ARLINGTON, VA 22209-2411, aggregate
Radius: 1525 WILSON BLVD. ARLINGTON, VA 22209-2411, aggregate

| Description | 0.00-1.00 miles | | 0.00-3.00 miles | | 0.00-5.00 miles | |
|---|---|---|---|---|---|---|
| 2007 Demographic Totals | Radius | % | Radius | % | Radius | % |
| Population | 30,137 | | 251,636 | | 655,015 | |
| Households | 16,346 | | 132,367 | | 304,055 | |
| Families | 4,628 | | 42,074 | | 128,895 | |
| Group Quarters Population | 2,530 | | 16,134 | | 30,884 | |
| Housing Units | 17,285 | | 140,063 | | 322,565 | |
| 2007 Average Household Size | 1.69 | | 1.78 | | 2.05 | |
| 2007 Median Age | 33.60 | | 35.65 | | 36.77 | |
| 2007 Median Household Income | $71,853 | | $70,978 | | $67,174 | |
| 2007 Median All Owner-Occupied Housing Value | $492,506 | | $601,401 | | $522,537 | |
| 2007 Est. Households by Effective Buying Income | 16,346 | | 132,367 | | 304,055 | |
| EBI less than $15,000 | 1,529 | 9.35 | 14,225 | 10.75 | 36,259 | 11.93 |
| EBI $15,000-$24,999 | 1,130 | 6.91 | 10,307 | 7.79 | 26,537 | 8.73 |
| EBI $25,000-$34,999 | 1,902 | 11.64 | 13,823 | 10.44 | 33,651 | 11.07 |
| EBI $35,000-$49,999 | 2,547 | 15.58 | 21,972 | 16.60 | 51,017 | 16.78 |
| EBI $50,000-$74,999 | 3,633 | 22.23 | 27,795 | 21.00 | 60,765 | 19.98 |
| EBI $75,000-$99,999 | 2,440 | 14.93 | 17,421 | 13.16 | 38,060 | 12.52 |
| EBI $100,000-$149,999 | 2,020 | 12.36 | 15,790 | 11.93 | 34,689 | 11.41 |
| EBI $150,000-$249,999 | 535 | 3.27 | 5,037 | 3.81 | 10,738 | 3.53 |
| EBI $250,000-$499,999 | 270 | 1.65 | 2,554 | 1.93 | 5,481 | 1.80 |
| EBI $500,000 or more | 340 | 2.08 | 3,444 | 2.60 | 6,859 | 2.26 |
| 2007 Est. Average Effective Buying Income | $77,553 | | $79,915 | | $75,773 | |
| 2007 Est. Median Effective Buying Income | $57,330 | | $55,268 | | $51,878 | |

Population by Age and Sex Trend Report (According to Year Specified)

This demographic report provides 2000, current-year population estimates and five-year projections of population by age, sex and percentage of population. The total count and percentage are distributed among 17 age breaks, with median age provided at the bottom of each column. A portion of a report follows.

Population by Age and Sex Trend
1525 WILSON BLVD, ARLINGTON, VA 22209-2411, 0.00-1.00 Miles, Total

| Population | Totals |
|---|---|
| 2012 Projection | 31,009 |
| 2007 Estimate | 30,137 |
| 2000 Census | 28,189 |
| 1990 Census | 23,376 |
| Growth 1990-2000 | 20.59% |

| Description | 2000 Census | Percent | 2007 Estimate | Percent | 2012 Projection | Percent |
|---|---|---|---|---|---|---|
| Total Population by Age | 28,189 | | 30,137 | | 31,009 | |
| Age 0-4 | 873 | 3.10% | 840 | 2.79% | 760 | 2.45% |
| Age 5-9 | 576 | 2.04% | 936 | 3.11% | 902 | 2.91% |
| Age 10-14 | 491 | 1.74% | 757 | 2.51% | 1,006 | 3.24% |
| Age 15-17 | 309 | 1.10% | 318 | 1.06% | 440 | 1.42% |
| Age 18-20 | 2,172 | 7.71% | 1,861 | 6.18% | 1,854 | 5.98% |
| Age 21-24 | 3,752 | 13.31% | 1,896 | 6.29% | 1,183 | 3.82% |
| Age 25-34 | 9,670 | 34.30% | 9,840 | 32.65% | 8,830 | 28.48% |
| Age 35-44 | 4,484 | 15.91% | 5,375 | 17.84% | 5,455 | 17.59% |
| Age 45-49 | 1,456 | 5.17% | 2,164 | 7.18% | 2,672 | 8.62% |
| Age 50-54 | 1,391 | 4.93% | 1,557 | 5.17% | 2,128 | 6.86% |
| Age 55-59 | 1,040 | 3.69% | 1,473 | 4.89% | 1,543 | 4.98% |
| Age 60-64 | 659 | 2.34% | 1,187 | 3.94% | 1,534 | 4.95% |
| Age 65-74 | 778 | 2.76% | 1,268 | 4.21% | 1,895 | 6.11% |
| Age 75-84 | 417 | 1.48% | 492 | 1.63% | 608 | 1.96% |
| Age 85 and over | 120 | 0.43% | 173 | 0.57% | 200 | 0.64% |
| Age 16 and over | 26,147 | 92.76% | 27,499 | 91.25% | 28,195 | 90.93% |
| Age 18 and over | 25,939 | 92.02% | 27,286 | 90.54% | 27,901 | 89.98% |
| Age 21 and over | 23,767 | 84.31% | 25,426 | 84.37% | 26,047 | 84.00% |
| Age 65 and over | 1,314 | 4.66% | 1,934 | 6.42% | 2,703 | 8.72% |

-continued

| Population by Age and Sex Trend 1525 WILSON BLVD, ARLINGTON, VA 22209-2411, 0.00-1.00 Miles, Total ||||
|---|---|---|---|
| Median Age | 31.12 | 33.60 | 35.97 |
| Average Age | 33.76 | 36.38 | 38.57 |

Population by Age and Race Trend Report (According to Year Specified)
  This report provides detailed demographic analysis of 2000, current-year population estimates and 5-year projections for population of age by race. Population by race counts are further separated into 18 age breaks, including median age data.

Population by Age by Race by Sex Report (According to Year Specified)
  This report provides detailed analysis of current-year race specific population counts. This population and demographic report provides current-year estimates of population by age for 18 age breaks and distribution of population by race, sex and age.

Bank Branch Summary Report (According to Year Specified)
  This report provides bank branch summary information, including number of branches and deposits for both current and previous years. Additionally, branch counts and deposit details are given for commercial, savings and loan, savings, and credit union branches.

Business-Facts: 2 Digit SIC Summary Report (According to Year Specified)
  This report provides the total number of business establishments, number of employees, sales (in millions), and establishments having 20 or more employees by 2 digit SIC codes. The total count for each industry category is provided, with a detailed breakdown for each SIC subcategory. See the 2 Digit SIC sample report for the complete range of SIC codes.

Business-Facts: WorkPlace Population Report (According to Year Specified)
  This business report provides a look at the occupational mix within your market area. This report is great for segmenting and targeting the work force in your market area according to 26 different occupational categories.

Business-Facts: Healthcare Summary Report (According to Year Specified)
  This report provides the total number of healthcare establishments, number of employees and sales data for various health services. The total count for each health service category is provided, with a detailed breakdown for each subcategory. See the Healthcare Summary sample report for the complete range of SIC codes.

Business-Facts: Retail Summary Report (According to Year Specified)
  This business report provides the total number of retail establishments, number of employees, sales, and establishments having 20 or more employees for various retail businesses. The total count for each type of retail category is provided, with a detailed breakdown for each retail subcategory. See the Retail Summary sample report for the complete range of SIC codes.

Business-Facts: Service Summary Report (According to Year Specified)
  This business report provides the total number of service establishments, number of employees and sales data for various service industries. The total count for each service category is provided, with a detailed breakdown for each subcategory. See the Service Summary sample report for the complete range of SIC codes. A portion of such a report follows.

| Business-Facts: Service SIC Summary Radius 1: 1525 WILSON BLVD, ARLINGTON, VA 22209-2411, 0.00-1.00 Miles, Total ||||||
|---|---|---|---|---|---|
| SIC Code | Business Description | Total Establishment | Total Employees | Sales (in Millions) | Establishments 20+ Employees |
| 70 | Hotels and Other Lodging Places | 15 | 989 | 28.5 | 6 |
| 701 | Hotels and Motels | 14 | 974 | 28.2 | 6 |
| 72 | Personal Services | 82 | 543 | 20.1 | 3 |
| 721 | Laundry, Cleaning, Garment Service | 22 | 190 | 6.1 | 1 |
| 7215 | Coin-Operated Laundry and Cleaning | 0 | 0 | 0 | 0 |
| 722 | Photographic and Portrait Studios | 6 | 80 | 2.8 | 1 |
| 723 | Beauty Shops | 33 | 195 | 5.7 | 1 |
| 724 | Barber Shops | 2 | 7 | .2 | 0 |
| 725 | Shoe Repair and Shoeshine | 3 | 4 | .3 | 0 |
| 726 | Funeral Service and Crematory | 0 | 0 | 0 | 0 |
| 729 | Miscellaneous Personal Services | 16 | 67 | 5.0 | 0 |
| 7291 | Tax Return Preparation and Filing | 2 | 9 | .5 | 0 |
| 73 | Business Services | 156 | 2,710 | 410.1 | 33 |
| 731 | Advertising | 17 | 406 | 45.9 | 4 |
| 732 | Credit Reporting and Collect | 0 | 0 | 0 | 0 |
| 733 | Mail, Clerical, Graphic Design Services | 13 | 46 | 8.1 | 0 |
| 7334 | Photocopy and Duplicating Services | 0 | 0 | 0 | 0 |
| 734 | Services to Buildings | 12 | 104 | 1.7 | 1 |
| 7342 | Disinfect and Pest Control Services | 0 | 0 | 0 | 0 |
| 7349 | Building Maintenance Services NEC | 12 | 104 | 1.7 | 1 |
| 735 | Miscellaneous Equipment Rental and Leasing | 4 | 8 | 1.5 | 0 |
| 736 | Employment Agencies and Contractors | 12 | 100 | 19.1 | 1 |
| 7361 | Employment Agencies | 6 | 74 | 16.2 | 1 |
| 7363 | Temporary Employment Service | 6 | 26 | 2.9 | 0 |
| 737 | Computer and Data Processing Services | 41 | 943 | 92.0 | 19 |

-continued

Business-Facts: Service SIC Summary
Radius 1: 1525 WILSON BLVD, ARLINGTON, VA 22209-2411, 0.00-1.00 Miles, Total

| SIC Code | Business Description | Total Establishment | Total Employees | Sales (in Millions) | Establishments 20+ Employees |
|---|---|---|---|---|---|
| 738 | Miscellaneous Business Services | 57 | 1,103 | 241.8 | 8 |
| 7382 | Security Systems Services | 2 | 12 | .7 | 0 |
| 7384 | Photofinishing Laboratories | 1 | 3 | .5 | 0 |
| 7339 | Business Services NEC | 49 | 1,057 | 238.7 | 8 |
| 7389N | Telephone Answering Services | 1 | 13 | 2.9 | 0 |
| 75 | Automobile Repair Services and Parking | 20 | 165 | 30.2 | 1 |
| 751 | Automobile, RV and Moving Truck Rentals | 1 | 3 | .6 | 0 |
| 7514 | Passenger Car Rental | 1 | 3 | .6 | 0 |
| 752 | Automobile Parking | 14 | 142 | 28.4 | 1 |
| 753 | Automotive Repair Shops | 4 | 16 | 1.0 | 0 |
| 7533 | Automobile Exhaust Sys Repair Shops | 0 | 0 | 0 | 0 |
| 7536 | Automobile Glass Replacement Shops | 1 | 4 | .3 | 0 |
| 7537 | Automobile Transmission Repair Shops | 0 | 0 | 0 | 0 |
| 7538 | General Automobile Repair Shops | 2 | 11 | .6 | 0 |
| 754 | Automobile Service. Except Repair | 1 | 4 | .2 | 0 |
| 7542 | Carwashes | 1 | 4 | .2 | 0 |
| 76 | Miscellaneous Repair Services | 16 | 31 | 4.3 | 0 |
| 762 | Electrical Repair Shops | 0 | 0 | 0 | 0 |
| 7622 | Radio and TV Repair Shops | 0 | 0 | 0 | 0 |
| 7629 | Appliance Repair Shops NEC | 0 | 0 | 0 | 0 |
| 763 | Watch, Clock, and Jewelry Repair | 0 | 0 | 0 | 0 |
| 764 | Reupholstery and Furniture Repair | 2 | 4 | .2 | 0 |
| 769 | Miscellaneous Repair Shops | 14 | 27 | 4.1 | 0 |
| 78 | Motion Pictures | 25 | 242 | 44.5 | 2 |
| 783 | Motion Picture Theaters | 3 | 48 | 1.2 | 0 |
| 784 | Video Tape Rental | 1 | 20 | 1.5 | 1 |
| 79 | Amusement and Recreation Services (Ex. Movies) | 27 | 179 | 19.8 | 1 |
| 794 | Commercial Sports | 0 | 0 | 0 | 0 |
| 799 | Miscellaneous Amusement and Recreational Services | 11 | 92 | 6.3 | 1 |
| 7991 | Physical Fitness Facilities | 4 | 59 | 4.2 | 1 |
| 7996 | Amusement Parks | 0 | 0 | 0 | 0 |

Business-Facts: Workplace and Employment Summary 35 Report (According to Year Specified)

This report provides total establishment counts, total employee counts and total employees per establishment for dozens of industry categories. Portions of such report follows.

Business-Facts: Workplace and Employment Summary
Radius 1: 1525 WILSON BLVD. ARLINGTON, VA 22209-2411, 0.00-1.00 Miles, Total

| Business Description | Total Establishment | Total Employees | Employees Per Establishment |
|---|---|---|---|
| Industries (All) | 2.226 | 44.240 | 20 |
| Industries (Private Sector) | 1.924 | 29,783 | 16 |
| Industries (Government and Non-Profit)* | 302 | 14.457 | 48 |
| Agriculture (All) | 6 | 34 | 6 |
| Mining (All) | 3 | 22 | 7 |
| Construction (All) | 63 | 1.115 | 18 |
| Manufacturing (All) | 91 | 2.436 | 27 |
| Transportation, Communications/Public Utilities | 69 | 1.587 | 23 |
| Wholesale Trade (All) | 38 | 502 | 13 |
| Retail (All Retail) | 410 | 6.014 | 15 |
| Building Matls and Garden Supply | 1 | 6 | 6 |
| General Merchandise Stores | 5 | 135 | 27 |
| Food Stores | 35 | 619 | 18 |
| Auto Dealers and Gas Stations | 14 | 176 | 13 |
| Apparel and Accessory Stores | 51 | 633 | 12 |
| Home Furniture. Furnishings and Equipment | 48 | 650 | 14 |
| Eating and Drinking Places | 155 | 3,218 | 21 |
| Miscellaneous Retail Stores | 101 | 577 | 6 |
| Finance (All) | 224 | 3.276 | 15 |
| Bank Savings and Lending Institutions | 29 | 333 | 12 |
| Security and Commodity Brokers | 37 | 1.272 | 34 |
| Insurance Carriers and Agencies | 16 | 203 | 13 |
| Real Estate | 137 | 1.234 | 9 |

-continued

Business-Facts: Workplace and Employment Summary
Radius 1: 1525 WILSON BLVD. ARLINGTON, VA 22209-2411, 0.00-1.00 Miles, Total

| Business Description | Total Establishment | Total Employees | Employees Per Establishment |
|---|---|---|---|
| Trusts, Holdings and Other Investments | 5 | 234 | 47 |
| Service (All) | 1.249 | 26.231 | 21 |
| Hotel and Other Lodging | 15 | 989 | 66 |
| Personal Services | 118 | 739 | 6 |
| Business Services | 456 | 9.851 | 22 |
| Motion Picture and Amusement | 52 | 421 | 8 |
| Health Services | 79 | 445 | 6 |
| Legal Services | 167 | 1,103 | 7 |
| Educational Services | 47 | 7.882 | 168 |
| Social Services | 66 | 771 | 12 |
| Misc. Membership Orgs and Nonclassified | 249 | 4.030 | 16 |
| Public Administration (All) | 73 | 3.023 | 41 |
| CY Population | 30.111 | | |
| CY Residential Pop per Business | 14 | | |
| CY Households | 16.337 | | |
| CY HHs per Businesses | 7 | | |

Consumer Spending Patterns Report (According to Year Specified)

This report provides expenditure totals for various consumer product groups, including apparel, entertainment, food at home, healthcare, household equipment, transportation; and more. Expenditures are represented in annual aggregate, per capita, and average household expenditures for both current year and five year projections.

Executive Summary Report (According to Year Specified)

This executive summary report provides highlights and comparisons for your market in an easy-to-understand paragraph format. The narrative paragraphs pick out key details, comparing the area's data with national averages. The 'Executive Summary' provides a comprehensive overview of valuable demographic information, including population, households, race and income.

The Financial CLOUT Demand Report provides the count and percent composition of households and average dollar balance/value for a variety of financial products—including basic banking products, investments (stocks, bonds, mutual funds), retirement products, credit cards, mortgages, loans, insurance and more.

Financial Facilities Report (According to Year Specified)

This financial facilities report displays detailed financial facility information within a geographic area. Details include: bank ID, branch name, address, holding company information, establishment/acquisition dates, type of institution, latitude/longitude and more!

Household Trend Report (According to Year Specified)

This report provides population, households, families, housing units, group quarters population, household size, and various income variables. Detailed income breaks are provided for all households, as well as percentage change between reporting years.

Middle Years Report (According to Year Specified)

The Middle Years Report provides valuable demographic information specific to the age ranges of 35 to 54. Details include current-year and five-year projections for population by age and sex, population by age and race, household income by age of householder, household income and housing value.

Pop-Facts: Census Demographic Quick Facts (According to Year Specified)

This comprehensive population and demographic report contains Census 2000 data for key demographic variables such as population, income and single race classification.

Pop-Facts: Demographic Snapshot Report (According to Year Specified)

This population and demographic report lets you zoom in on demographic changes and trends that impact your market. The Demographic Snapshot features population by race, sex and age ranges, household size, type and value, household income details.

Pop-Facts: Demographic Trend Report (According to Year Specified)

This population and demographic report contains 2000 Census, current-year and five-year projections for population, households, sex, age, race and income to give you a snapshot of a particular area.

Pop-Facts: Census Demographic Overview Report (According to Year Specified)

This comprehensive population statistics and demographic report contains Census 2000 data for key demographic variables such as population, sex, households, income and race.

Pop-Facts: Household Quick Facts Report (According to Year Specified)

The Household Quick Facts demographic report provides 1990, 2000, current-year estimates, and five-year projections of households, including the percentage change of households between each of the years (1990-2000, 2000-2003, 2003-2008). This report also shows the distribution of households among 10 income ranges. Current year estimates for average household income, median household income, per capita income, household type and size are also included.

Pop-Facts: Household Income by Age of Householder Report (According to Year Specified)

This demographic report uses current year cross-tabulation to make it easy to determine the income level of a particular age group in a given area.

Pop-Facts: Population Quick Facts Report (According to Year Specified)

This demographic and Population Quick Facts report provides 1990, 2000, current-year estimates, and five-year projections for population, including the percentage change in population between each of the years. Current year estimated population for 19 age breaks, median and average age, population by race and by sex are also provided.

Pop-Facts: Demographic Quick Facts Report (According to Year Specified)

This report provides key current-year demographic variables such as population, households, race, and income.

PRIZM NE Household Distribution Report (According to Year Specified)

The PRIZM NE Household Distribution Report provides counts and percentages for households for each of the PRIZM segments. A base area index to US households by segment is included.

PRIZM NE Lifestage Distribution Report (According to Year Specified)

The PRIZM NE Lifestage Distribution Report provides counts and percentages for households for each of the PRIZM segments by lifestage. Lifestage grouping are defined by Age and presence of children. A base area index to US households by segment is included.

PRIZM NE Social Distribution Report (According to Year Specified)

The PRIZM NE Social Group Distribution Report provides counts and percentages for households for each of the PRIZM NE segments by social group. Four social groups summarize urbanization. A base area index to US households by segment is included. A representative report follows.

Workplace PRIZM NE Distribution Report (According to Year Specified)

The Workplace PRIZM NE Distribution Report provides counts and percentages for total workers for all industries for each of the PRIZM NE segments. A base area index to the US by segment is included.

Race and Hispanic Report (According to Year Specified)

This race and hispanic demographic report provides snapshots of Hispanic population or Latino population and demographic data with separated race classification data.

Restaurant Report (According to Year Specified)

This restaurant report displays the top restaurant chains within a geographic area or market. Chains are assigned to one of the four major categories: Casual Dining, Fine Dining, Midscale, and Quick Service. Each major category is further divided into sub-categories.

Restaurant Report with Map (According to Year Specified)

This restaurant map includes a Restaurant Report with a map displaying location and names of restaurants in your study area. This report is available for radius only.

RMP Opportunity Gap—Retail Stores Report (According to Year Specified)

This report provides supply and demand figures as well as an opportunity gap analysis for a specified geography, for various retail store types.

RMP Opportunity Gap—Merchandise Lines Report (According to Year Specified)

This report provides supply and demand figures as well as an opportunity gap analysis for a specified geography for merchandise line items.

PRIZM NE Social Group Distribution
Radius 1: 1525 WILSON BLVD, ARLINGTON, VA 22209-24, 0.00-1.00 Miles, Total

| Group | PRIZM NE Code | Name | Area Households | % | US Base Households | % | Index |
|---|---|---|---|---|---|---|---|
| | | URBAN | | | | | |
| U1 | 04 | Young Digerati | 6758 | 41.37% | 1388902 | 1.22% | 3,385.4 |
| U1 | 07 | Money and Brains | 1803 | 11.04% | 2278635 | 2.00% | 550.5 |
| U1 | 16 | Bohemian Mix | 5357 | 32.79% | 2010509 | 1.77% | 1,853.9 |
| U1 | 26 | The Cosmopolitans | 112 | 0.69% | 1325689 | 1.17% | 58.8 |
| U1 | 29 | American Dreams | 344 | 2.11% | 2446048 | 2.15% | 97.8 |
| U1 | | URBAN UPTOWN | 14374 | 87.98% | 9449783 | 8.31% | 1,058.3 |
| U2 | 31 | Urban Achievers | 1550 | 9.49% | 1711082 | 1.51% | 630.3 |
| U2 | 40 | Close-In Couples | 5 | 0.03% | 1324020 | 1.16% | 2.6 |
| U2 | 54 | Multi-Culti Mosiac | 47 | 0.29% | 1910430 | 1.68% | 17.1 |
| U2 | | MIDTOWN MIX | 1602 | 9.81% | 4945532 | 4.35% | 225.4 |
| U3 | 59 | Urban Elders | 88 | 0.54% | 1484170 | 1.31% | 41.3 |
| U3 | 61 | City Roots | 12 | 0.07% | 1301315 | 1.14% | 6.4 |
| U3 | 65 | Big City Blues | 0 | 0.00% | 1260034 | 1.11% | 0.0 |
| U3 | 66 | Low-Rise Living | 0 | 0.00% | 1602059 | 1.41% | 0.0 |
| U3 | | URBAN CORES | 100 | 0.61% | 5647578 | 4.97% | 12.3 |

Senior Life Report (According to Year Specified)
    The Senior Life demographic report helps target population 55 years and older by providing 2000 and current-year estimates and five-year projections for population, race, income, and housing value. In addition, this senior demographic data report provides detail on household type, owner costs, renter information, and more.
Shopping Center List Report (According to Year Specified)
    This report lists the shopping centers within a specific target geography and includes address, center type, construction status, year open, and gross leasing area (GLA) for all stores.
Shopping Center List with Map (According to Year Specified)
    This shopping center map option includes a Shopping Center List with a map displaying the location and names of shopping centers in your study area.
Traffic Volumes Report (According to Year Specified)
    This traffic volumes report is based on traffic counts reported by local municipalities. It provides the annual average daily traffic volume, street name, count date, latitude and longitude for all collection points in the geographic area. A large portion of counts will be from prior years.
Traffic Volumes Report with Map (According to Year Specified)
    This traffic count and map report includes the Traffic Volumes Report with a map showing the annual average daily traffic volume for your selected area. This report is available for radius only.
Young Adults Report (According to Year Specified)
    This young adult demographic report examines the young adult population, ranging in age from 15 to 34. Among the detailed information provided are: population by age and sex, population by age and race, household income by age of householder, household income and housing value.
Household Current-Year Dot Density Map (According to Year Specified)
    This current year household dot density demographic map shows the household density by dot distribution. Random dot patterns
Household Current-Year Map (According to Year Specified)
    This current year household demographic map provides a visual representation of the number of households by block group. Capture a clear image of the household density in your radii or selected geography.
Population Current-Year Map (According to Year Specified)
    This current year population and demographic map allows you to visualize the quantity of population by block group. Determine the concentration of population in your radii or selected geography.
Population Current-Year Dot Density Map (According to Year Specified)
    This current year population and demographic map shows the population density by dot distribution. Random dot patterns are applied to the map, with a legend to indicate the numeric representation of each dot.
Business-Facts: WorkPlace Population Map (According to Year Specified)
    This workplace population map shows the number of employees by block group. Determine the quantity of employees in your radii during business hours.
Household Five-Year Projection Map (According to Year Specified)
    This household population demographic map displays the number of households, by block group, projected 5 years from now. Gain a clear image of the household density in your radii or selected geography.
Median Age Map (According to Year Specified)
    This median age demographic map illustrates the median age by block group, providing useful information for targeting specific age ranges.
Median Household Income Map (According to Year Specified)
    This household income map illustrates the median household income by block group. This map is useful for targeting specific income ranges.
Middle Years Map (According to Year Specified)
    This middle years demographic map provides a block group analysis of the Household Count by age, for ages 35-54 with income over $25,000.
Per Capita Income Map (According to Year Specified)
    This per capita income demographic map illustrates the distribution of per capita income by block group. Target specific average income ranges around your site.
Population Five-Year Projection Map (According to Year Specified)
    This five-year population projections and demographic data map helps determine what the concentration of population in your radii or selected geography will be 5 years from now! This map provides a representation of the population by block group.
Population Growth 2000-Current-Year Map (According to Year Specified)
    Visualize the population growth and anticipate what demographic changes are occurring around your site.
Population Growth According to Year Specified-2011 Map (According to Year Specified)
    Visualize the projected population growth and anticipate demographic changes that are occurring around your site.
Senior Life 55-74 Map (According to Year Specified)
    This senior demographic map provides a block group analysis of the Household Counts by age, for ages 55-74, with an annual income over $25,000.
Senior Life 75+ Map (According to Year Specified)
    This senior demographic map is useful for targeting seniors. It provides a block group analysis of the Household Count by age, for Age 75+ with income over $25,000.
Young Adults Map (According to Year Specified)
    This young adults demographic map provides a block group analysis of the Household Count by age, for ages 15-34, with income over $25,000.

What is claimed is:

1. A method for assisting in a real estate transaction, the method comprising of (A) through (C) hereinbelow:
    (A) first obtaining, by a computational equipment, from each of at least first and second users, user input respectively for first and second user real estate preference information for one or more real estate properties;
    wherein each of the first and second user real estate preference information includes data for a respective one of first and second one or more geolocation conditions for a respective one of the first and second users, each of said first and second one or more geolocation conditions for determining, from a plurality of real estate property presentations, one or more of the presentations to be presented at a respective one of first and second mobile communication devices when accessed by the first or second user respectively;

wherein each of the first one or more geolocation conditions and the second one or more geolocation conditions is satisfied, for a corresponding presentation (P) of the one or more presentations, by determining that:
(i) for some estimated location, or location along an expected future route ($L_{CD}$) of the respective one of the first and second mobile communication devices, and
(ii) for a property location ($D_P$), for at least one of the real estate properties associated with the corresponding presentation P, the property location $D_P$ satisfies one or more of (a1), (a2), and (a3) following:
(a1) within one of: a specified user travel distance of the location $L_{CD}$, or a specified geographically identified area of the location $L_{CD}$;
(a2) within a specified expected elapsed time of travel from the location $L_{CD}$; and
(a3) nearer to the location $L_{CD}$ than at least one other destination for accessing of the at least one real estate property;

(B) obtaining, by the computational equipment, (b1) and (b2) following:
(b1) a location estimate ($L_{EST}$) of an actual or expected future geographic location of the first mobile communication device, wherein the location estimate is dependent upon a first computation of a wireless location of the first mobile communication device, the first computation using first wireless signal propagation indicative information of one or more wireless signals indicative of a geolocation of the first mobile communication device, wherein the first wireless signal propagation indicative information is wirelessly communicated between: (i) the first mobile communication device, and (ii) a communications network; and
(b2) a second location estimate of an actual or expected future geographic location ($L_2$) of the second mobile communication device at a time (T), wherein the second location estimate is dependent upon a second computation of a wireless location of the second mobile communication device, the second computation using second wireless signal propagation indicative information of one or more wireless signals indicative of a geolocation of the second mobile communication device, wherein the second wireless signal propagation indicative information is wirelessly communicated between: (i) the second mobile communication device, and (ii) a communications network;

(C) each of (c1) and (c2) following, wherein for a first and a second real estate properties of the real estate properties, there are respectively first and second presentations of the plurality of real estate property presentations providing information, respectively, related to the first and second real estate properties, and the first presentation having associated therewith information used for identifying a corresponding property location ($D_{P_1}$) for the first real estate property, and the second presentation having associated therewith information used for identifying a corresponding property location for the second real estate property:
(c1) for the first real estate property such that the first one or more geolocation conditions are satisfied for the first presentation wherein the location estimate $L_{EST}$ is used to obtain a corresponding instance of the location $L_{CD}$ for the first mobile communication device, obtaining route data for a first route, the route data for use in navigating the first mobile communication device to substantially the corresponding property location $D_{P_1}$, and each of (c1-1) and (c1-2) following are performed:
(c1-1) for information ($INF_m$) associated with another of the plurality of presentations ($P_m$) of one of the real estate properties (REP), selecting the information $INF_m$ when $INF_m$ includes data for a corresponding destination $D_{P_m}$ associated with the presentation $P_m$, wherein for at least one location along the first route to the corresponding destination $D_{P_m}$ at least the first one or more geolocation conditions of the first user real estate preference information is satisfied; and
(c1-2) providing information for computing, by the computational equipment, data for a second route ($R_m$) from the location estimate $L_{EST}$ to substantially the corresponding property location $D_{P_1}$, wherein the second route $R_m$ goes substantially to the corresponding destination $D_{P_m}$ as well as continuing on to the corresponding property location $D_{P_1}$;
wherein information indicative of one or more of: the second route $R_m$, the first presentation, and the presentation $P_m$ are transmitted to the first mobile communication device via a communications network; and (c2) (c2-1) through (c2-5) following are performed, and determining that the second one or more geolocation conditions are satisfied, wherein in addition to the second one or more geolocation conditions, there is additionally associated with the second user real estate preference information additional preference information (AP), said additional preference information AP also used for determining whether the second presentation for the second real estate property is to be presented at the second mobile communication device;
wherein, from the additional preference information AP, a plurality of additional conditions are obtained;
(c2-1) evaluating one or more of the additional conditions using the computational equipment, the evaluation of each of the one or more additional conditions is dependent upon a corresponding real estate property characteristic that does not vary with locations of the second mobile communication device;
wherein prior to at least one performance of the evaluating, prioritizing or weighting at least some of the additional conditions, or results obtained from the additional conditions, is performed for affecting the evaluation of at least one of the additional conditions;
(c2-2) determining, by the computational equipment, that for the second presentation at least one of the additional conditions is not sufficiently satisfied, when evaluated, in the evaluating (c2-1), for presenting the second presentation to the user;
(c2-3) obtaining, by the computational equipment, an additional location estimate of an actual or expected future geographic location of the second mobile communication device at a different geographic location from the location $L_2$ or at a substantially different subsequent time from the time T, such that the additional location estimate is dependent upon an additional computation of a wireless location of the second mobile communication device, the additional computation using corresponding wireless signal propagation indicative information of one or more wireless signals indicative of a geolocation of the second mobile communication device, wherein the corresponding wireless signal propagation indicative information of one or more wireless signals are communicated wirelessly between: (i) the second mobile communication device, and (ii) a communications network;

(c2-4) second accessing the additional preference information AP, and determining, by the computational equipment, that for the additional location estimate, and another of the real estate properties, both the second one or more geolocation conditions are satisfied, and the additional conditions are sufficiently satisfied for presenting a corresponding third presentation of the plurality of presentations that is for the another real estate property;

(c2-5) providing, by the computational equipment, information for computing data for a route ($R_1$); wherein the route $R_1$ includes at least one direction for use in navigating from substantially the additional location estimate to substantially the another real estate property; and transmitting information indicative of one or more of: the route $R_1$, and the third presentation to the second mobile communication device via a communications network.

2. The method of claim 1, further including:
determining a first collection of real estate properties that sold in a specified time frame, at least one of the properties of the first collection is determined to have real estate property characteristics similar to one or more user desired real estate property characteristics, wherein the at least one property is identified by combining data indicative of a user supplied measurement of importance for each of the user desired real estate property characteristics.

3. The method of claim 1, wherein the first one or more geolocation conditions are satisfied when the corresponding property location $D_P$ and the location $L_{CD}$ satisfy (a1).

4. The method of claim 1, wherein the second one or more geolocation conditions are satisfied when the corresponding property location $D_P$ and the location $L_{CD}$ satisfy (a2).

5. The method of claim 1, wherein the location estimate $L_{EST}$ is an actual location estimate of the first mobile communication device.

6. The method of claim 1, wherein the location estimate $L_{EST}$ is an expected future geographic location of the first mobile communication device.

7. The method of claim 1, wherein the prioritizing or weighting in (c2-1) includes identifying one of the additional conditions as being required to be satisfied when evaluated.

8. The method of claim 1, wherein the prioritizing or weighting in (c2-1) includes assigning a relative importance to one or more of the additional conditions; and
the evaluating includes computing a weighted combination of user importance values of real estate property related characteristics for determining a result from the prioritizing or weighting.

9. The method of claim 1, wherein the prioritizing or weighting in (c2-1) includes ordering at least some of the additional conditions for changing a population of the real estate properties used in determining one of the plurality of real estate property presentations.

10. The method of claim 1, further including determining, by the computational equipment, a suggested initial offer for purchasing one of the real estate properties, wherein the suggested initial offer is dependent upon an outcome from a performance of determining a plurality of previously sold real estate properties that are similar, according to the additional conditions, to the one of real estate property; wherein for the previously sold real estate properties, a difference between their asking prices and their sales prices is used in determining the suggested initial offer.

11. The method of claim 1, further including ranking, by the computational equipment, at least some of the real estate properties according to how well the at least some real estate properties satisfy the additional conditions.

12. The method of claim 1 further including, for a user (U) of at least one of the first and second users, searching, by the computational equipment, a data storage media having data for the real estate properties, wherein identified geographical locations are provided by the user U for identifying at least one of the real estate properties in the data storage media, wherein input for the searching includes data indicative of distances or times of travel between the at least one real estate property and the geographical locations.

13. The method of claim 1 further including by the computational equipment:
generating a profile for the second user, wherein the generating of the profile is dependent on profiles of other users, and real estate properties sold to the other users; wherein
the generating includes combining: (i) data indicative of previous real estate property potential buyers having a similarity to the second user, and (ii) data indicative of at least one of the additional conditions.

14. The method of claim 13, wherein the combining is dependent upon proprietary real estate property information provided by a real estate agent for the second user, wherein a change to the proprietary real estate property information changes the profile generated.

15. The method of claim 13, further comprising computing, using the profile, data for predicting whether or not a purchase of a real estate property by the second user is likely.

16. An apparatus for assisting in a real estate transaction, comprising:
(A) a network site configured for obtaining, from each of at least first and second users, user input respectively for first and second user real estate preference information for one or more real estate properties;
wherein each of the first and second user real estate preference information includes data for a respective one of first and second one or more geolocation conditions for a respective one of the first and second users, each of said first and second one or more geolocation conditions for determining, from a plurality of real estate property presentations, one or more of the presentations to be presented at a respective one of first and second mobile communication devices when accessed by the first or second user respectively;
wherein, each of the first one or more geolocation conditions and the second one or more geolocation conditions is satisfied, for a corresponding presentation (P) of the one or more presentations, by determining that:
(i) for some estimated location, or location along an expected future route ($L_{CD}$) of the respective one of the first and second mobile communication devices, and
(ii) for a property location ($D_P$), for at least one of the real estate properties associated with the corresponding presentation P,
the property location $D_P$ satisfies one or more of (a1), (a2), and (a3) following:
(a1) within one of: a specified user travel distance of the location $L_{CD}$, or a specified geographically identified area of the location $L_{CD}$;
(a2) within a specified expected elapsed time of travel from the location $L_{CD}$; and (a3) nearer to the location $L_{CD}$ than at least one other destination for accessing of the at least one real estate property;

(B) wherein a location estimator is available for providing the network site with wireless location estimates, the location estimator configured for obtaining (b1) and (b2) following:

(b1) a location estimate ($L_{EST}$) of an actual or expected future geographic location of the first mobile communication device, wherein the location estimate is dependent upon a first computation of a wireless location of the first mobile communication device, the first computation using first wireless signal propagation indicative information of one or more wireless signals indicative of a geolocation of the first mobile communication device, wherein the first wireless signal propagation indicative information is wirelessly communicated between: (i) the first mobile communication device, and (ii) a communications network; and (b2) a second location estimate ($L_2$) of an actual or expected future geographic location of the second mobile communication device at a time (T), wherein the second location estimate is dependent upon a second computation of a wireless location of the second mobile communication device, the second computation using second wireless signal propagation indicative information of one or more wireless signals indicative of a geolocation of the second mobile communication device, wherein the second wireless signal propagation indicative information is wirelessly communicated between: (i) the second mobile communication device, and (ii) a communications network;

(C) an evaluator, including one or more computational equipments, configured for performing each of (c1) and (c2) following, wherein for a first and a second real estate properties of the real estate properties, there are respectively first and second presentations of the plurality of real estate property presentations providing information, respectively, related to the first and second real estate properties, and the first presentation having associated therewith information used for identifying a corresponding property location ($D_{P_1}$) for the first real estate property, and the second presentation having associated therewith information used for identifying a corresponding property location for the second real estate property:

(c1) for the first real estate property such that the first one or more geolocation conditions are satisfied for the first presentation wherein the location estimate $L_{EST}$ is used to obtain a corresponding instance of the location $L_{CD}$, the evaluator configured for obtaining route data for a first route, the route data for use in navigating the first mobile communication device to substantially the corresponding property location $D_{P_1}$, and the evaluator configured for performed each of (c1-1) and (c1-2) following:

(c1-1) for information ($INF_m$) associated with another of the plurality of presentations ($P_m$) of one of the real estate properties (REP), the evaluator configured for selecting the information $INF_m$ when $INF_m$ includes data for a corresponding destination $D_{P_m}$ associated with the presentation $P_m$, wherein for at least one location along the first route to the corresponding destination $D_{P_m}$, at least the first one or more geolocation conditions of the first user real estate preference information is satisfied; and (c1-2) the evaluator configured for providing information for computing data for a second route ($R_m$) from the location estimate $L_{EST}$ to substantially the corresponding property location $D_{P_1}$, wherein the second route $R_m$ goes substantially to the corresponding destination $D_{P_m}$ as well as continuing on to the property location $D_{P_1}$;

wherein the apparatus further includes a transmitter configured for transmitting information indicative of one or more of: the second route $R_m$, a first presentation, and the presentation $P_m$ to the first mobile communication device via a communications network; and (c2) the evaluator configured for performing each of (c2-1) through (c2-5) following, and the evaluator configured for determining that the second one or more geolocation conditions are satisfied, wherein in addition to the second one or more geolocation conditions, there is additionally associated with the second user real estate preference information additional preference information (AP), said additional preference information AP also used for determining whether a second presentation for the second real estate property is to be presented at the second mobile communication device;

wherein, from the additional preference information AP, a plurality of additional conditions are obtained;

(c2-1) the evaluator configured for evaluating one or more of the additional conditions, the evaluation of each of the one or more additional conditions is dependent upon a corresponding real estate property characteristic that does not vary with locations of the second mobile communication device;

wherein prior to the evaluator performing at least one instance of the evaluating, a prioritizing or weighting of at least some of the additional conditions, or results is obtained for affecting the evaluation of at least one of the additional conditions;

(c2-2) the evaluator configured for determining, for the second presentation, whether at least one of the additional conditions is not sufficiently satisfied when evaluated by the evaluator in the evaluating (c2-1);

(c2-3) the evaluator configured for obtaining an additional location estimate of an actual or expected future geographic location of the second mobile communication device at a different geographic location from the second location estimate $L_2$ or at a substantially different subsequent time from the time T, such that the additional location estimate is dependent upon a additional computation of a wireless location of the second mobile communication device, the additional computation using wireless signal propagation indicative information of one or more wireless signals indicative of a geolocation of the second mobile communication device;

(c2-4) the evaluator configured for second accessing the additional preference information AP, and determining that for the additional location estimate, and another of the real estate properties, both the second one or more geolocation conditions are satisfied, and the additional, are sufficiently satisfied for presenting a corresponding third presentation of the plurality of presentations that is for the another real estate property;

(c2-5) the evaluator configured for providing information for computing data for a route ($R_1$); wherein the route $R_1$ includes at least one direction for use in navigating from substantially the additional location estimate to substantially the another real estate property;

wherein the transmitter is further configured for transmitting information indicative of one or more of: the route $R_1$, and the third presentation to the second mobile communication device via a communications network.

17. The apparatus of claim 16, wherein
at least one of the properties of the first collection is determined to have real estate property characteristics similar to one or more user desired real estate property characteristics, and
the at least one property is identified by combining data indicative of a user supplied measurement of importance for each of the user desired real estate property characteristics.

18. The apparatus of claim 16, wherein the first one or more geolocation conditions are satisfied when the corresponding property location $D_P$ and the location $L_{CD}$ satisfy (a1).

19. The apparatus of claim 16, wherein the second one or more geolocation conditions are satisfied when the corresponding property location $D_P$ and the location $L_{CD}$ satisfy (a2).

20. The apparatus of claim 16, wherein the location estimate $L_{EST}$ is an actual location estimate of the first mobile communication device.

21. The apparatus of claim 16, wherein the location estimate $L_{EST}$ is an expected future geographic location of the first mobile communication device.

22. The apparatus of claim 16, wherein the prioritizing or weighting in (c2-1) includes identifying one of the additional conditions as being required to be satisfied when evaluated.

23. The apparatus of claim 16, wherein the prioritizing or weighting in (c2-1) includes assigning a relative importance to one or more of the additional conditions; and
the evaluating includes computing a weighted combination of user importance values of real estate property related characteristics for determining a result from the prioritizing or weighting.

24. The apparatus of claim 16, wherein the prioritizing or weighting in (c2-1) includes ordering at least some of the additional conditions for changing a population of the real estate properties used in determining one of the plurality of real estate property presentations.

25. The apparatus of claim 16, wherein a suggested initial offer for purchasing one of the real estate properties is determined, and
the suggested initial offer is dependent upon an outcome from a performance of determining a plurality of previously sold real estate properties that are similar, according to the additional conditions, to the one of real estate property;
wherein for the previously sold real estate properties, a difference between their asking prices and their sales prices is used in determining the suggested initial offer.

26. The apparatus of claim 16, wherein at least some of the real estate properties are ranked according to how well the at least some real estate properties satisfy the additional conditions.

27. The apparatus of claim 16 wherein for a user (U) of at least one of the first and second users, a data storage media having data for the real estate properties is searched, wherein identified geographical locations are provided by the user U for identifying at least one of the real estate properties in the data storage media, wherein input for the searching includes data indicative of distances or times of travel between the at least one real estate property and the geographical locations.

28. The apparatus of claim 16 wherein a profile is generated for the second user dependent on profiles of other users, and real estate properties sold to the other users;
wherein the profile is generated by combining: (i) data indicative of previous real estate property potential buyers having a similarity to the second user, and (ii) data indicative of at least one of the additional conditions.

29. The apparatus of claim 28, wherein the combining is dependent upon proprietary real estate property information provided by a real estate agent for the second user, wherein a change to the proprietary real estate property information changes the profile generated.

30. The apparatus of claim 28, wherein the profile is used to predict whether or not a purchase of a real estate property by the second user is likely.

* * * * *